(12) United States Patent
Holmes et al.

(10) Patent No.: US 12,304,725 B2
(45) Date of Patent: May 20, 2025

(54) BULK MATERIAL RECEIVING, CONVEYING, STORING, AND DISPENSING

(71) Applicant: Owens-Brockway Glass Container Inc., Perrysburg, OH (US)

(72) Inventors: Kirk Holmes, Perrysburg, OH (US); Steven Will, Sylvania, OH (US); Manfred Robert Romstöck, Freudenbeg (DE); Guenther Josef Mlynar, Wertheim-Bettingen (DE)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 654 days.

(21) Appl. No.: 17/492,549

(22) Filed: Oct. 1, 2021

(65) Prior Publication Data

US 2022/0106106 A1 Apr. 7, 2022

Related U.S. Application Data

(63) Continuation-in-part of application No. 17/061,302, filed on Oct. 1, 2020, now Pat. No. 11,912,608.

(51) Int. Cl.
*B65D 88/28* (2006.01)
*B01D 29/66* (2006.01)
(Continued)

(52) U.S. Cl.
CPC .......... *B65D 88/28* (2013.01); *B01D 29/661* (2013.01); *B01D 29/902* (2013.01);
(Continued)

(58) Field of Classification Search
CPC ...................................................... B65D 88/28
See application file for complete search history.

(56) References Cited

U.S. PATENT DOCUMENTS 9,126,741 B2  9/2015  Ellis et al.
9,227,780 B2  1/2016  Krohn
(Continued)

FOREIGN PATENT DOCUMENTS

CA      2815714   * 11/2013   ............... B65G 3/04
CN    111776509   * 10/2020   ............. B65D 88/74
(Continued)

OTHER PUBLICATIONS

EP Office Action, Application No. 21867876.1-1014, Owner: Owens-Brockway Glass Container Inc., Dated: Mar. 15, 2024.
(Continued)

*Primary Examiner* — Donnell A Long

(57) ABSTRACT

According to one aspect of the disclosure, a bulk material handling method includes receiving bulk material on a first level of a system at receiving stations equipped with dust control filtration equipment, pneumatically conveying the bulk material up to a third level into bulk material storage hoppers, storing the bulk material, dispensing the stored bulk material to a bulk material transporter on the first level, including dosing the stored bulk material to an interior of a bulk material dosing hopper to create a bulk material dose, docking the dosing hopper with the transporter via a docking apparatus, and releasing the dose into the interior of the transporter, through a reduced pressure region in an internal volume of the docking apparatus. Other disclosed aspects include a related system, subsystems, and apparatuses.

28 Claims, 37 Drawing Sheets

(51) Int. Cl.
  *B01D 29/90* (2006.01)
  *B01D 35/157* (2006.01)
  *B65D 88/32* (2006.01)
  *B65D 88/54* (2006.01)
  *B65G 3/04* (2006.01)
  *B65G 69/18* (2006.01)
  *G01G 13/00* (2006.01)

(52) U.S. Cl.
  CPC ......... *B01D 35/1573* (2013.01); *B65D 88/32* (2013.01); *B65D 88/548* (2013.01); *B65G 3/04* (2013.01); *B65G 69/18* (2013.01); *G01G 13/006* (2013.01); *B65G 2201/042* (2013.01)

(56) References Cited

U.S. PATENT DOCUMENTS

| | | |
|---|---|---|
| 9,688,178 B2 | 6/2017 | Pham |
| 9,752,389 B2 | 9/2017 | Pham et al. |
| 9,776,813 B2 | 10/2017 | McMahon |
| 9,862,538 B2 | 1/2018 | Pham et al. |
| 9,930,837 B2 | 4/2018 | Rowling |
| 9,938,093 B2 | 4/2018 | Sherwood et al. |
| 10,059,535 B2 | 8/2018 | Herman et al. |
| 10,077,610 B2 | 9/2018 | Pham et al. |
| 10,442,614 B2 | 10/2019 | Lucas et al. |
| 10,526,136 B2 | 1/2020 | Hawkins et al. |
| 10,569,242 B2 | 2/2020 | Stegemoeller et al. |
| 2010/0193077 A1 | 8/2010 | Nelson et al. |
| 2010/0229980 A1 | 9/2010 | Achenbach et al. |
| 2010/0233772 A1 | 9/2010 | Achenbach et al. |
| 2014/0041322 A1 | 2/2014 | Pham et al. |
| 2014/0044508 A1 | 2/2014 | Luharuka et al. |
| 2015/0044004 A1 | 2/2015 | Pham et al. |
| 2015/0191304 A1 | 7/2015 | Herman et al. |
| 2015/0368039 A1 | 12/2015 | Cochrum et al. |
| 2016/0251152 A1 | 9/2016 | Krupa |
| 2016/0297605 A1 | 10/2016 | Lopez |
| 2019/0023484 A1 | 1/2019 | Shin |
| 2019/0106273 A1 | 4/2019 | Hess et al. |
| 2019/0119038 A1 | 4/2019 | Komelsen et al. |
| 2019/0217258 A1 | 7/2019 | Bishop |
| 2019/0241356 A1 | 8/2019 | Schaffner et al. |
| 2019/0256281 A1 | 8/2019 | Cochrum et al. |
| 2020/0199990 A1 | 6/2020 | Friesen |

FOREIGN PATENT DOCUMENTS

| | | | | |
|---|---|---|---|---|
| DE | 3837608 A1 | | 5/1989 | |
| KR | 102507348 | * | 3/2023 | ....... B65G 2201/042 |
| WO | WO02/100741 A1 | | 12/2002 | |
| WO | WO2019072992 A1 | | 4/2019 | |

OTHER PUBLICATIONS

PCT Invitation to Pay Additional Fees,PCT Int.Serial No. PCT/US2021/053259, Int. Filing Date: Oct. 1, 2021, Applicant: Owens-Brockway Glass Container Inc. Date:May 19, 2022.

European Office Action, Application No. 21 867 876.1-1014, Applicant: Owens-Brockway Glass Container Inc., Dated: Aug. 5, 2024.

* cited by examiner

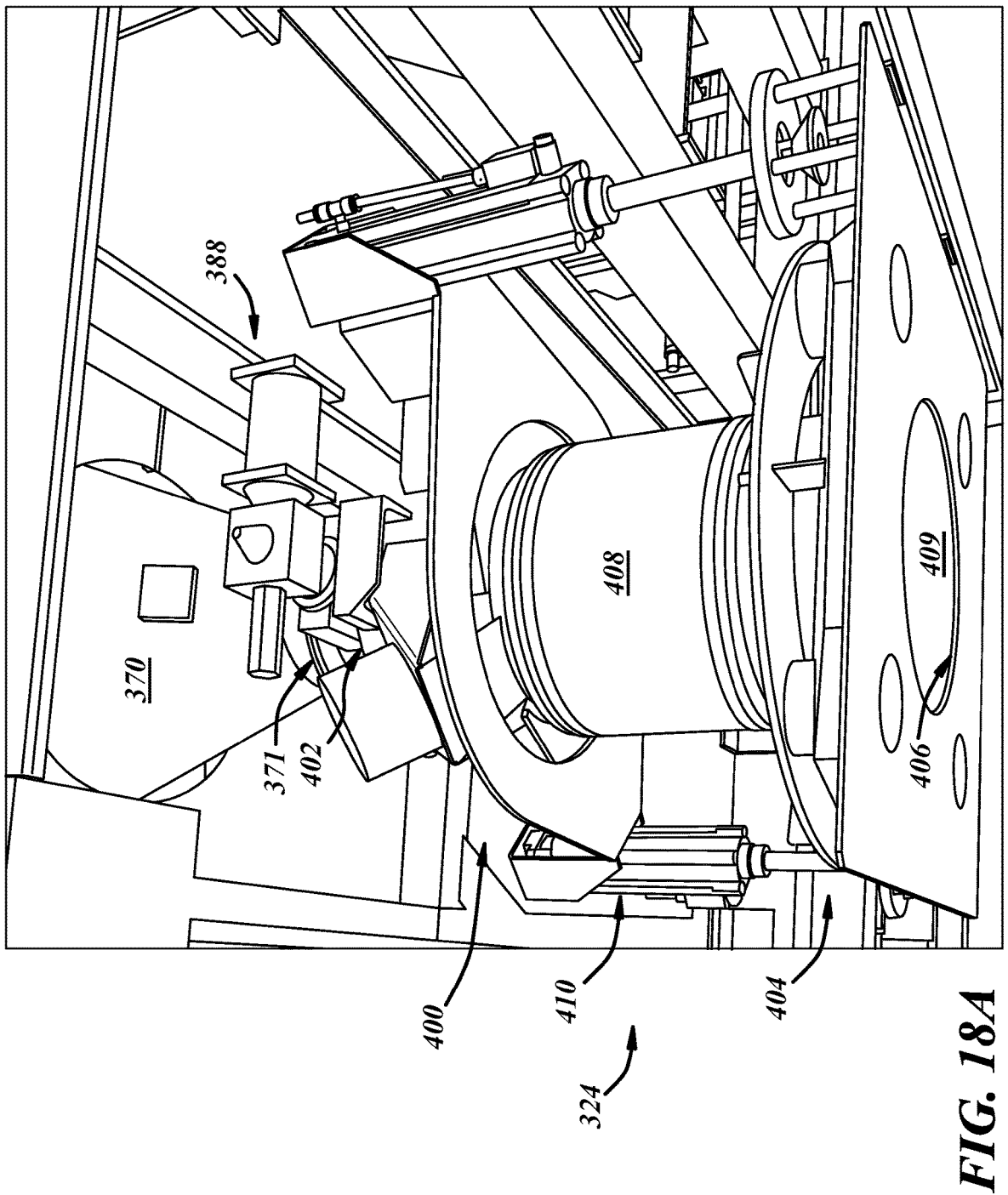

BULK MATERIAL RECEIVING, CONVEYING, STORING, AND DISPENSING

TECHNICAL FIELD

This patent application discloses innovations to material handling and, more particularly, to bulk material handling including receiving, conveying, storing, and dispensing of bulk materials.

BACKGROUND

A conventional glass "batch house" includes a custom architectural installation specifically designed for glass manufacturing, and a glass batch handling system supported and sheltered by the architectural installation. The batch house is generally configured to receive and store glass feedstock, or "glass batch" materials, including glassmaking raw materials, for example, sand, soda ash, and limestone, and also including cullet in the form of recycled, scrap, or waste glass. The conventional glass batch house requires a specialized, dedicated, and permanent architectural installation including a tall building and a covered unloading platform and pit to receive glass batch from underneath railcars or trucks that arrive loaded with glass batch materials. The batch house also includes multi-story silos to store the glass batch, and glass batch elevators and conveyors to move the glass batch from unloading systems at a bottom of the pit to tops of the silos. The batch house further includes cullet pads at ground level to receive and store cullet, crushers to crush cullet to a size suitable for melting, and cullet elevators and conveyors to move crushed cullet to one of the silos in the batch house. The batch house additionally includes a mixer to mix the glass batch received from the silos, conveyors integrated with scales to weigh and deliver each glass batch material from the silos to the mixer, mixer conveyors to move the glass batch from the mixers to the hot-end subsystem, and dust collectors to collect dust from the various equipment. The installation occupies a large footprint and a large volumetric envelope, takes about one to two years to construct, cannot be relocated from one location to another, and tends to be a dusty and dirty environment.

SUMMARY OF THE DISCLOSURE

The present disclosure embodies a number of aspects that can be implemented separately from or in combination with each other.

According to one aspect of the disclosure, a bulk material handling method includes receiving bulk material on a first level of a system at receiving stations equipped with dust control filtration equipment, pneumatically conveying the bulk material up to a third level into bulk material storage hoppers, storing the bulk material, dispensing the stored bulk material to a bulk material transporter on the first level, including dosing the stored bulk material to an interior of a bulk material dosing hopper to create a bulk material dose, docking the dosing hopper with the transporter via a docking apparatus, and releasing the dose into the interior of the transporter, through a reduced pressure region in an internal volume of the docking apparatus. Other disclosed aspects include a related system, subsystems, and apparatuses.

BRIEF DESCRIPTION OF THE DRAWINGS

FIG. 18A is an enlarged, fragmentary, lower perspective view of a docking apparatus of the bulk material dispensing modules of FIGS. 17A-F.

DETAILED DESCRIPTION

In general, a new bulk material handling system is illustrated and described with reference to a glass feedstock handling system for a glass container factory as an example. Those of ordinary skill in the art would recognize that other glass factories, for example, for producing glass fibers, glass display screens, architectural glass, vehicle glass, or any other glass products, share many aspects with a glass container factory. Accordingly, the presently disclosed and claimed subject matter is not necessarily limited to glass containers, glass container feedstock handling systems, and glass container factories and, instead, encompasses any glass products, glass product feedstock handling systems, and glass product factories. Moreover, the presently disclosed and claimed subject matter is not necessarily limited to bulk material handling for the glass industry and, instead, encompasses any products, bulk material handling systems, and factories in any industry in which bulk material handling is useful.

Although conventional glass batch houses and methods enable efficient production of high-quality products for large-scale production runs, the presently disclosed subject matter facilitates implementation of a revolutionary bulk material handling system that is simpler than a conventional batch house, is modular and mobile, and is more compact and economical at least for smaller scale production runs or incremental additions to existing large-scale production runs. More specifically, in accordance with an aspect of the present disclosure, a new bulk material system may include prefabricated modular equipment configurations to facilitate rapid and mobile production capacity expansion in smaller increments and at lower capital cost than conventional glass batch houses, and also may include techniques for handling bulk material in a dust-free or reduced dust manner. Further, the new system may omit one or more conventional glass batch house subsystems or aspects thereof, as described in further detail below.

Figure 1A:
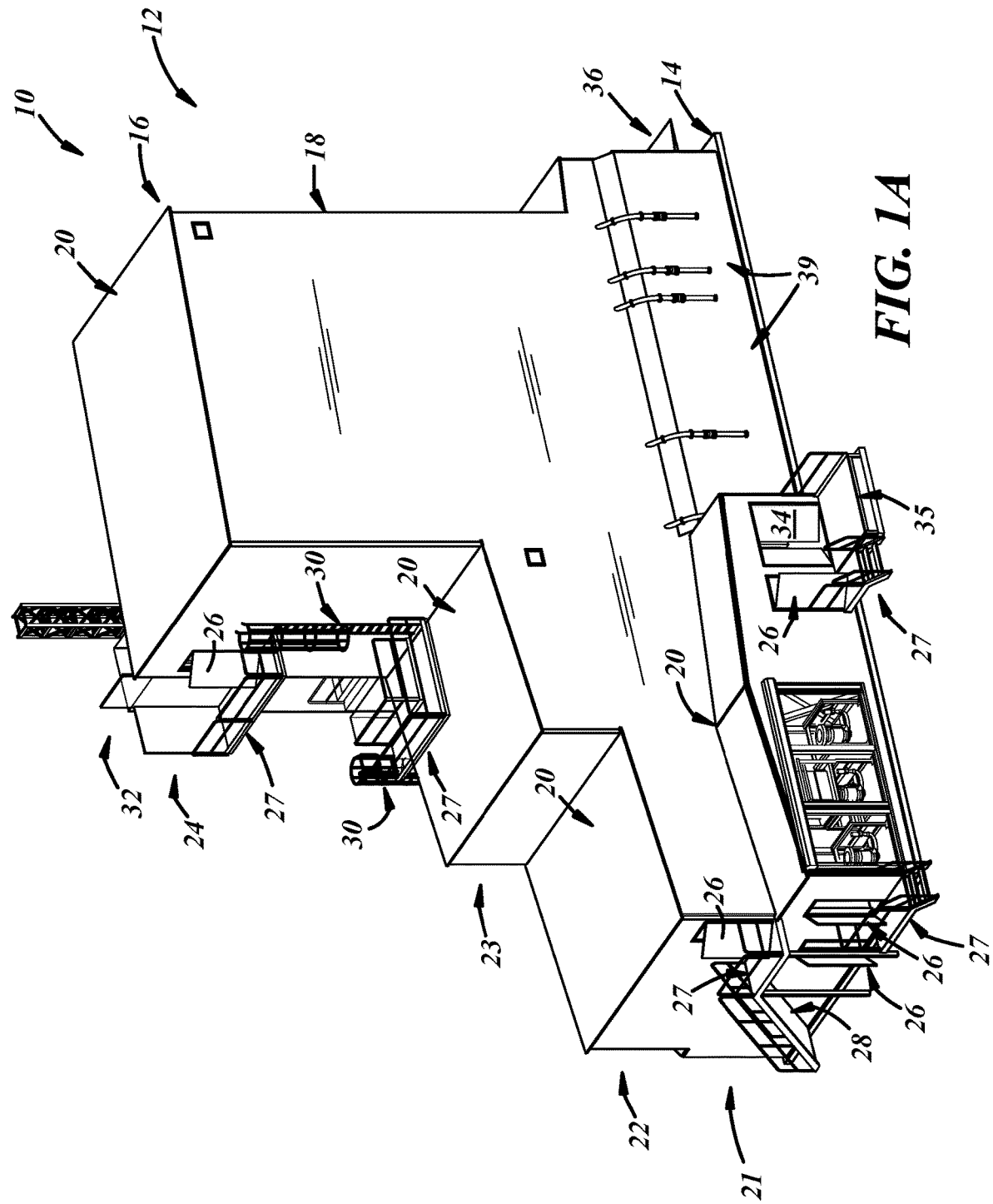
FIG. 1A is a perspective view of a bulk material handling system in accordance with an illustrative embodiment of the present disclosure, illustrating a building having a roof, cladding, elevator, stairs, ladders, and platforms.
Figure 1B:
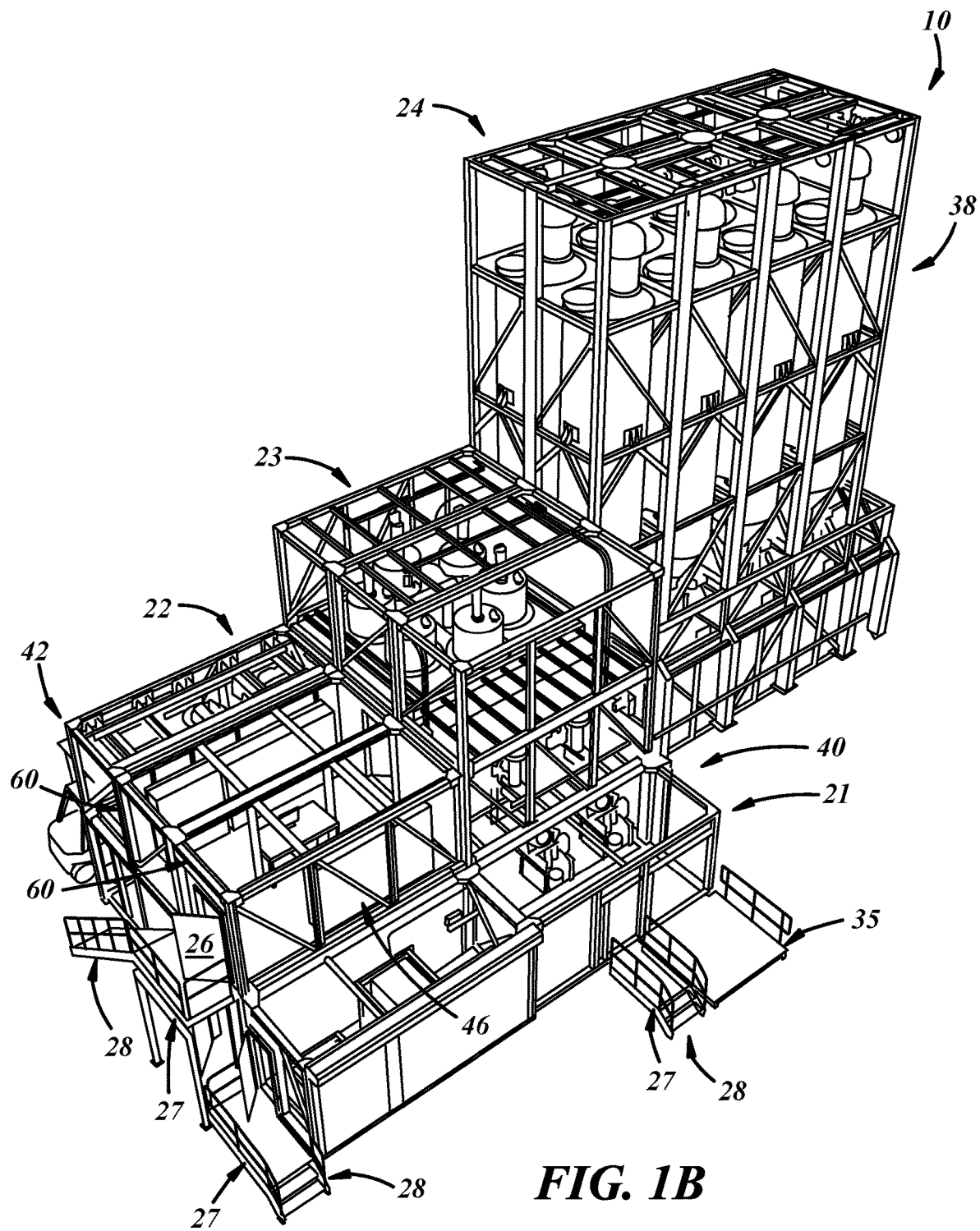
FIG. 1B is another perspective view of the system corresponding to FIG. 1A, without the roof, cladding, elevator, and ladders.
Figure 2A:
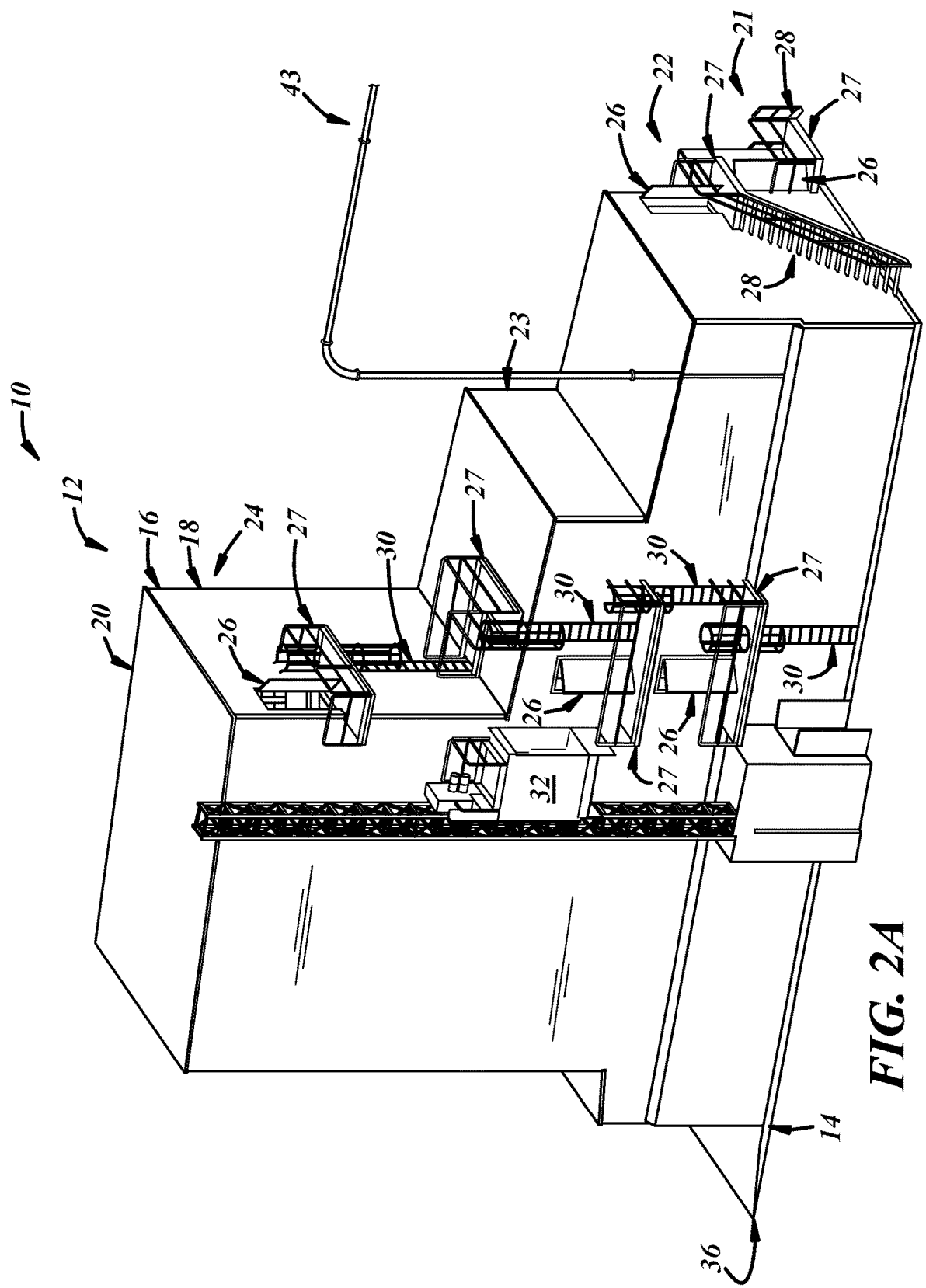
FIG. 2A is a different perspective view of the system of FIG. 1A, illustrating the building with the roof, cladding, elevator, stairs, ladders, and platforms.
Figure 2B:
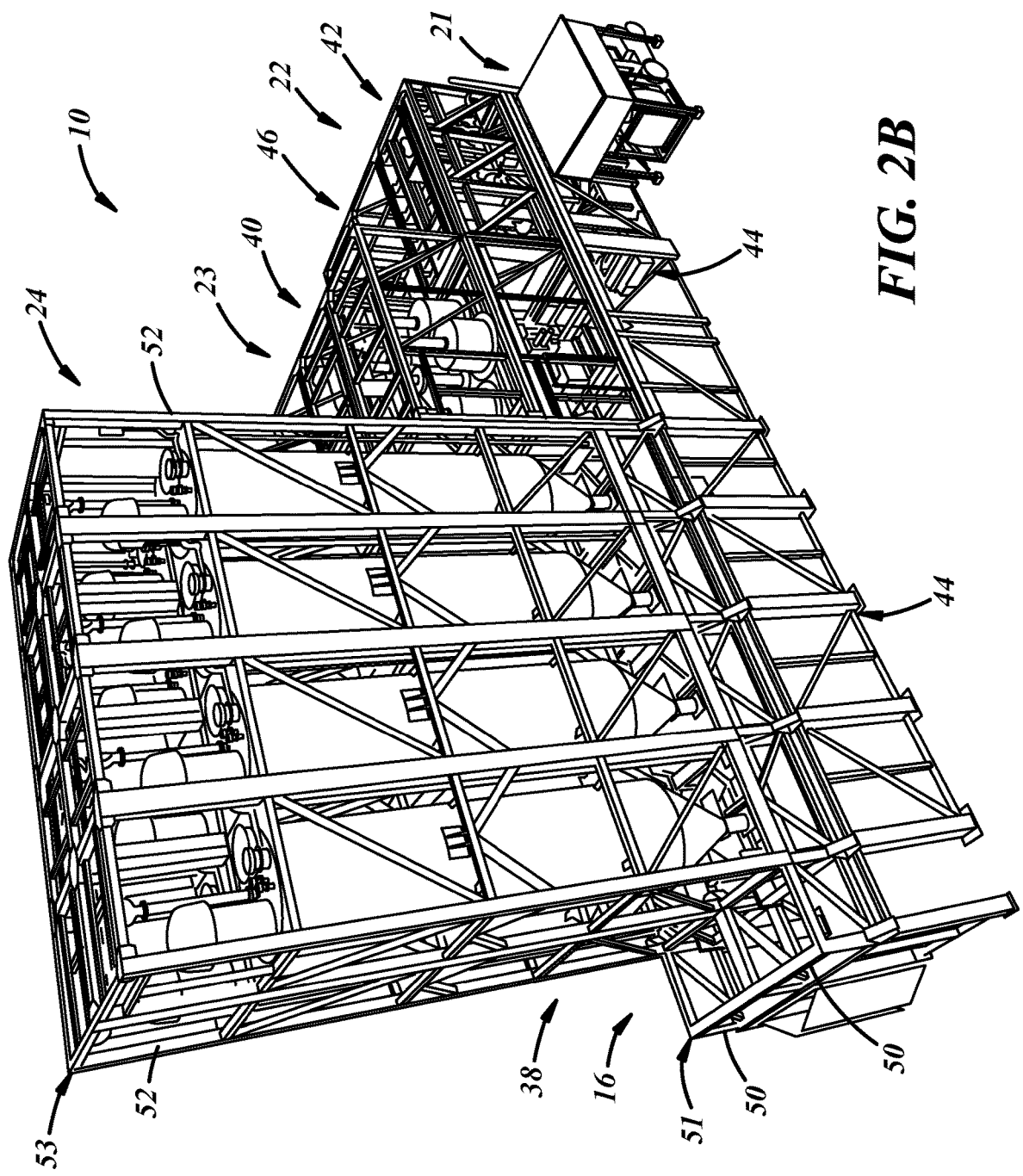
FIG. 2B is another perspective view of the system corresponding to FIG. 2A, without the roof, cladding, elevator, and ladders.
Figure 3:
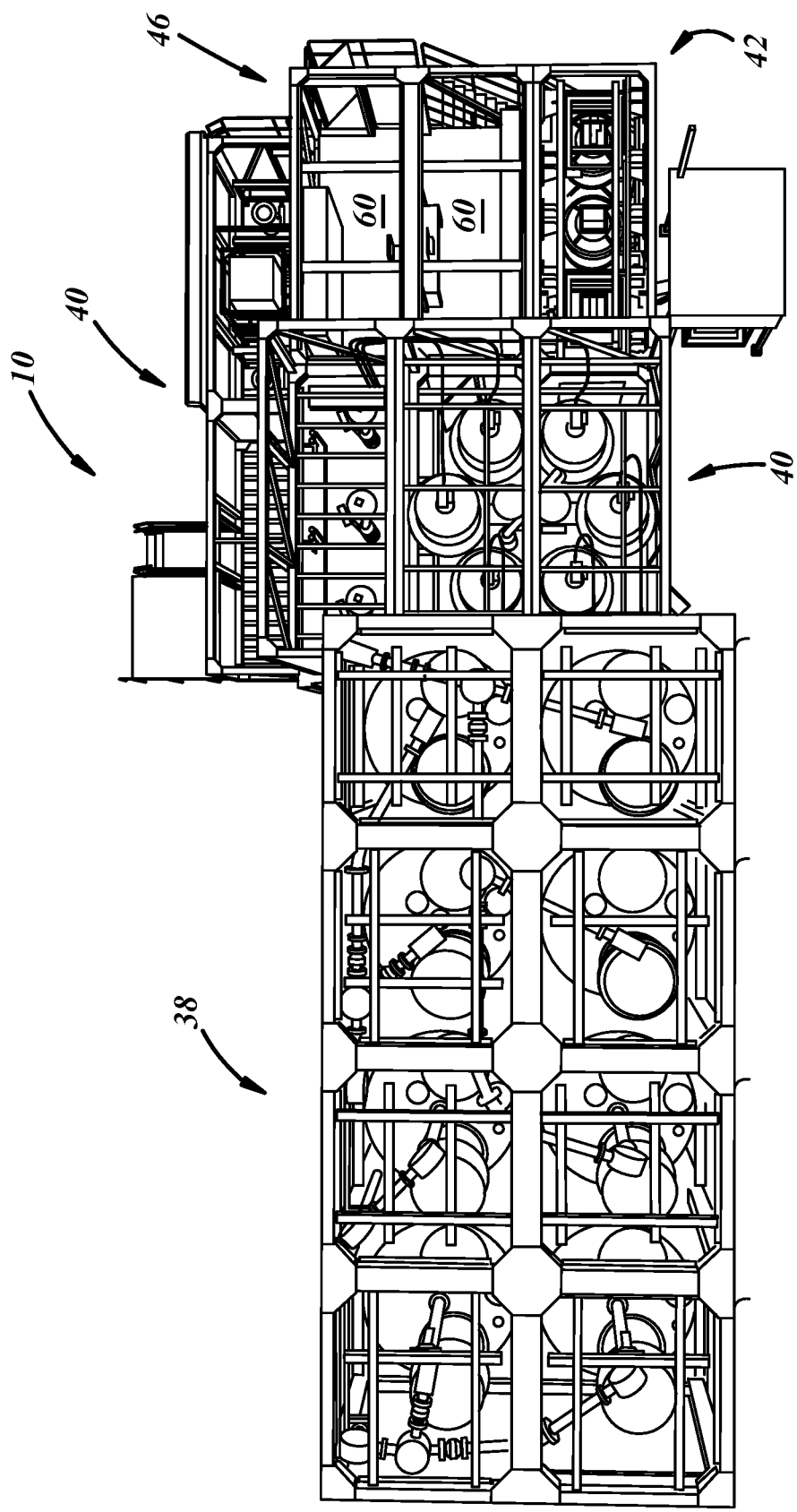
FIG. 3 is a top view of the system of FIG. 1A.
Figure 4:
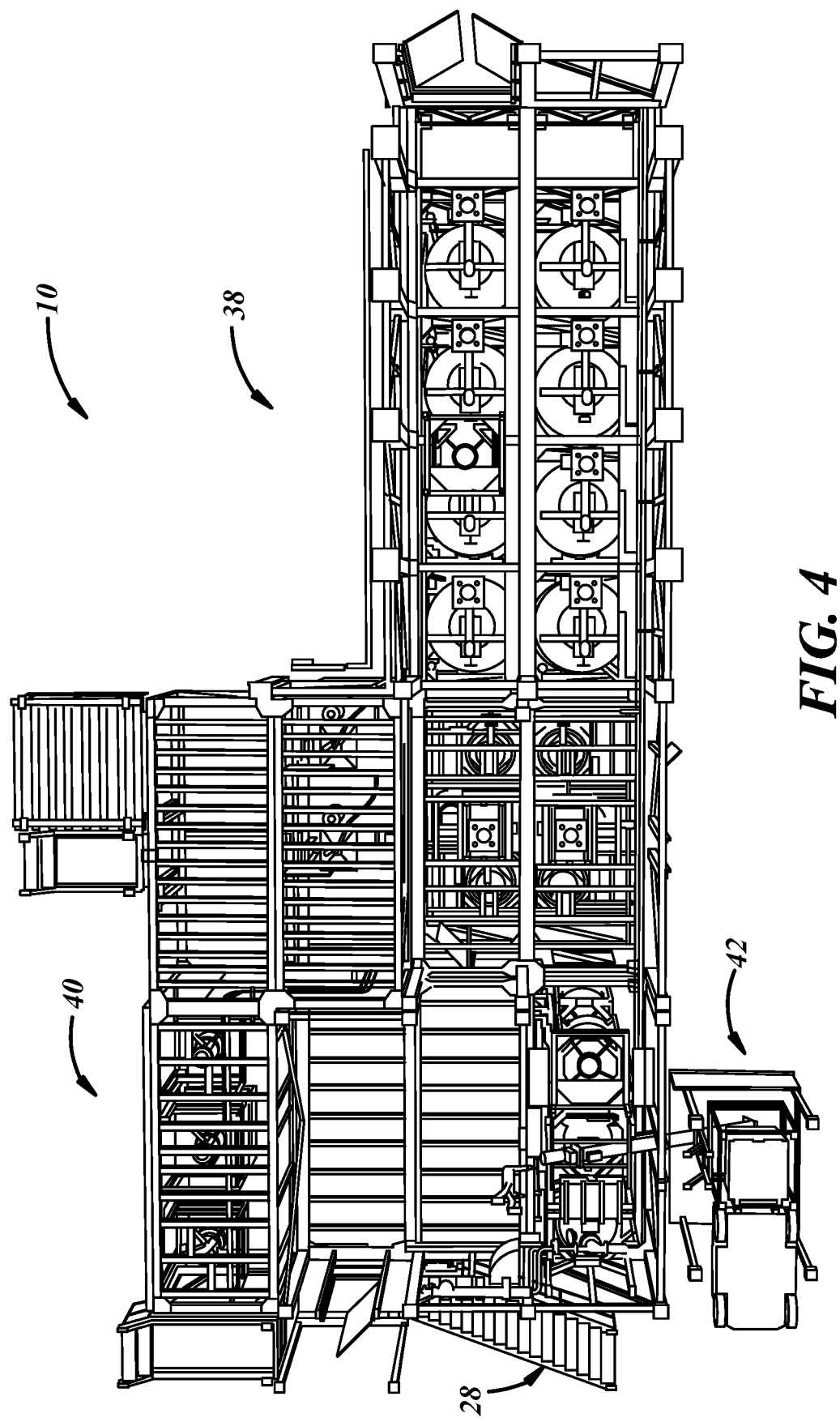
FIG. 4 is a bottom view of the system of FIG. 1A.
Figure 5:
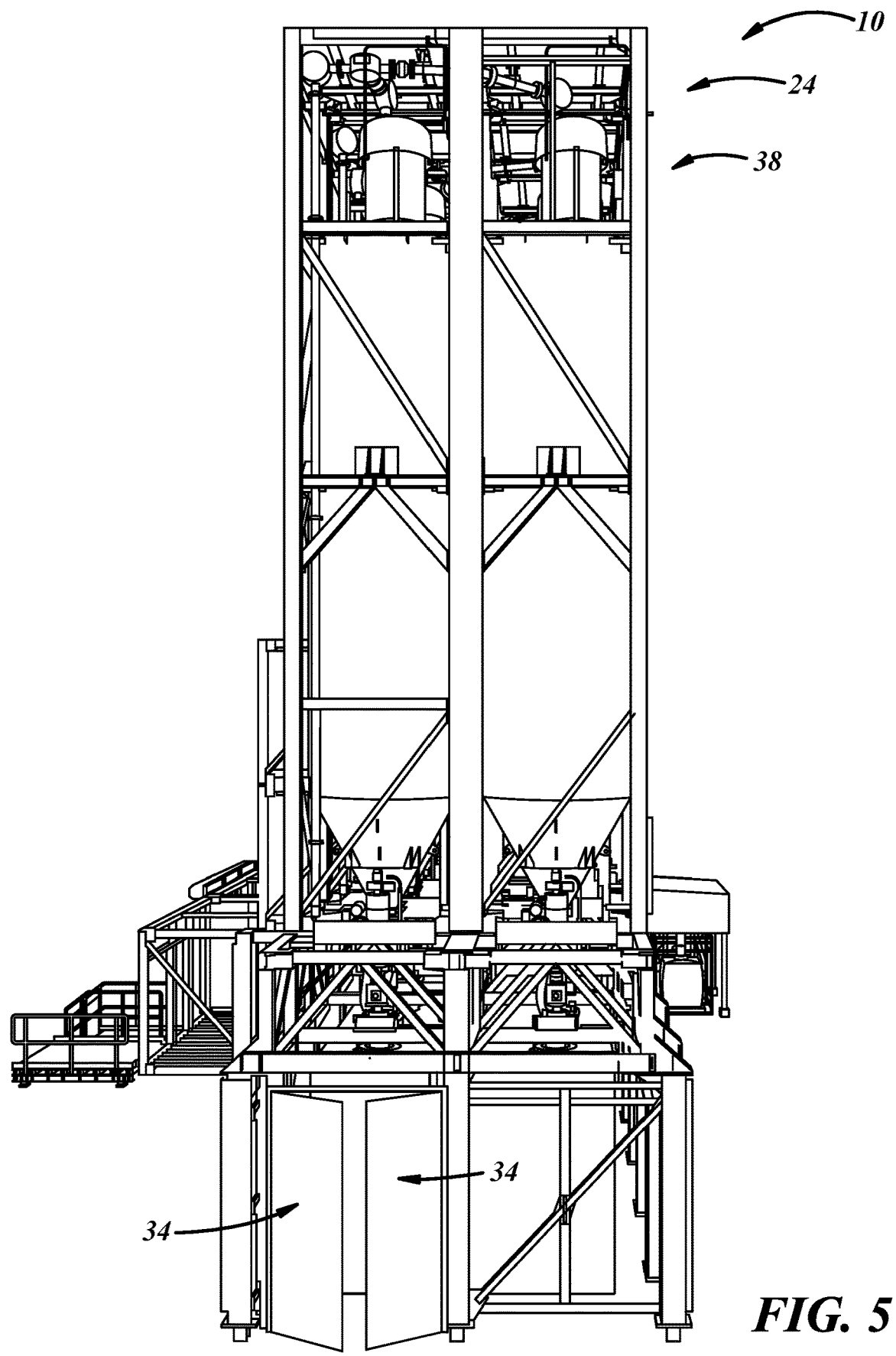
FIG. 5 is an upstream end view of the system of FIG. 1A.
Figure 6:
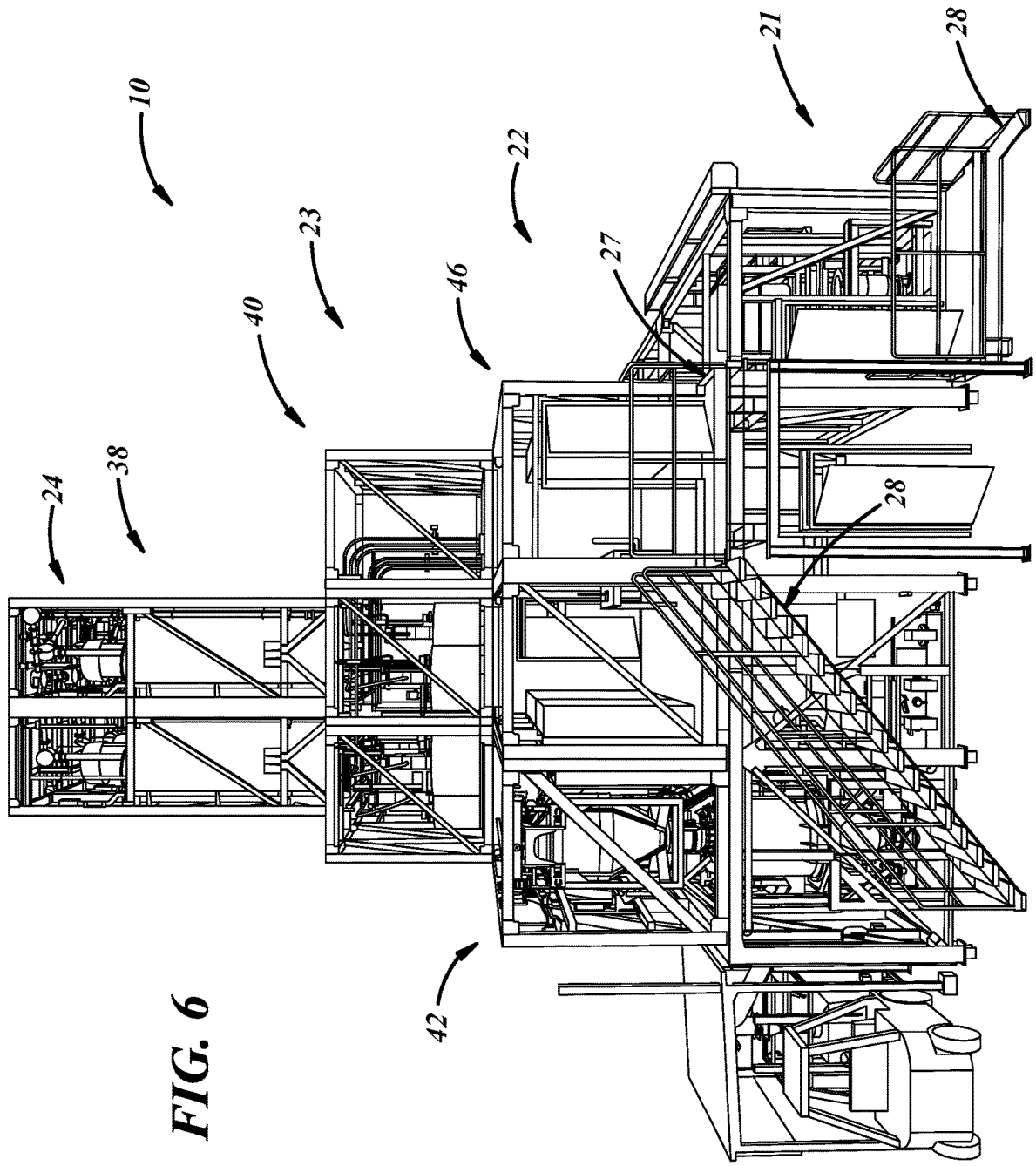
FIG. 6 is a downstream end view of the system of FIG. 1A opposite that of FIG. 5.
Figure 7:
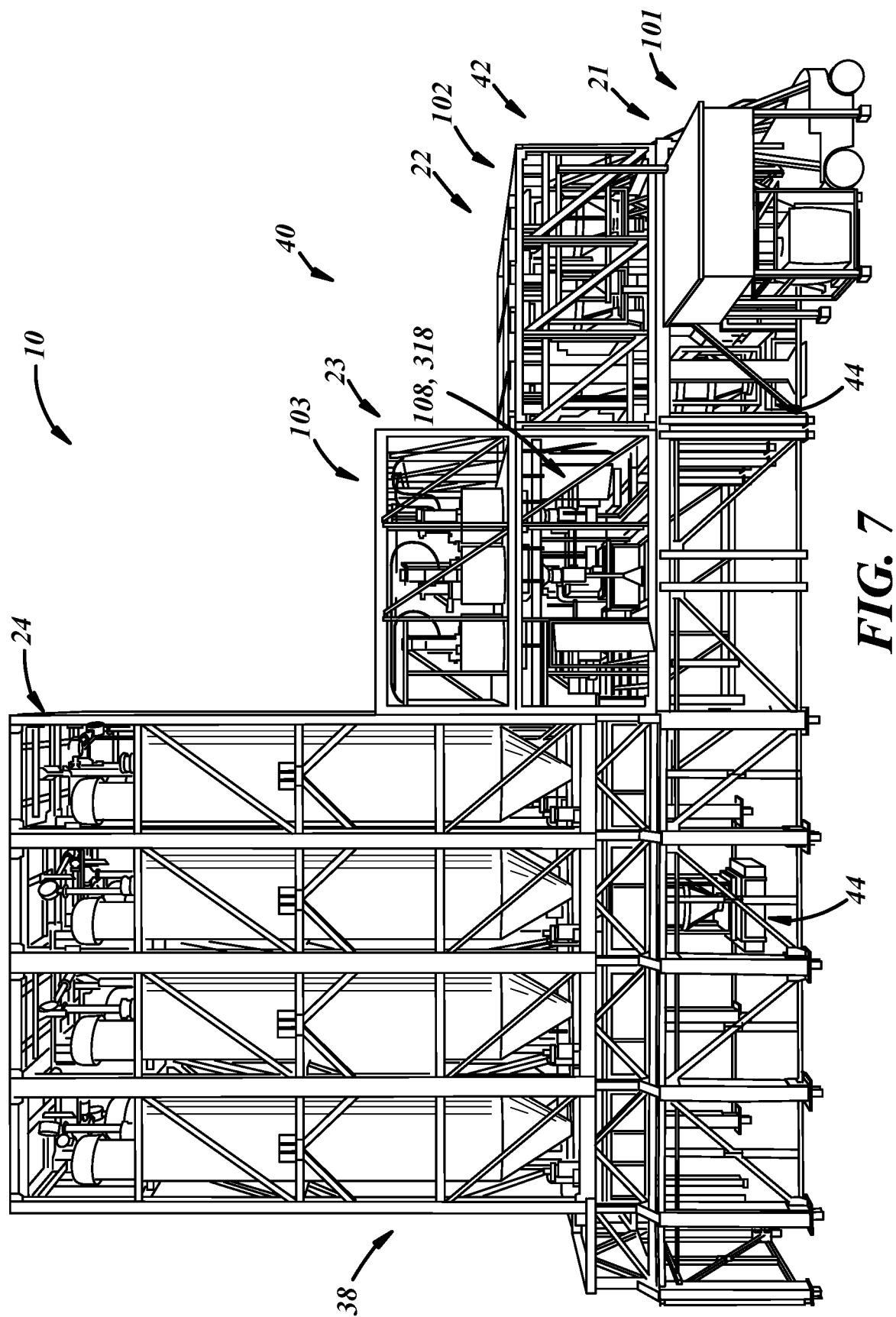
FIG. 7 is a side view of the system of FIG. 1A.

With specific reference now to FIGS. 1A and 2A, a new bulk material handling system 10 includes a new architectural installation 12 and new subsystems and equipment supported and sheltered by the installation 12. The installation 12 includes a concrete foundation 14 having a floor which may include, for example, a four to six-inch-thick slab, and a bulk material handling building 16 on the foundation including walls 18 and a roof 20. The installation 12 requires no basement and no pit below the floor, such that the concrete foundation has earthen material directly underneath, wherein the foundation slab establishes the floor. As used herein, the term "pit" includes an elevator pit, conveyor pit, loading pit, and the like, located below grade or below ground level and that may require excavation of earthen material. As used herein, the term "basement" includes the lowest habitable level of the bulk material handling building below a floor of the building and can include a first level or a below grade or below ground level portion that may require excavation of earthen material.

The installation 12 also includes multiple habitable levels, including a base or first level 21, an intermediate or second level 22, an upper or third level 23, and an attic or fourth level 24. Also, as used herein, the term "habitable" means that there is standing room for an adult human in the particular space involved and there is some means of ingress/egress to/from the space while walking such as a doorway, stairway, and/or the like. The installation 12 further includes egress doors 26, egress platforms 27, stairs 28, ladders 30, and an elevator 32 to facilitate access to the egress platforms 27 and doors 26. The installation 12 additionally includes loading doors 34 and loading platforms 35 and one or more ramps 36. Notably, the building 16 is constructed of many modules, including modular walls used to construct a base frame for the first level, and modular frames (not shown) for the second, third, and fourth levels, as will be discussed in detail below.

With reference now to FIGS. 2A through 8, the bulk material handling system 10 includes several subsystems that occupy a volumetric envelope much smaller than conventional batch houses such that the system 10 likewise requires a smaller volumetric envelope than conventional glass batch houses. The bulk material handling system 10 may be a glass bulk material handling system configured to receive and store glass feedstock or "glass batch." The glass batch includes glassmaking raw materials, including glass feedstock "majors" and "minors" and also may include cullet in the form of recycled, scrap, or waste glass. The bulk material handling system receives glass batch bulk materials and combines them into doses and provides the doses to a downstream hot-end system of a glass factory adjacent to or part of the bulk material handling system.

The bulk material handling system 10 includes one or more of the following subsystems. A first bulk material, or majors, subsystem 38 is configured to receive, pneumatically convey, store, and gravity dispense majors bulk material. Glassmaking majors may include sand, soda, limestone, alumina, saltcake, and, in some cases, dust recovery material. Similarly, a second bulk material, or minors, subsystem 40 is configured to receive, pneumatically convey, and store minors bulk material from individual bulk material bags. Glassmaking minors may include selenium, cobalt oxide, magnesium, potassium, sulfur, chromium, iron, copper, tin, bismuth, carbon, and/or the like, and/or any other colorants, decolorants, fining agents, and/or other minors materials suitable for glassmaking. A bulk material discharging subsystem 54 is configured to receive bulk material from the majors and minors subsystems 38, 40 and transmit the bulk material to downstream bulk material processing equipment, for example, a glass melting furnace (not shown) separate from and downstream of the bulk material handling system 10. A bulk material transfer or transport subsystem 44 is configured to receive bulk material from the majors and minors subsystems 38, 40, and transport the bulk material within, to, and from, the majors and minors subsystems 38, 40, and to and from the discharge subsystem 42.

A controls subsystem 46 is in communication with various equipment of one or more of the other subsystems 38, 40, 42, 44, and is configured to control various aspects of the system 10. Those of ordinary skill in the art would recognize that the system 10 can be supplied with utility or plant electrical power, and can include computers, sensors, actuators, electrical wiring, and the like to power and communicate different parts of the system 10 together. Likewise, the system 10 can be supplied with plant or compressor pneumatic power/pressure, and can include valves, lubricators, regulators, conduit, and other like pneumatic components to pressurize and communicate different parts of the system 10 together.

The system 10 may be pneumatically closed, from pneumatic input or receiving conduit 39 (FIG. 1A) of the majors subsystem 38 to pneumatic output or transmitting conduit 43 (FIG. 2A) of the discharging subsystem 54. The pneumatic receiving conduit 39 may extend through one or more walls of the building for accessibility to bulk transporters, e.g., trucks or rail cars, that bring bulk materials and that may have pressurized vessels to assist with pneumatic receiving and conveying of bulk material. The receiving conduit 39 has any suitable couplings for coupling to bulk transporters in a pneumatically sealed manner, wherein the bulk transporters may have pumps, valves, and/or other equipment suitable to pressurize the receiving conduit to push bulk material into the majors subsystem 38, and/or the batch handling system 10 itself may include pumps, valves, pressurized plant air plumbing, and/or other equipment suitable to apply positive and/or negative (vacuum) pressure to the input conduit to push and/or pull bulk material into the majors and minors subsystems 38, 40. Similarly, the transmitting conduit 43 may extend through one or more walls or the roof of the building for transmission to downstream bulk material processing equipment, for instance, in a hot end subsystem of a glass manufacturing system (not shown). For example, the transmitting conduit 43 is pneumatically sealingly coupled to a receiver hopper at a glass melter in the hot end subsystem. The conduit 43 may have any suitable couplings for coupling to the receiver hopper in a pneumatically sealed manner. Therefore, those of ordinary skill in the art would recognize that the bulk material handling system is pneumatically closed between the pneumatic receiving conduit and the pneumatic transmitting conduit. This is in contrast to conventional systems where bulk material is open to the surrounding environment. The phrase "pneumatically closed" means that the path, and the bulk materials following that path, from receiving conduit to transmitting conduit is/are enclosed, and not openly exposed to the surrounding environment, although not necessarily always sealed airtight.

Figure 9A:
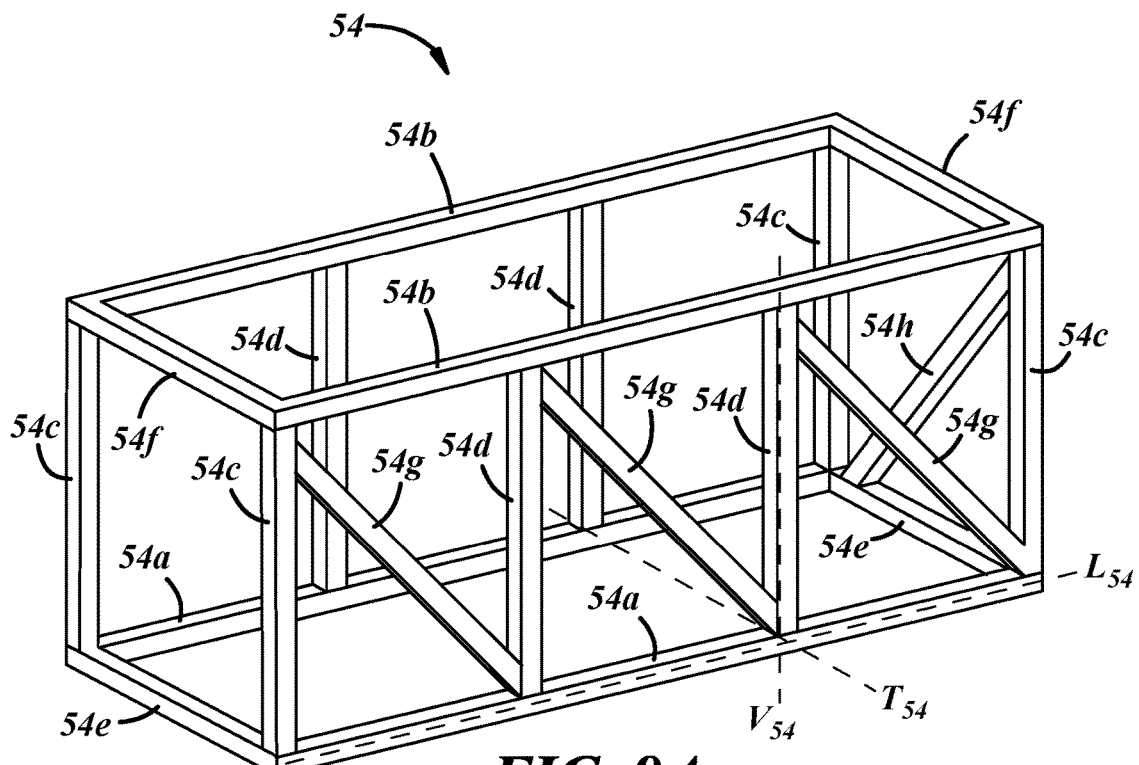
FIG. 9A is a perspective view of a modular frame of the system of FIG. 1A.
Figure 9B:
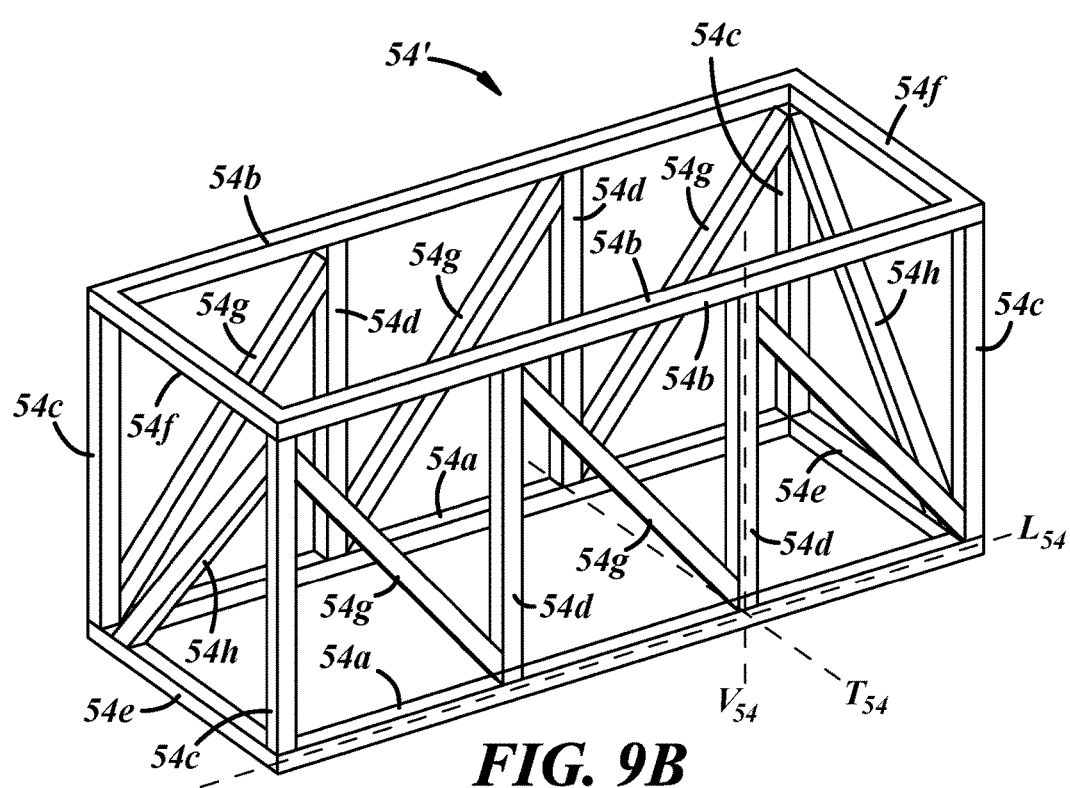
FIG. 9B is a perspective view of another modular frame of the system of FIG. 1A.

With reference now to FIG. 9A, a representative horizontal or multi-purpose modular frame 54 is constructed as a rectangular box truss, having a longitudinal axis L, a transverse or lateral axis T, and a vertical axis V, including lower beams 54a extending longitudinally and being laterally opposed from one another, and including upper beams 54b extending longitudinally and being laterally opposed from one another. The frame 54 also includes posts 54c,d extending vertically between the lower and upper beams 54a,b. The posts 54c may include corner posts 54c extending vertically between ends of the lower and upper beams 54a,b, and intermediate posts 54d extending vertically between intermediate portions of the lower and upper beams 54a,b between the ends thereof. The frame 54 also includes lower end cross-members 54e extending laterally between the lower beams 54a, and upper end cross-members 54f extending laterally between the upper beams 54b. Although not shown, the frame 54 also may include lower intermediate cross-members extending between intermediate portions of the lower beams 54a between the ends thereof. The frame 54 may also include one or more struts 54g,h extending obliquely between the lower and upper beams 54a,b, for example, side struts 54g extending between lower and upper beams 54a,b on opposite lateral sides of the frame 54 and may be coupled to the beams 54a,b and/or posts 54c,d, and/or may include end struts 54h extending between lower and upper end cross-members 54e,f on one or both longitudinal ends of the frame 54. With reference to FIG. 9B, another multi-purpose modular frame 54' may be arranged to add struts 54g,h such that the quantity and arrangement of struts 54g,h may be configured for particular application locations for example, where earthquake, high winds, and/or snow are prevalent.

Figure 10:
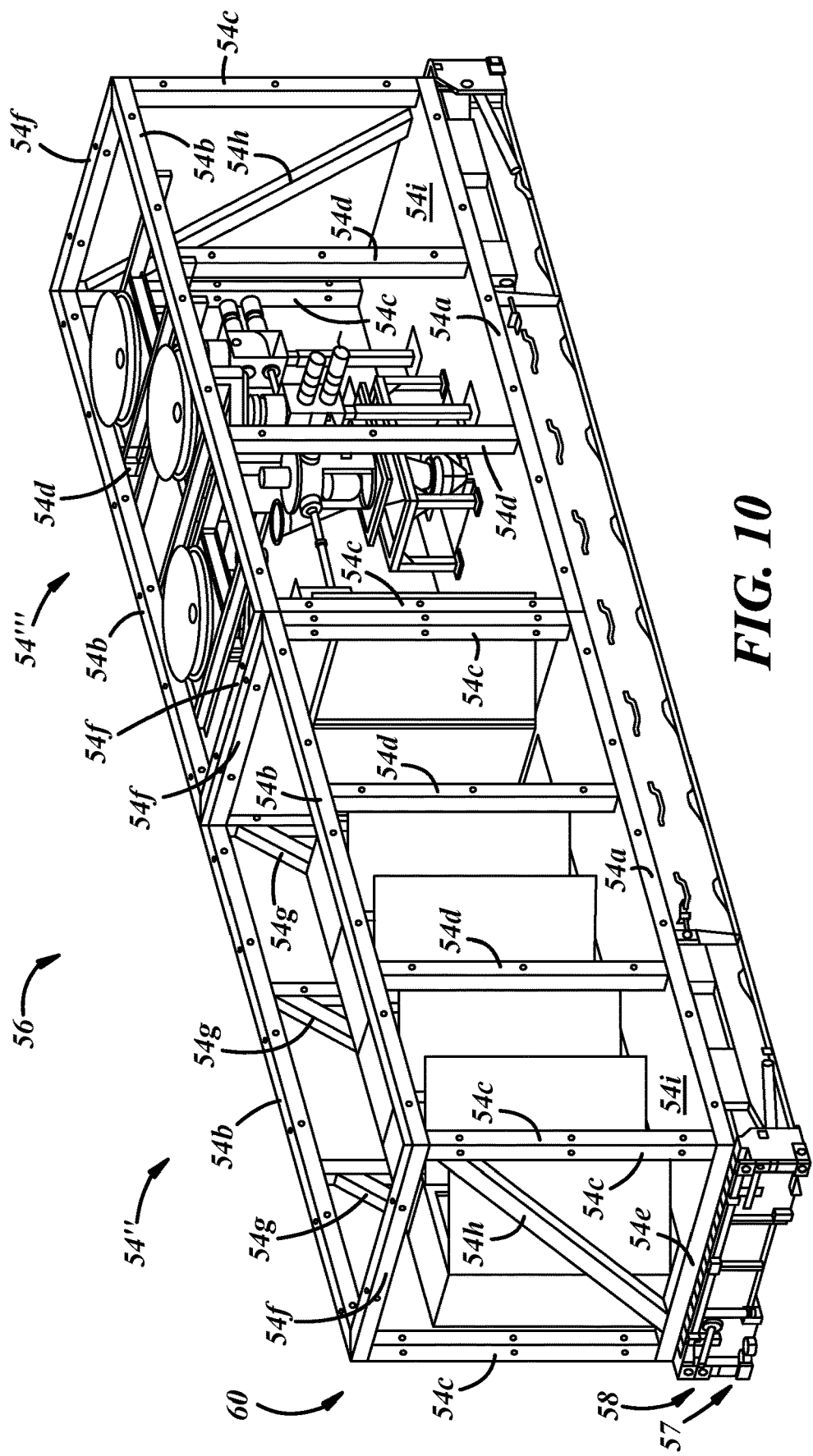
FIG. 10 is a perspective view of a rack carrying additional modular frames, and equipment carried by the modular frames, of the system of FIG. 1A.

With reference now to FIG. 10, any two of several multi-purpose modular frames 54", 54''' and the other modular frames 54, 54' (FIGS. 9A-B) disclosed herein may share common exterior dimensions such that at least two of the frames 54, 54', 54", 54''' can be carried together on a common pallet, and can be easily aligned with one another to facilitate positioning and assembling them together on site. In fact, many of the modular frames 54, 54', 54", 54''' may share identical exterior dimensions and may be intramodular and intermodular, such that each of the different types of modular frames 54, 54', 54", 54''' are modular amongst their own kind and are additionally modular across different kinds. The intramodularity of the modular frames 54, 54', 54", 54''' is by virtue of dimensions of respective frames being identical among their own kind. The intermodularity of the modular frames 54, 54', 54", 54''' is by virtue of certain dimensions of the frames being the same. For example, some frames may have identical height and width, but different lengths.

FIG. 10 illustrates modules 56 including the modular frames 54", 54''' that can be shipped on a standard seagoing flat rack 57 like a Mafi trailer or the like to constitute a rack and module assembly 58. On trucks, the modular frames 54", 54''' (shipped as modules with equipment carried by the modular frames) are designed to be self-supporting and may be wrapped in plastic foil or sheet or truck tarpaulins (not shown) to seal against dust, dirt, and sea water/air, and bottoms and tops may be covered with planks or sheets (not shown) of wood, metal, or plastic to protect the equipment in the modules 56. On ships, the modules 56 may be placed on the rack 57 and rolled onto a roll on/roll off ship at a departure seaport and, at an arrival sea port, the rack 57 is rolled off the ship and the modules 56 are placed on a truck. Accordingly, the modules 56 can be placed in a closed belly of the ship and not be exposed to sea water. The frames 54", 54''' also may include one or more platforms 54*i* carried on the lower beams 54*a* and the lower cross-members 54*e* to establish a floor. The platform may be constructed from a single panel or multiple panels.

With reference again to FIGS. 7 and 8, the minors system 40 is provided for handling glass feedstock minors. In general, the minors system 40 occupies portions of the first three levels 21, 22, 23 of the system 10, including a base or first minors level 101 having minors receiving equipment 104, an upper or third minors level 103 having minors storing equipment 106, and an intermediate or second minors level 102 having minors dispensing equipment 108, as will be discussed in further detail below. All three levels are habitable and accessible via doors, and via stairs or ladders where applicable.

Figure 8:
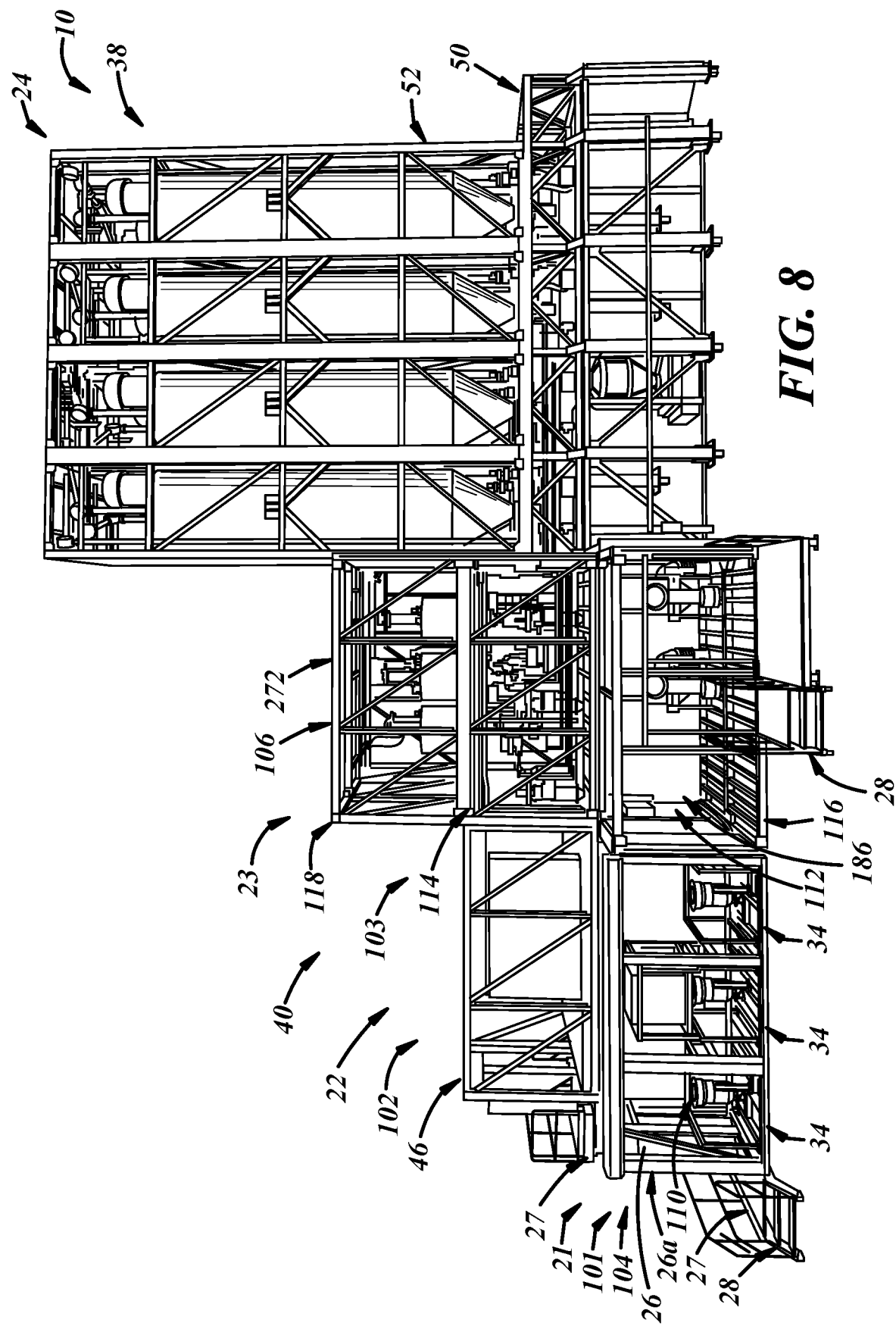
FIG. 8 is another side view of the system of FIG. 1A opposite that of FIG. 7.

With reference specifically to FIG. 8, the minors receiving equipment 104 includes a large container receiving module 110, a small container receiving module 112, a small container filtration module 114, a vestibule module 116, and an auxiliary module 118. The large container receiving module 110 is provided for receiving larger quantities of the minors, for example, carbon, saltcake, filter dust, iron chromite, and/or tube scale, via flexible intermediate bulk containers or "big bags" that may range in size from 28"×28"×12" to 51"×51"×71" (filled dimensions) and may contain up to 4000 lbs of material, for example. The small container receiving module 112 is provided for receiving smaller quantities of the minors, for example, selenium and cobalt oxide, via bulk totes or "small bags" that may range in size from 6"×4" to 18" to 13" and may contain up to 25 kg (55 lbs) of material, for example. The small container filtration module 114 is provided for filtering air displaced when small containers are unloaded and small minors are received, as will be discussed in greater detail below. The vestibule module 116 is provided to accommodate arrival and receiving of small minors to the small container receiving module 112, and includes a frame 54 equipped with doorways, and is also equipped with a human access door (not shown) and a pallet access door (not shown), and is coupled to a human access staired platform at the human access door and a pallet access platform at the pallet access door.

Figure 11A:
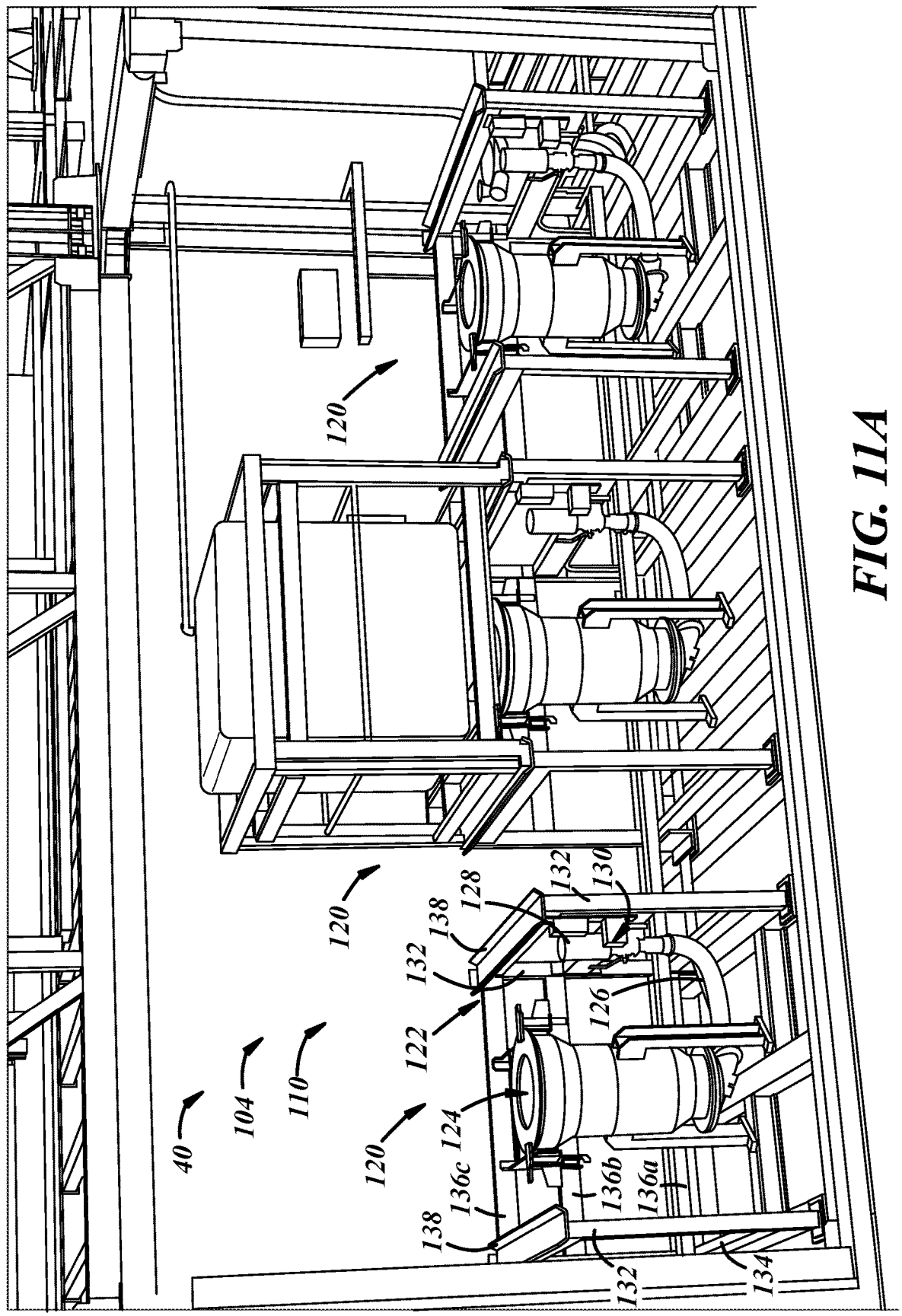
FIG. 11A is an enlarged, fragmentary, perspective view of a large container receiving module of the system of FIG. 1.

With reference now to FIG. 11A, the large container receiving module 110 includes one of the modular frames 54, and one or more large container receiving stations 120 carried by the modular frame 54. The large container receiving module 110 is internally modular such that it may be modifiable to include less than three instances of the receiving station 120. The particular large container receiving equipment described below is illustrative and those of ordinary skill in the art would recognize that other large container receiving equipment could be used, such that the large container receiving module 110 may take many different forms in deployment with other aspects of the minors system.

With continued reference to FIG. 11A, a representative large container receiving station 120 includes one or more large container frames 122 configured to support large containers thereon, large container hoppers 124, large container pneumatic bulk material conduits 126 in communication with the hoppers 124, and large container pneumatic vents 128 in communication with the hoppers 124. The frames 122 are supported on, and may be fastened or otherwise coupled to, the lateral cross-members of the modular frame 54. The frames 122 may be pallet frames that include an open front 130, corner posts 132, lower lateral beams 134 connecting front and rear posts 132, and rear lower, intermediate and upper cross-members 136*a,b,c* connecting rear posts 132, and may have top guide rails 138 connecting respective front and rear posts 132.

Figure 11B:
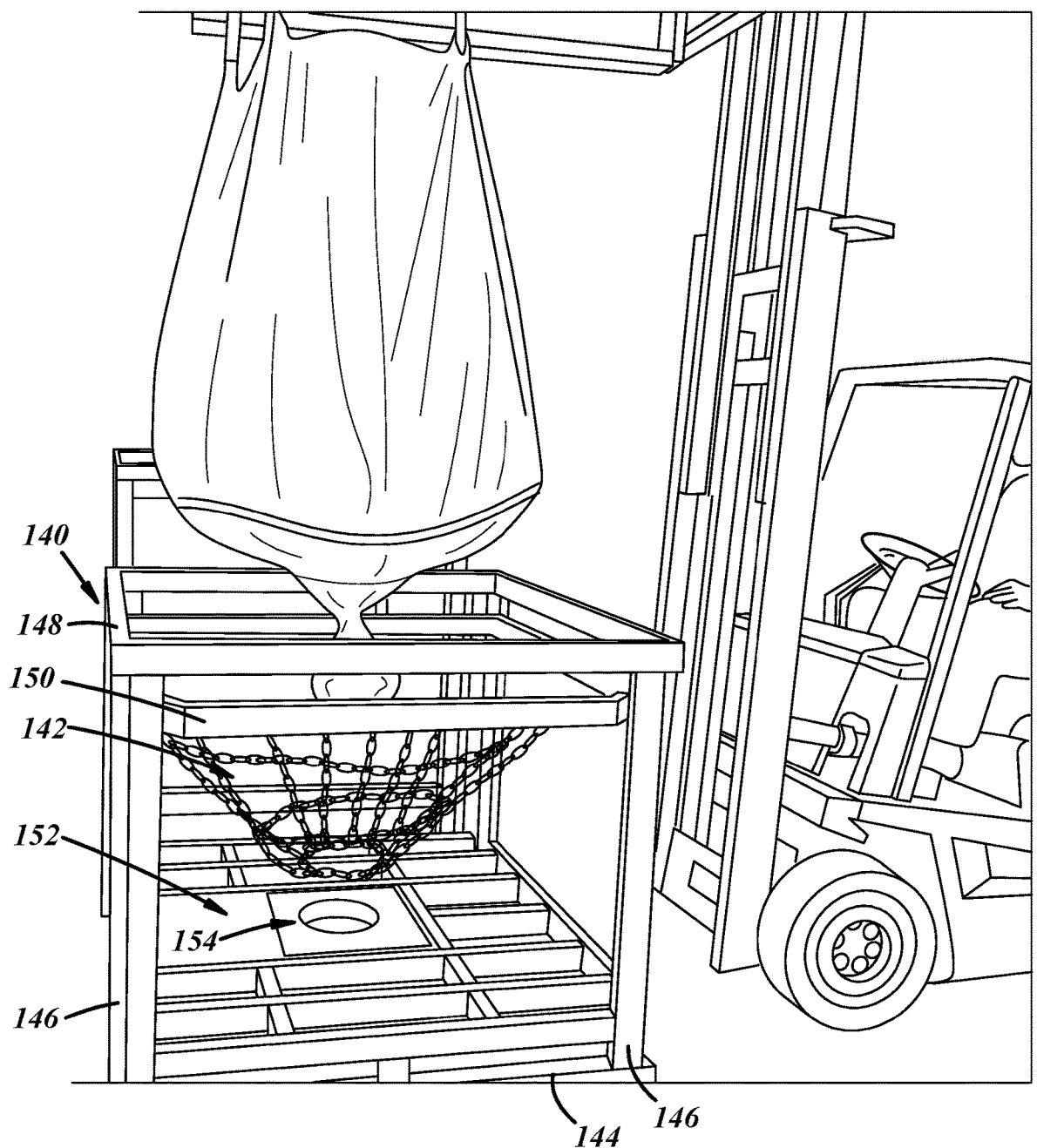
FIG. 11B is an exploded view of a large container and a large container pallet to carry the large container and including a frame and a chain cradle suspended by the frame.
Figure 11C:
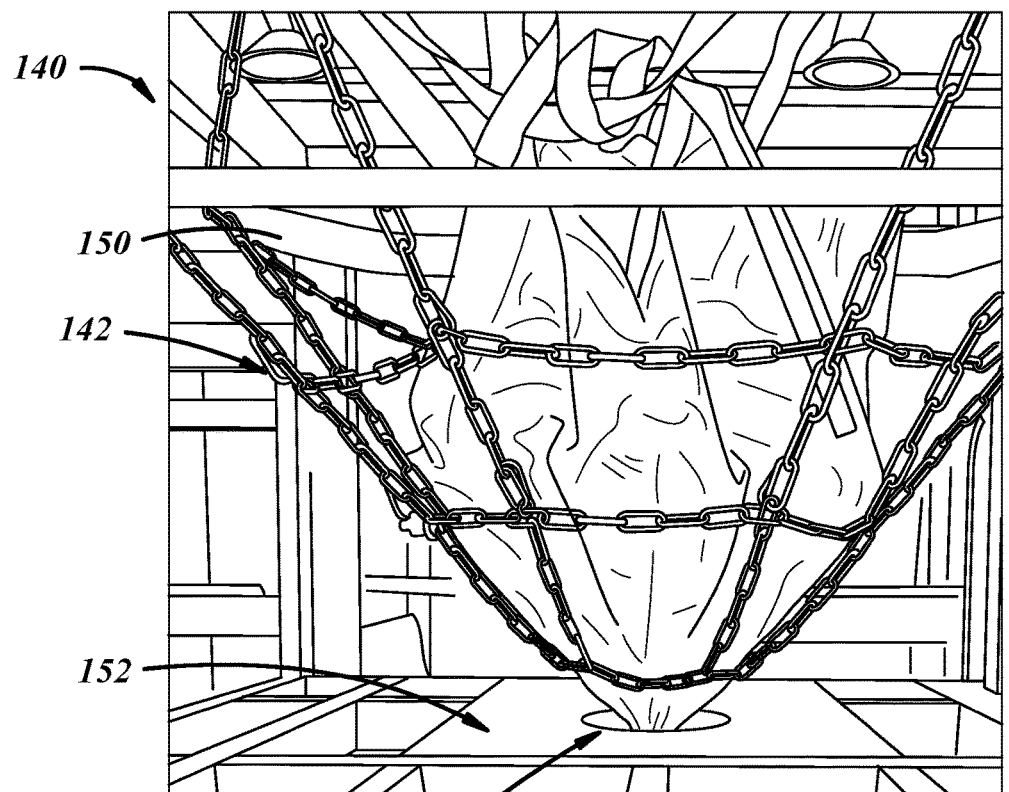
FIG. 11C is an enlarged, fragmentary, side view of a nearly empty large container carried in the chain cradle of FIG. 11B.
Figure 11D:
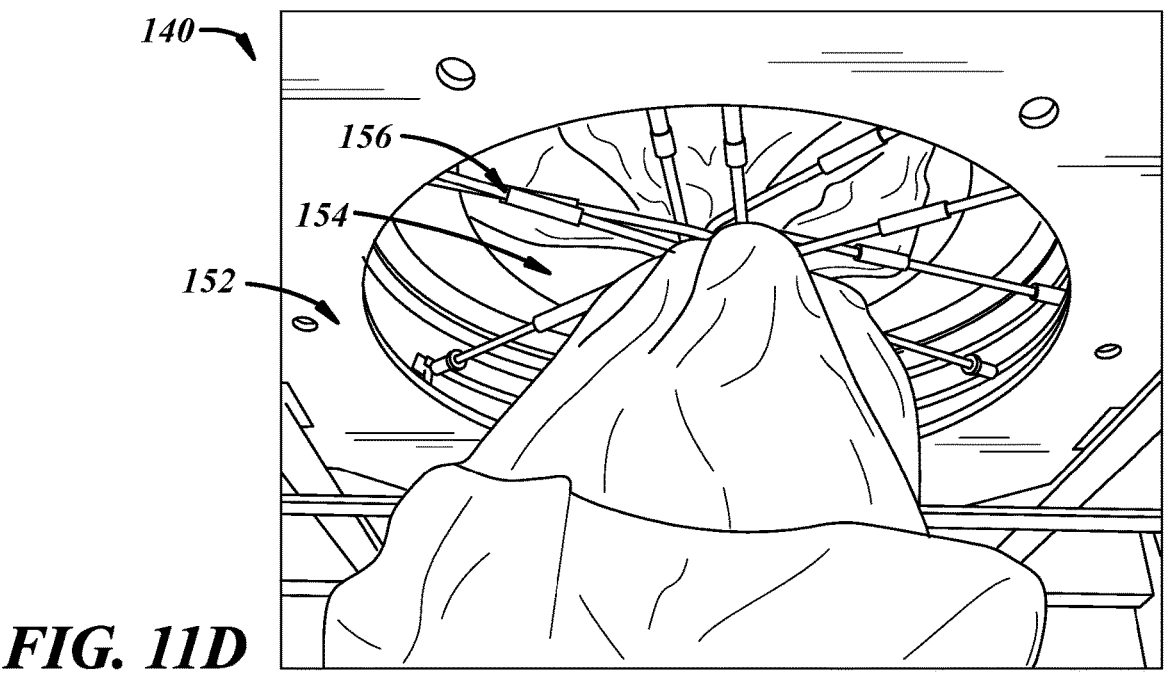
FIG. 11D is an enlarged, fragmentary, lower perspective view of a lower end of the large container of FIG. 11C fed through an iris valve of the large container pallet of FIG. 11B.

With reference to FIGS. 11B and 11C, the bulk containers may be carried in a pallet 140, more specifically, by a chain cradle 142 that may be cone-shaped and coupled to the pallet 140 to form a big bag bulk container into a cone to facilitate emptying of the big bag. The pallet 140 includes base rails 144 extending from front to rear, vertical posts 146 extending upwardly from ends of the base rails 144 at corners of the pallet 140, an upper rim 148 connecting upper ends of the posts 146, cradle rails 150 connecting the posts 146 proximate to but vertically spaced downwardly from the upper rim 148 and coupled to an upper end of the chain cradle 142 that is suspended therefrom, and a platform 152 connecting the posts 146 proximate to but vertically spaced above the base rails 144 and establishing an outlet 154 and supporting an iris valve 156 at the outlet 154, as better shown in FIG. 11D.

Figure 11E:
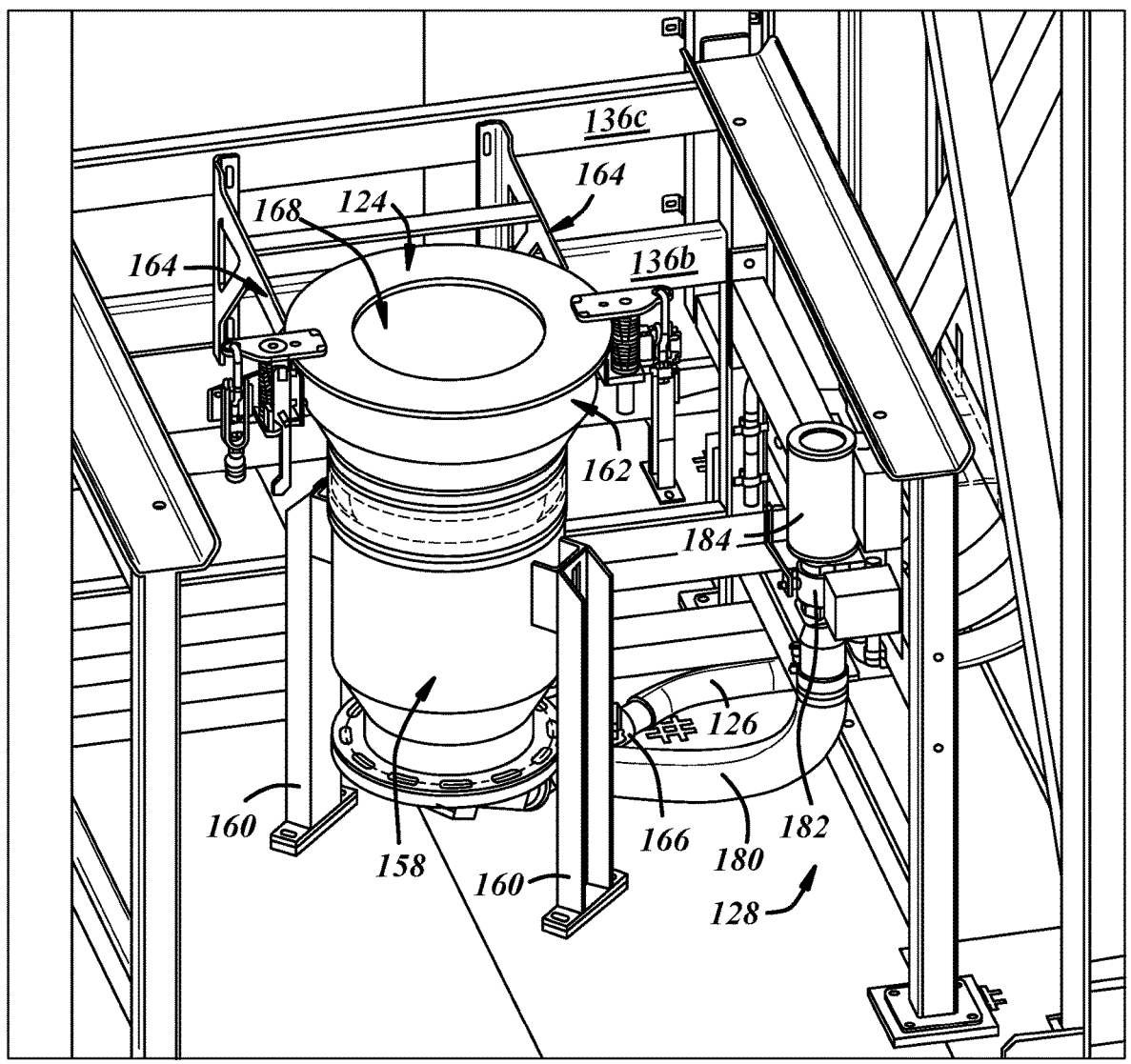
FIG. 11E is an enlarged, fragmentary, upper perspective view of a receiving station of the large container receiving module of FIG. 11A.

With reference to FIG. 11E, each hopper 124 may have a body 158 that may be coupled to support posts 160 that support the hopper 124 in a position spaced above the module platform and that, in turn, are supported on, and may be fastened or otherwise coupled to, the module frame platform and/or to lateral cross-members of the module frame 54 and/or to braces extending longitudinally therebetween. Also, the hopper 124 may have an upper portion 162 that may coupled to support brackets 164 that, in turn, may be coupled to the upper and intermediate rear cross members 136*b,c* of the frame 122. The hopper 124 includes an outlet 166 at a lower portion of the hopper 124 that is in fluid communication with the pneumatic bulk material conduit 126 and the pneumatic vent 128. The hopper 124 also includes an inlet 168 at the upper portion of the hopper 124.

Figure 11F:
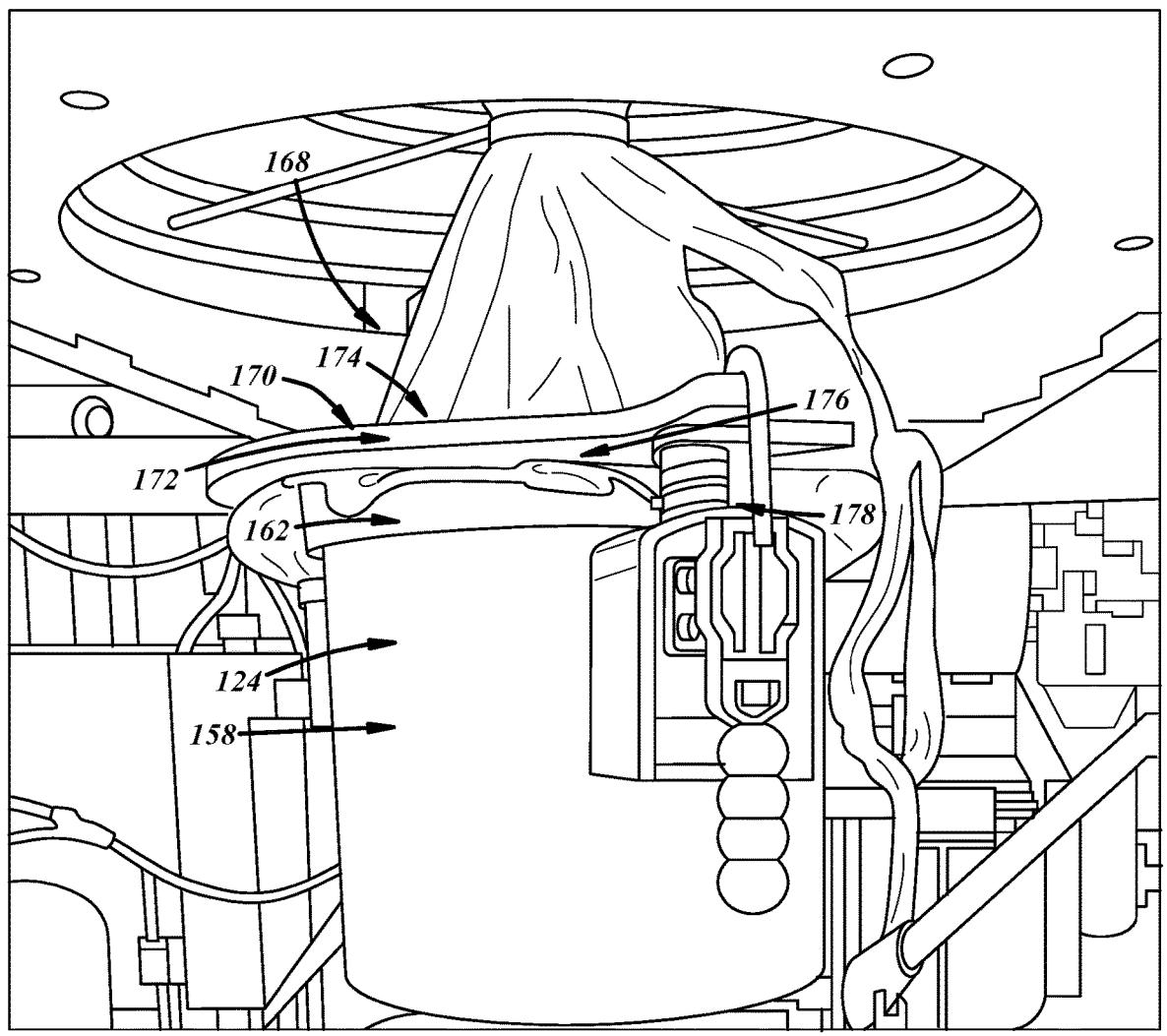
FIG. 11F is an enlarged fragmentary, lower perspective view of the iris valve and container lower end of FIG. 11D and of the receiving station of FIG. 11E with the container lower end clamped to the receiving station.

With reference now to FIG. 11F, the upper portion of the hopper 124 at the hopper inlet 168 may be equipped with a container coupling 170 that may include a ring 172 having an aperture 174 into which a circumferential edge of a container opening is inserted and fed through a gap 176 between the ring 172 and the hopper body 158 and clamped thereto by ergonomic spring-loaded over-center clamps 178 on either lateral side of the hopper 124. Clamping a container in this manner reduces exposure of dust to the atmosphere.

With reference again to FIG. 11E, the pneumatic bulk material conduit 126 is in fluid communication with the outlet 166 of the hopper 124 and may be coupled thereto in any suitable manner. Likewise, the pneumatic vent 128 includes a vent conduit 180 in fluid communication with the outlet of the hopper 124 and may be coupled thereto in any suitable manner, and a vent valve 182 (e.g., manual) coupled to the vent conduit 180 and a vent filter 184 coupled to the vent valve 182. The vent valve 182 and the vent filter 184 may be coupled to a side rail of the frame 122.

In operation, and with general reference to FIG. 11A-F, a bulk container is unloaded from a truck by a forklift onto the pallet 140 (see FIG. 11B) and, after retractable doors of the module are opened, the forklift places the pallet 140 on the pallet frame 122 (see FIG. 11A). Then the open end or nozzle of the bulk container is fed through the gap 176 under the ring 172 of the coupling 170 and over a seal on the hopper upper portion 162 and then the clamps 178 can be pulled down until they are firmly latched in place to seal the open end of the bulk container to the hopper 124. Thereafter, the iris valve 156 can be actuated and upstream tie straps on the container can be undone to release bulk material from the container into the hopper 124 in a dust-free manner. Before initiating bulk material conveying, a system and/or module controller can run any suitable checks, such as verifying that a destination storage hopper is not already full or too full to accept a full container load or the like, or verifying that other equipment is in good working order, or the like. Once such checks are complete, an operator can initiate pneumatic conveying from the station 120 in any suitable manner, so that bulk material is pneumatically conveyed to the bulk material storage module, which applies vacuum to the hopper 124 to pull the bulk materials to the storage module, as will be further described herein below after a discussion of the storing equipment 106.

With reference again to FIGS. 1A and 8, the large container receiving module 110 may be built and shipped with preinstalled equipment, e.g., pneumatic conduit and equipment, electrical wires/cable, control panels, and the like. And the module exterior may be equipped with one or more overhead rollaway doors 34 along an outside of the frame 54, for instance, three rollaway doors 34, each corresponding to an individual bay of the frame 54 and workstation of the module 110. Also, an exterior end of the module 110 may be equipped with a human access door 26, doorway 26a, and a human access platform 27 accessible via stairs 28.

Figure 12A:
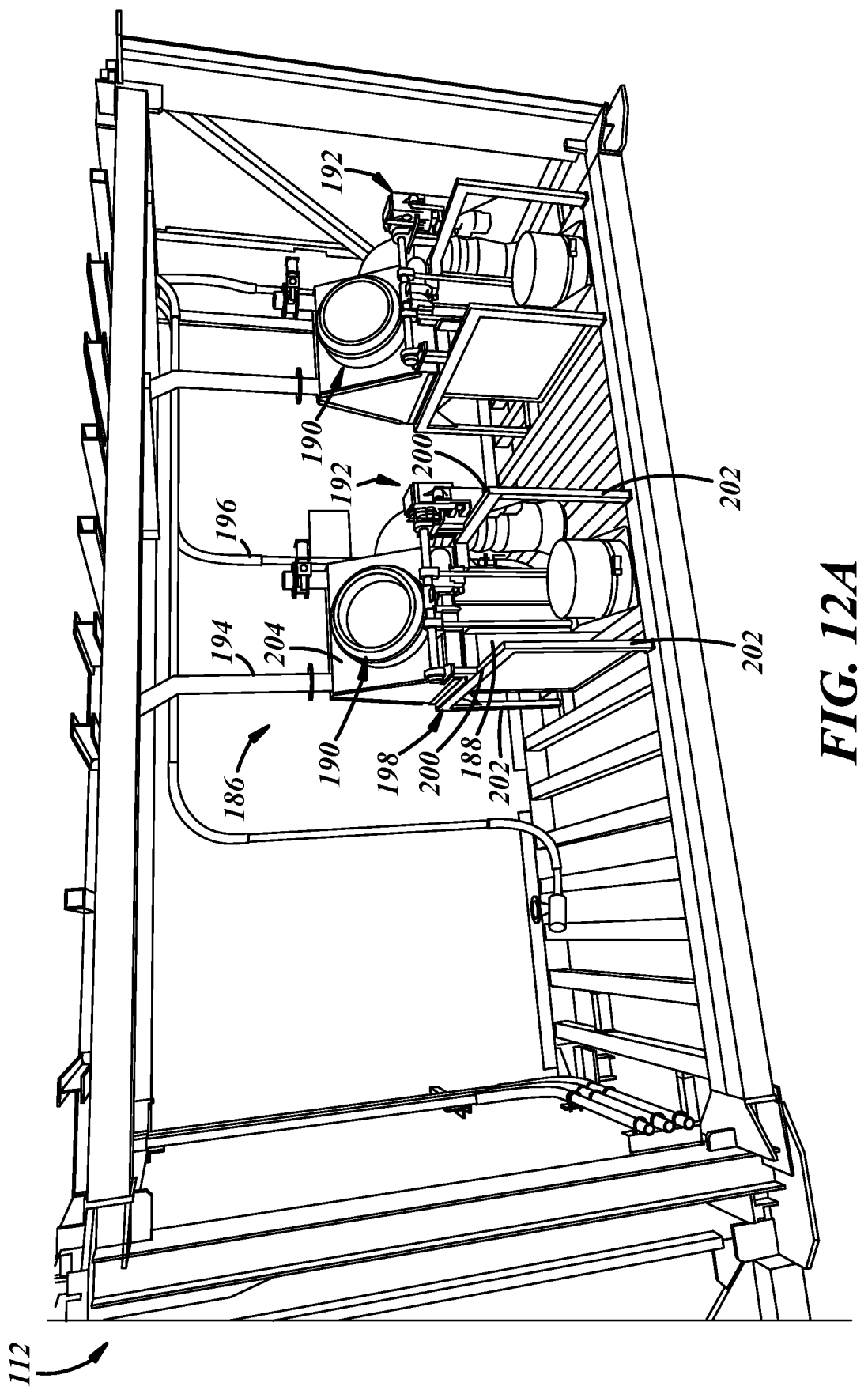
FIG. 12A is an enlarged perspective view of a small container receiving module of the system of FIG. 1A.

With reference now to FIG. 12A, the small container receiving module 112 includes one of the modular frames 54, and at least one small container receiving station 186 carried by the modular frame 54. The receiving module 112 is internally modular such it may be expansible to include additional instances of the receiving station 186. The particular small container receiving equipment described below is illustrative and those of ordinary skill in the art would recognize that other small container receiving equipment could be used, such that the small container receiving module 112 may take many different forms in deployment with other aspects of the minors system.

Figure 12B:
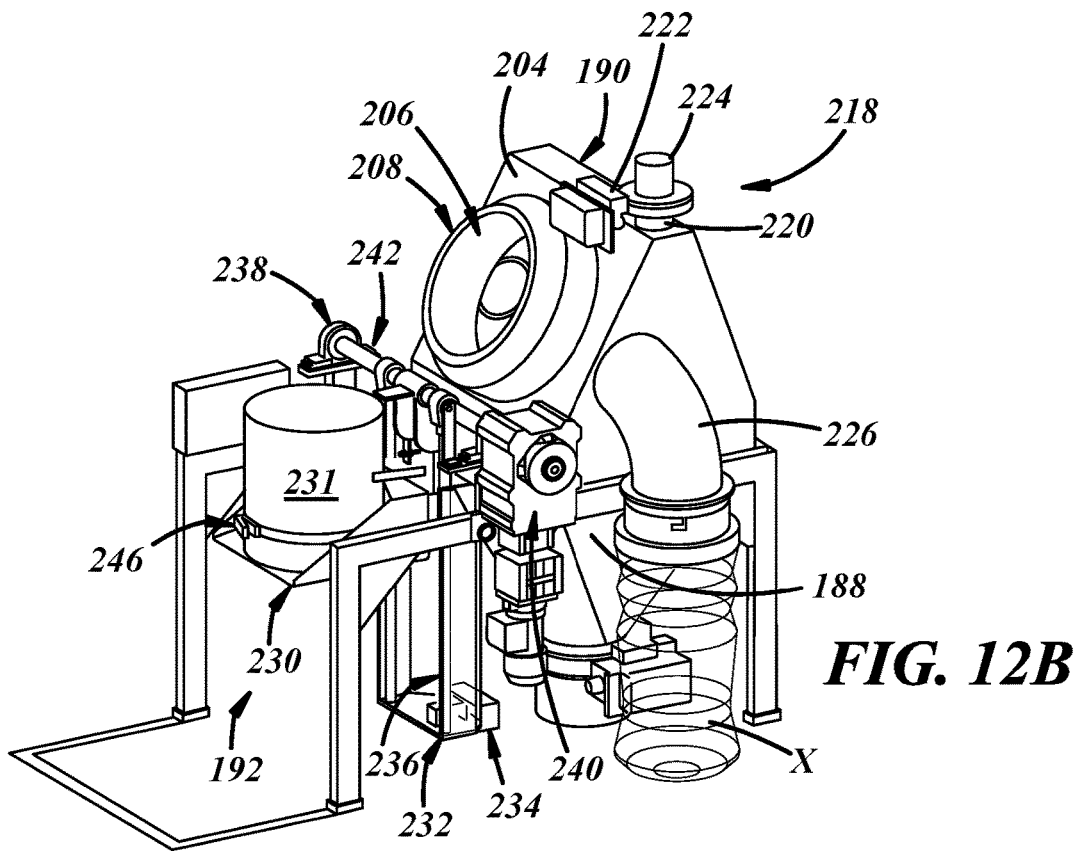
FIG. 12B is an enlarged perspective view of a small container receiving station of the module of FIG. 12A showing a platform in a lifted position.

With continued reference to FIGS. 12A and 12B, the station 186 includes a small container hopper 188 to receive and hold bulk material, a small container receiver 190 above the small container hopper 188 to communicate bulk material therethrough to the small container hopper 188, and a small container inverter 192 configured to dump contents of a small container or bulk tote into the small container receiver 190. The station 186 also includes receiving filter conduit 194 in fluid communication with an interior of the small container receiver 190, and a small container pneumatic bulk material conduit 196 in communication with the small container hopper 188. The hopper 188, the receiver 190, and the inverter 192 may be supported on a frame 198 having beams 200 on which the receiver 190 is carried and from which the hopper 124 is suspended and posts 202 supporting the beams 200. In turn, the posts 202 are supported on, and may be fastened or otherwise coupled to, platform panels of the modular frame 54 and/or to underlying lateral cross-members and/or braces. Each receiver 190 may have a front panel 204 having inlets 206 that may be equipped with a container coupling 208 that may seal to a small container 231, and a rear panel 210 with integral gloves 212 to allow an operator to open a bulk material tote once loaded into the receiver 190. As such, the receivers 190 are termed "glove boxes". The hopper 188 may have an upper inlet 214 coupled to the receiver 190, and an outlet 216 in fluid communication with the bulk material conduit 196. The station 186 also may include a pneumatic vent 218 in fluid communication with an interior of the receiver 190 and hopper 188, and that may include a vent conduit 220 coupled to an upper portion of the receiver 190, a vent valve 222 (e.g., manual) coupled to the vent conduit and a vent filter 224 coupled to the vent valve 222. The station 186 also may include a conduit 226 coupled to the receiver 190 and in fluid communication with the interior thereof, and a tubefoil waste bin coupled to the end of the conduit 226 for receiving waste tubefoil from the unloading and receiving process.

Figure 12C:
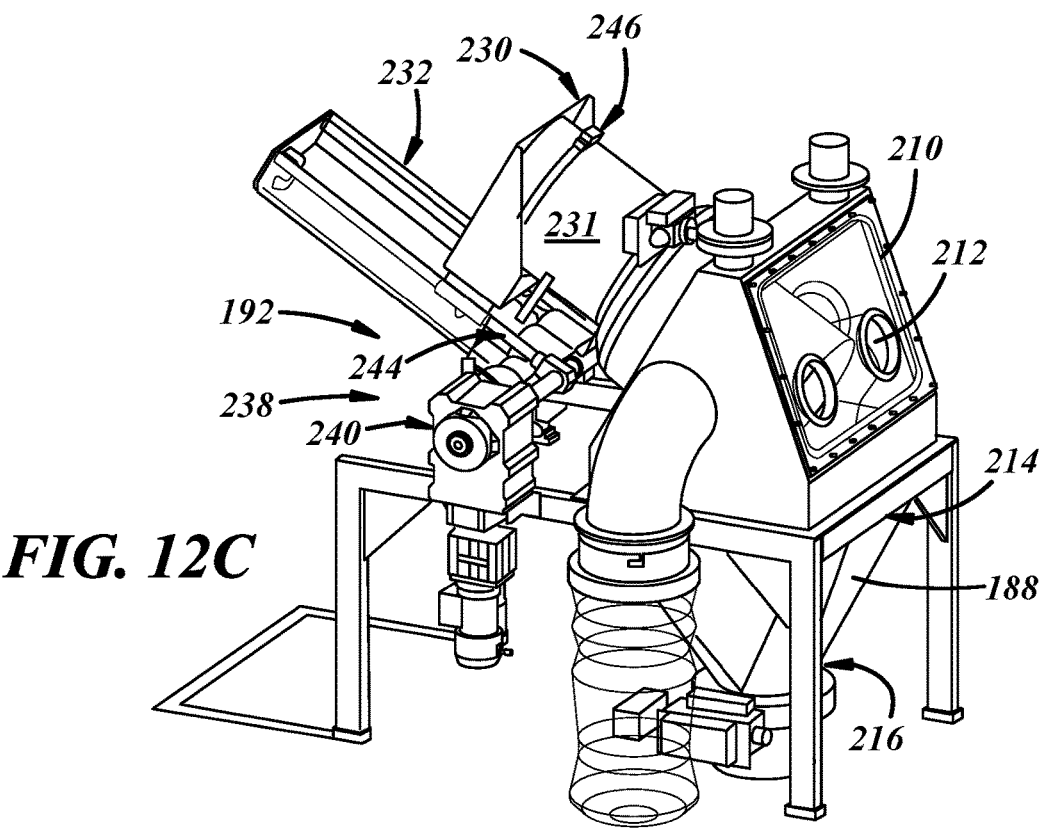
FIG. 12C is an enlarged perspective view of a small container receiving station of the module of FIG. 12A showing the platform in a lifted and rotated position.

With reference to FIGS. 12B and 12C, the inverter 192 may be an ergonomic lift and rotate inverter with a container platform 230, an elevator 232 with an actuator 234 (e.g. motor) and screw 236 threaded to the platform 230 to lift the platform 230, and a rotator 238 with an actuator 240 (e.g. motor), drive shaft 242 coupled to the actuator 234, and rotator arms 244 coupled to the drive shaft 242 and to the platform 230 to rotate the platform 230 after the platform 230 has been lifted so as to engage a bulk tote to the inlet 206 of the receiver 190.

In operation, a container may be clamped to the platform 230 with a clamp 246, for example, a tension belt, ratchet strap, or the like. Then, as shown in FIG. 12B, the elevator 232 may be actuated to lift the platform 230 and the container 231, and then, as shown in FIG. 12C, the rotator 238 may be actuated to rotate the platform 230 and the container 231 to facilitate insertion of the container 231 through the inlet 206 of the receiver 190. The receiver inlet 206 may be lined with an endless tubefoil (not shown) to promote a dustless or reduced dust environment. In some instances, a bulk material bag within the bulk tote may be removed from the container 231 and released into glove box interior of the receiver 190. The container 231 is then removed, and a closure (not shown) is attached to the inlet 206 of the receiver 190 to seal all materials inside the receiver 190. Then the material bag is sliced open and material is dumped into the hopper 124. Before initiating bulk material conveying, a system and/or module controller can run any suitable checks, such as verifying that a destination storage hopper is not already full or too full to accept a full container load or the like, or verifying that other equipment is in good working order, or the like. Once such checks are complete, an operator can initiate pneumatic conveying from the station 186 in any suitable manner, so that bulk material is pneumatically conveyed to the bulk material storage module, which applies vacuum to the hopper 188 to pull the bulk materials to the storage module, as will be further described herein below after a discussion of the storing equipment 106.

Figure 13:
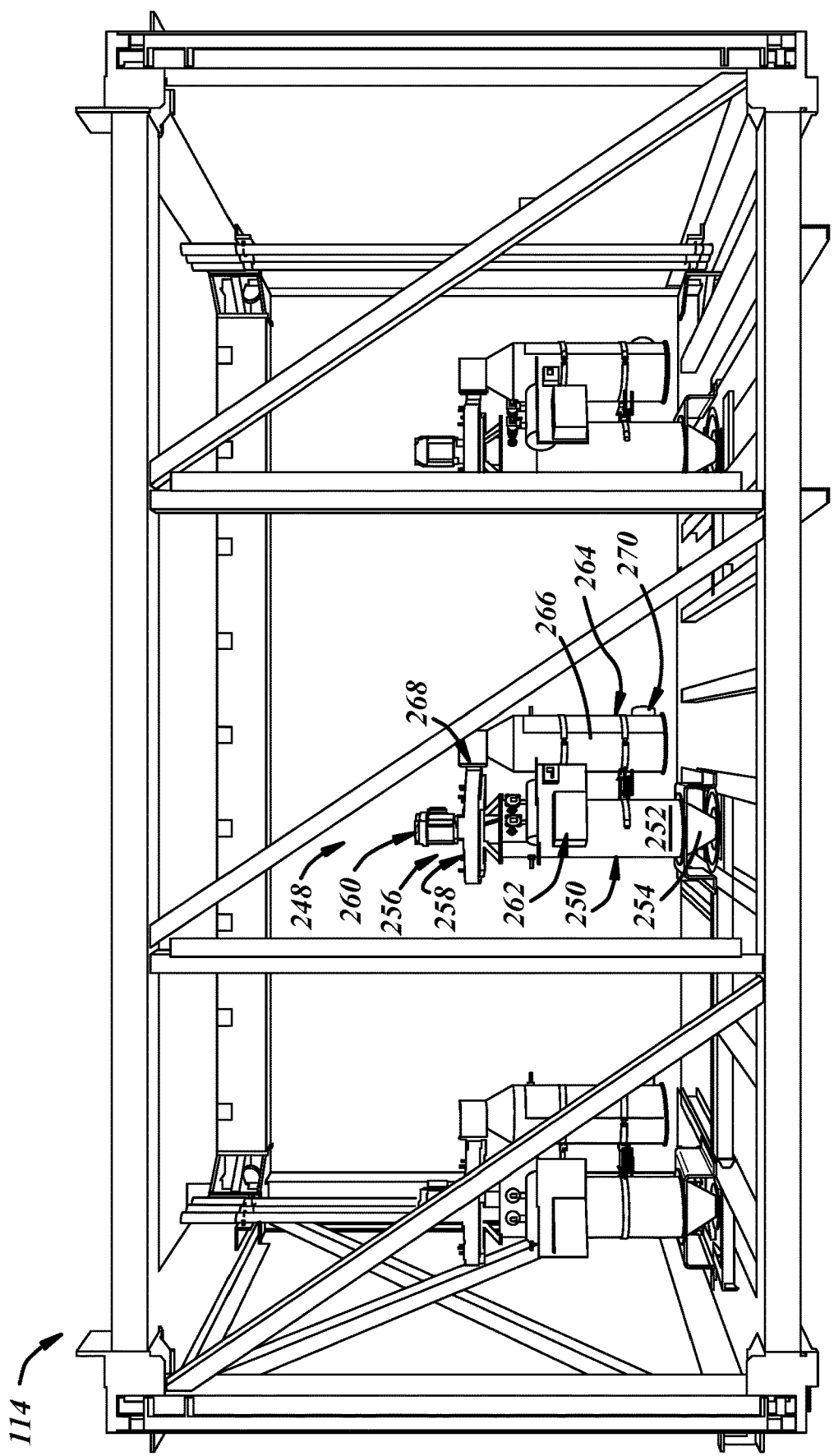
FIG. 13 is an enlarged perspective view of a small container filtration module of the system of FIG. 1A.

With reference now to FIG. 13, the filtration module 114 includes one of the modular frames 54, and at least one small container receiving filtration apparatus 248 carried by the modular frame 54. The filtration module 114 may be internally modular such that it may be expansible to include additional instances of the filtration apparatus 248. The particular filtration equipment described below is illustrative and those of ordinary skill in the art would recognize that other filtration equipment could be used, such that the filtration module 114 may take many different forms in deployment with other aspects of the minors system.

The apparatus 248 includes a receiving filter 250 including a filter housing 252 and an inlet 254 that may be a spout or funnel-shaped, is coupled to a lower end of the housing 252, and is configured for fluid communication with the receiving filter conduit 194 of the small container receiving module 112 and includes a filter element (not separately shown). The apparatus 248 also includes a filter rotor 256 that may be located at an upper end of the filter housing 252 and has a rotor housing 258 in operative fluid communication with the interior of the filter housing 252, and a rotor motor 260 coupled to the filter rotor 256 to rotate a rotor element like a fan, impeller, or the like (not separately shown) to pneumatically pull air and dust through the filter 250. The apparatus 248 also may include a filter pulser 262 pneumatically coupled through the filter housing 252 and actuated periodically to pneumatically pulse the filter element to release accumulated solids that may fall back down into the receiver 190 and the hopper 188 for use. The filtration apparatus 248 also may include a secondary filter 264 including a secondary filter housing 266 in downstream fluid communication with the rotor housing 258 and having an upper inlet 268 and a lower outlet 270, and a secondary filter element (not separately shown) carried in the housing 266. The secondary filter 264 may have a relatively finer filter element compared to that of the upstream filter 250 and may be configured for periodic replacement, in contrast to the upstream filter element which may not require replacement.

Figure 14:
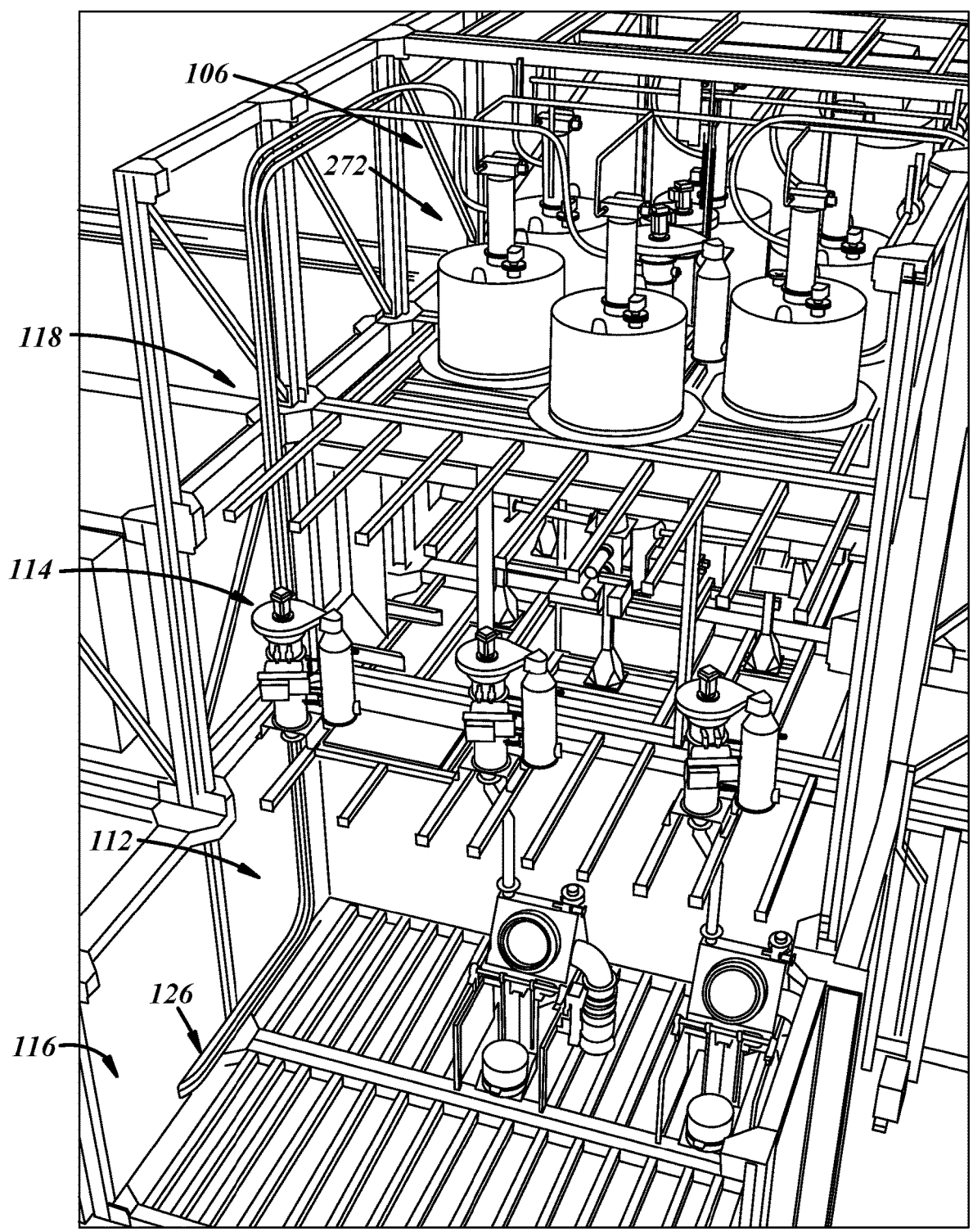
FIG. 14 is an enlarged, fragmentary, perspective view of a portion of a minors subsystem of the system of FIG. 1A.
Figure 15:
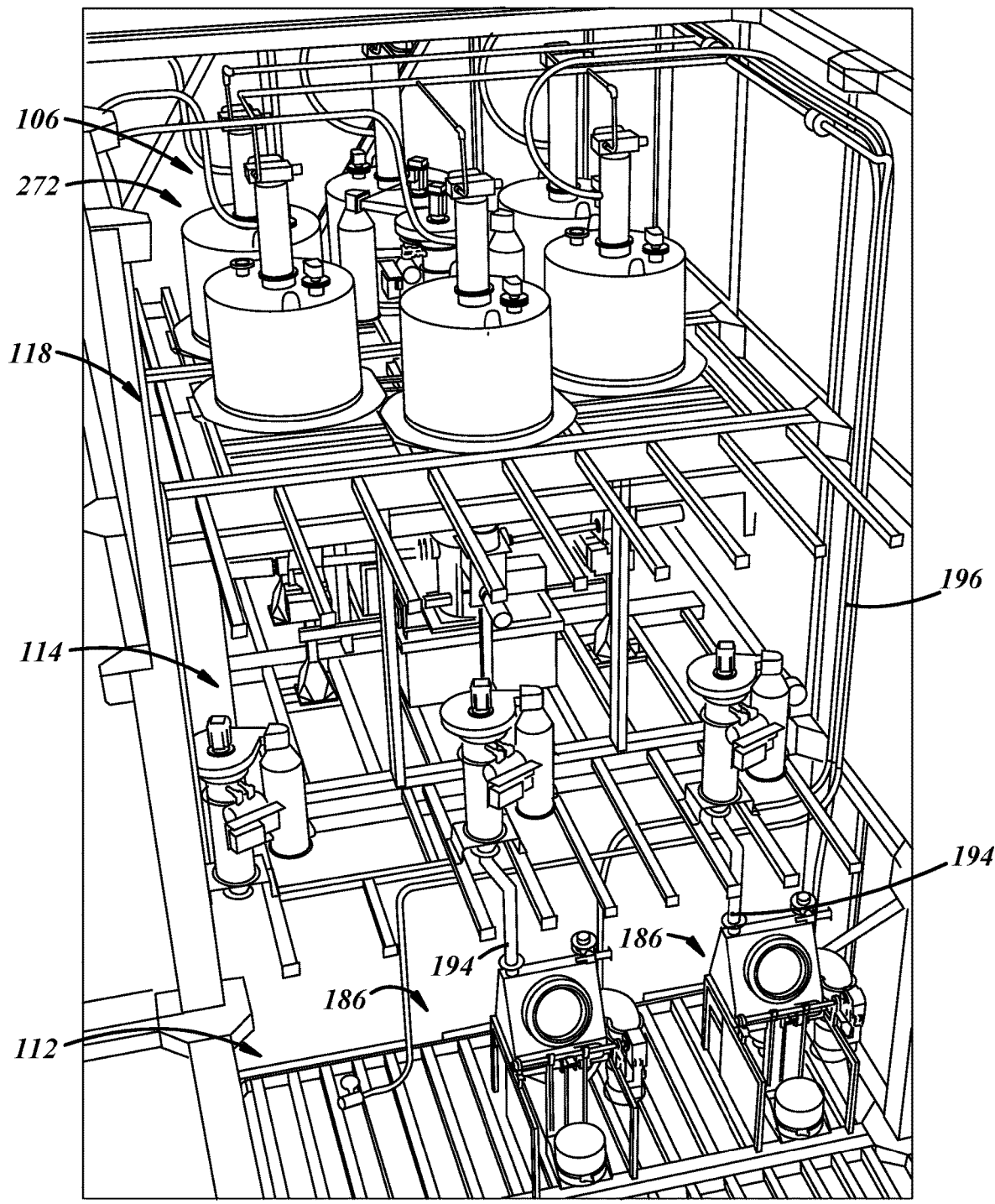
FIG. 15 is another enlarged, fragmentary, perspective view of a portion of a minors subsystem of the system of FIG. 1A.

With reference to FIGS. 11A and 14, the large container bulk material conduit 126 may be routed from each large container receiving station 120 longitudinally along the lower rear portion of the module 110 and into and through a lower rear corner of the adjacent vestibule module 116, into, along, and up one end of the small container receiving module 112, and then into, and up one end of the filtration module 114, and then into and up one end of the auxiliary module 118 and out one side of the auxiliary module 118, and finally routed in one or both of the storage modules 272 to corresponding storage hoppers. Likewise, with reference to FIGS. 12A and 15, the small container bulk material conduit 196 may be routed from each small container receiving station 186 up and longitudinally along an upper rear portion of the module 112 and into and up one end of the adjacent filtration module 114, and then into and up one end of the auxiliary module 118 and out one side of the auxiliary module 118, and finally routed in one or both of the storage modules 272 to corresponding storage hoppers therein. Similarly, the receiving filtration conduit 194 may be routed up through a roof of the receiving module 112 and through a floor of the filtration module 114. In one example, selenium and cobalt oxide from the small container receiving module 112 and carbon from the large container receiving module 110 are routed to one storage module, and filter dust and saltcake from the large container receiving module 110 are routed to the other storage module, with a spare or optional other material loadable to the other storage module.

Figure 16A:
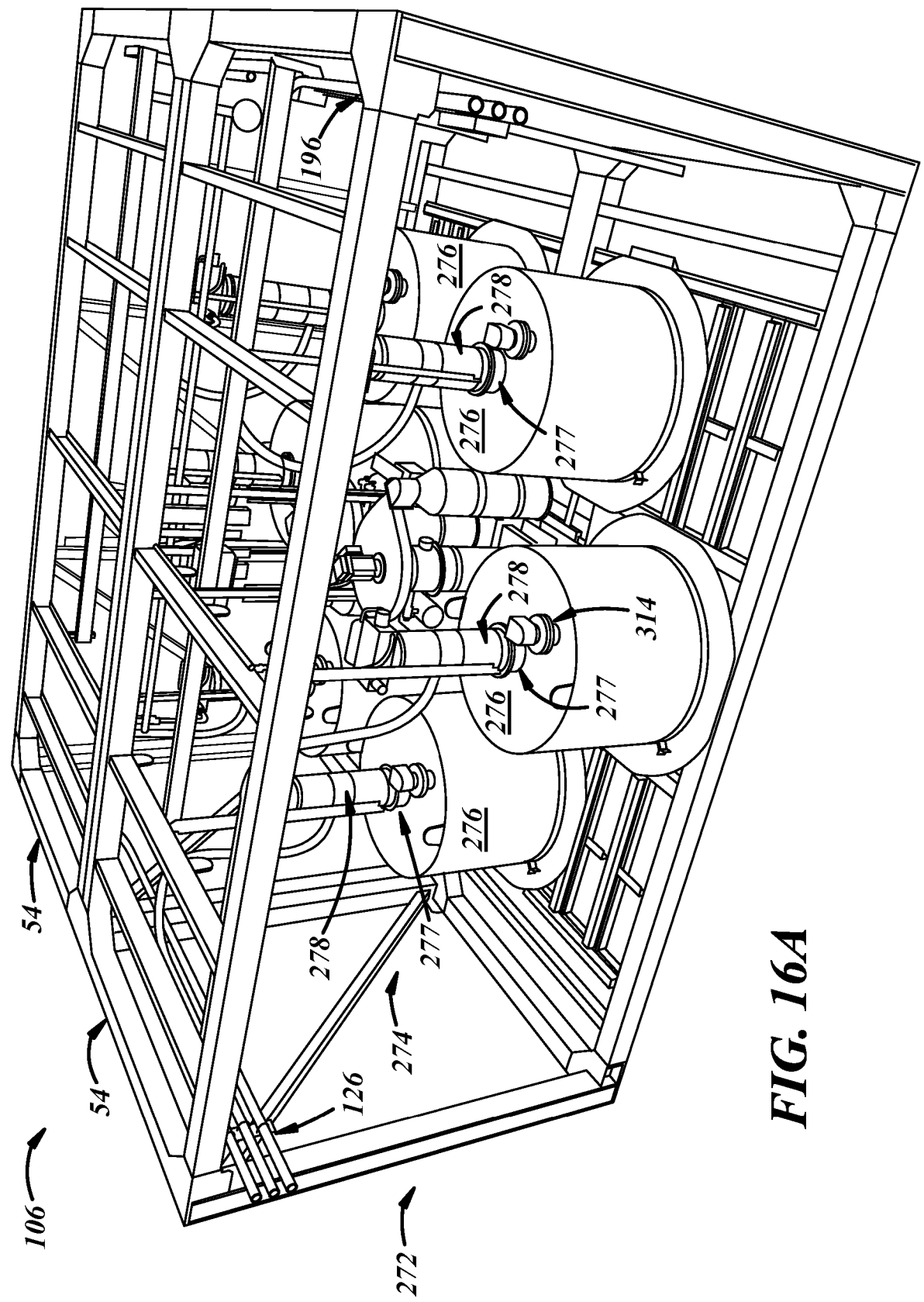
FIG. 16A is an enlarged perspective view of bulk material storage modules including a circular array of storage hoppers, and dispensing filters.
Figure 16B:
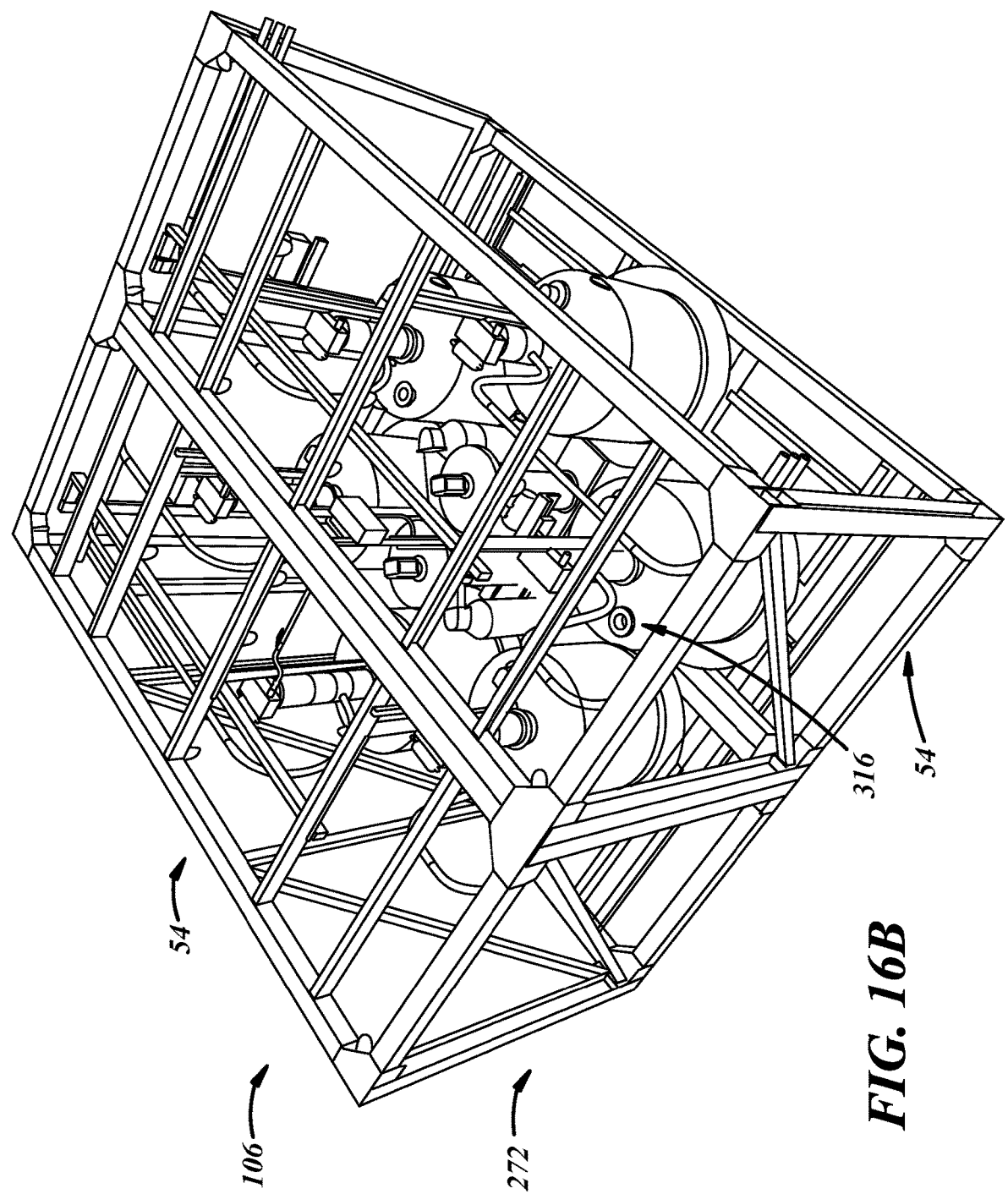
FIG. 16B is another enlarged perspective view of the bulk material storage modules including the circular array of storage hoppers.
Figure 16C:
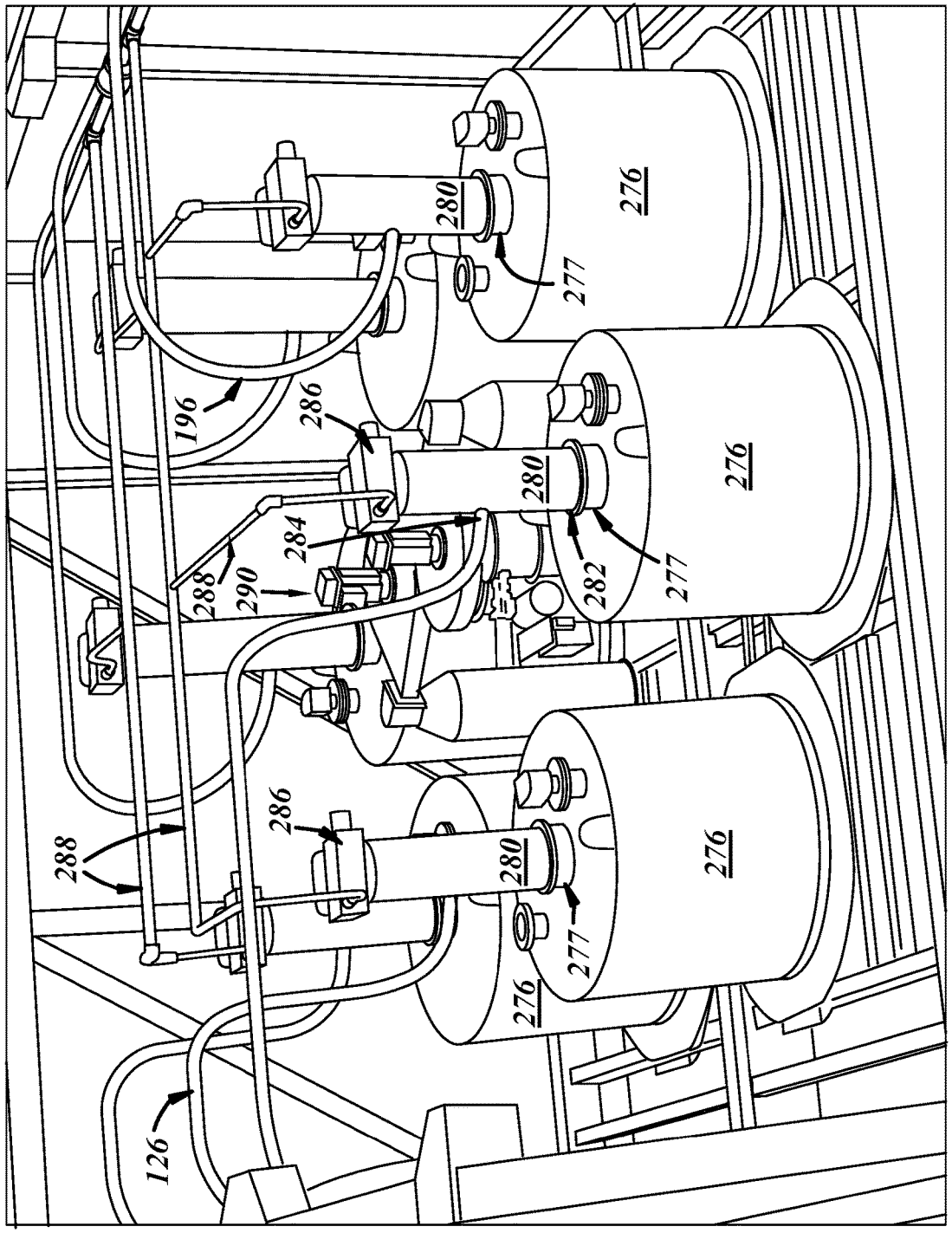
FIG. 16C is a further enlarged, fragmentary, perspective view of the bulk material storage modules including the circular array of storage hoppers.
Figure 16D:
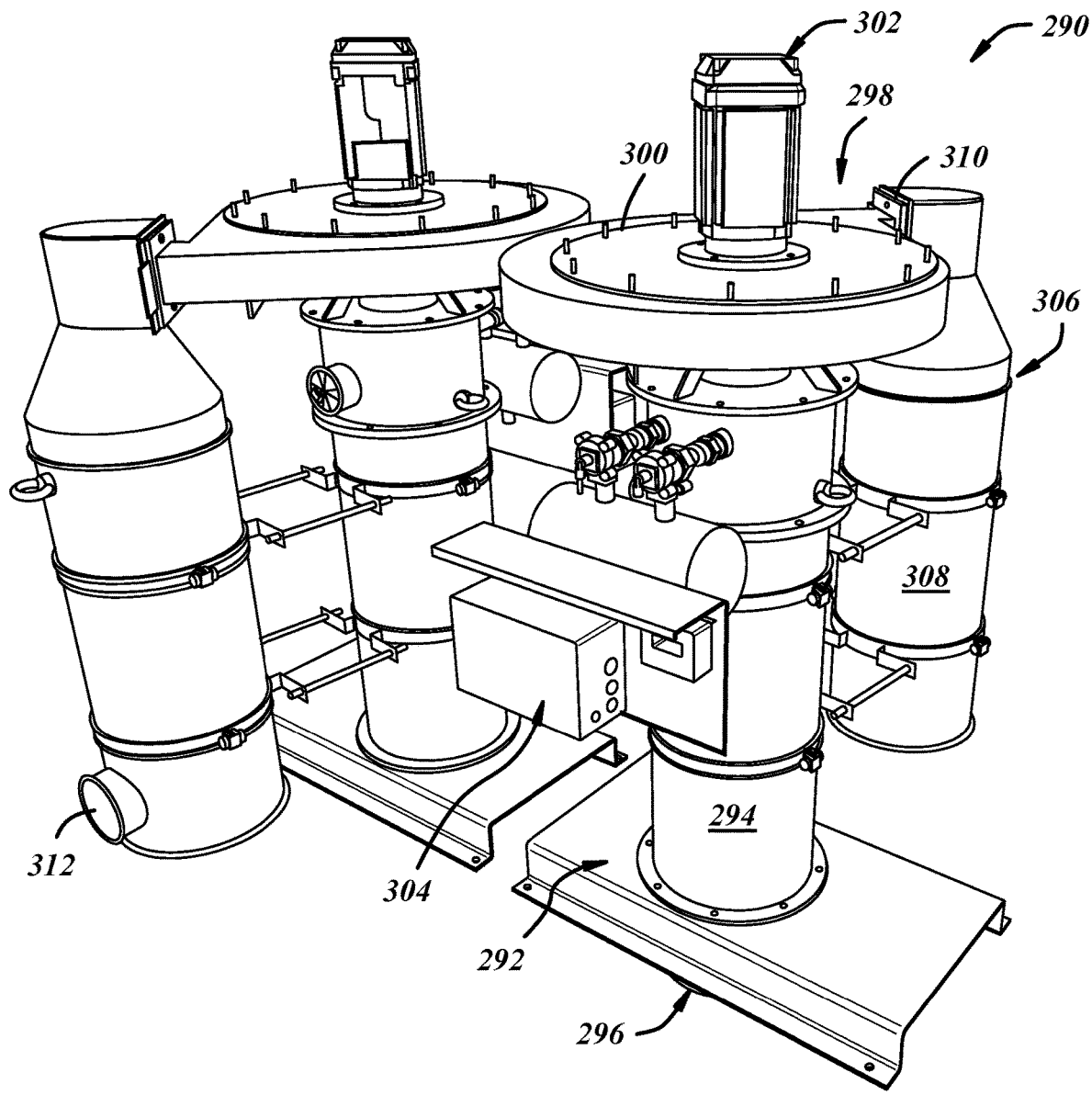
FIG. 16D is an enlarged perspective view of the dispensing filters of FIG. 16A.
Figure 16E:
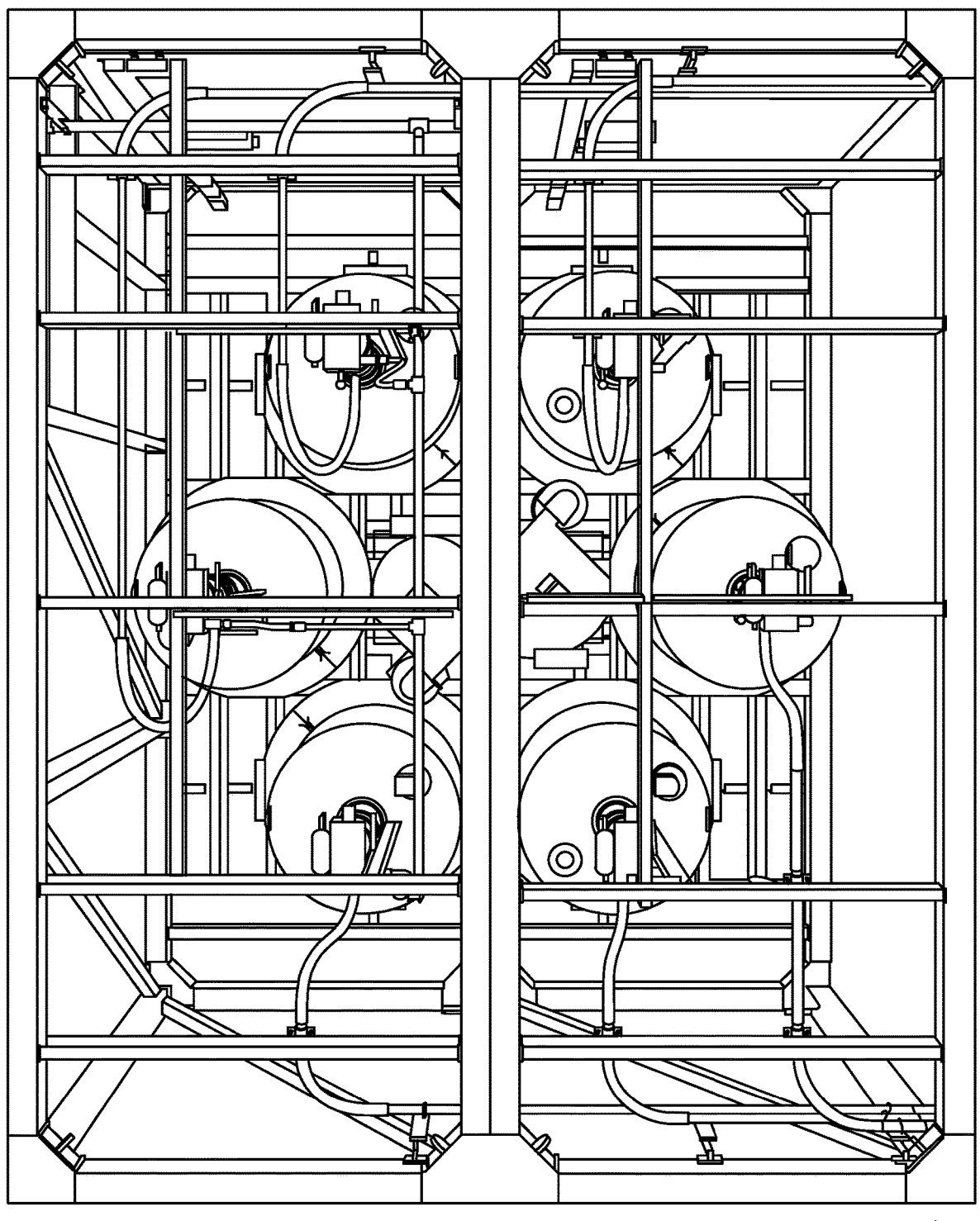
FIG. 16E is an enlarged top view of the bulk material storage modules including the circular array of storage hoppers.
Figure 16F:
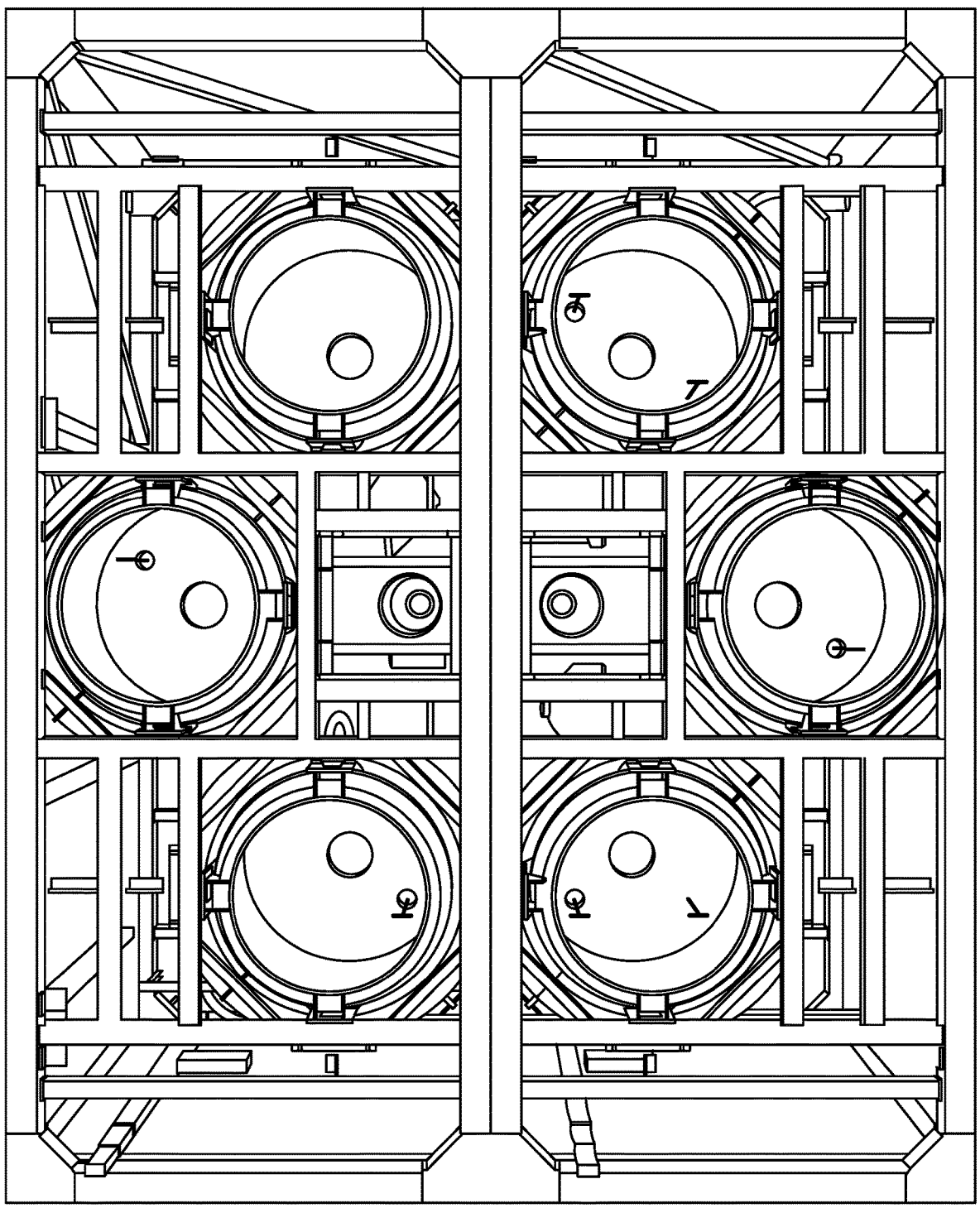
FIG. 16F is an enlarged bottom view of the bulk material storage modules including the circular array of storage hoppers.

With reference generally now to FIGS. 16A-C, the minors storing equipment 106 includes a bulk material storage module 272 that includes one of the modular frames 54, and a bulk material storage apparatus 274 carried by the frame 54. The particular storage equipment described below is illustrative and those of ordinary skill in the art would recognize that other storage equipment could be used, such that the storage module may take many different forms in deployment with other aspects of the minors system.

The apparatus 274 includes one or more storage tanks or hoppers 276, and one or more corresponding pneumatic separators 278 that each may be carried by a corresponding one of the hoppers 276 and in fluid communication with an interior thereof to pull vacuum through the pneumatic bulk material conduit 126, 196 so as to draw bulk material from the receiver hoppers 124, 188, through the conduit 126, 196, into the separator 278, and down into the storage hoppers 276. More specifically, the hoppers 276 include bulk material inlets 277, and the pneumatic separators 278 include housings 280 with bulk material outlets 282 in communication with the inlets 277. The separators 278 also have bulk material inlets 284 between the lower and upper ends of the separators 278 in communication with respective pneumatic bulk material conduits 126, 196, and vacuum generators 286 in upstream fluid communication with interiors of the housings 280 at upper ends of the separators 278 and in downstream fluid communication with pressurized air lines 288 (FIG. 16C).

In operation, once an operator has carried out an unloading and receiving process described above for a particular receiver hopper 124, 188 and then initiated pneumatic conveying, for example, by pressing a button or taking some other action to open a pressurized air valve in a respective air line 288 corresponding to the particular receiver hopper 124, 188, pressurized air is supplied through the respective air line 288 and into the vacuum generator 286 for one of the storage hoppers 276 corresponding to the receiving station. The vacuum generator 286 thus pulls vacuum through a portion of the separator 278 that corresponds to the particular storage hopper 276 and through the corresponding bulk material conduit 126, 196 all the way back to the particular receiver hopper 124, 188 to draw bulk material into an air stream in the separator 278 and falls by gravity down into the storage hopper 276.

With continued reference to FIGS. 16A-F, the bulk material storage module 272 includes a dispensing filter apparatus 290 that is common to the plurality of storage hoppers 276 of the bulk material storage module 272. The apparatus 290 includes a dispensing filter 292 including a filter housing 294 and an inlet 296 that may be a spout or funnel-shaped, is coupled to a lower end of the filter housing 294, and is configured for fluid communication with the dispensing equipment as will be described in detail below and includes a filter element (not separately shown). The apparatus 290 also includes a filter rotor 298 that may be located at an upper end of the filter housing 294 and has a rotor housing 300 in operative fluid communication with the interior of the filter housing 294, and a rotor motor 302 coupled to the filter rotor 298 to rotate a rotor element like a fan, impeller, or the like (not separately shown) to pneumatically pull air and dust through the filter 292. The apparatus 290 also may include a filter pulser 304 pneumatically coupled through the filter housing 294 and actuated periodically to pneumatically pulse the filter element to release accumulated solids that may fall back down into the dispensing equipment for use. The filter apparatus 290 also may include a secondary filter 306 including a secondary filter housing 308 in downstream fluid communication with the rotor housing 300 and having an upper inlet 310 and a lower outlet 312, and a secondary filter element (not separately shown) carried in the housing 308. The secondary filter 306 may have a relatively finer filter element compared to that of the upstream filter and may be configured for periodic replacement, in contrast to the upstream filter element which may not require replacement.

In general, and with reference again to FIG. 16A, various utilities are carried by the storage modules 272 and may include vents, filters, pressure relief valves, pneumatic conduit, electrical cabling, control modules, level gauges, and the like. In a specific example, the hoppers may include material level sensors 314, e.g., a BINDICATOR type of level sensor, or any other type of material level sensor suitable for particulate matter. In another example, the hoppers 276 may include vents 316 coupled thereto and in fluid communication with interiors thereof. Although not separately shown in the drawings, one or more of the hoppers 276 further may include an integrated vibratory bin activator to prevent caking and bridging therein. The hoppers 276 may have a volumetric capacity of 0.5 to 2.5 cubic meters, including all ranges, subranges, values, and endpoints of that range.

In a single module, the hoppers 276 are arranged in a partial array, or an array that is semicircular or semi-hexagonal, including three hoppers 276 and a single dispensing filter apparatus 290. In two side-by-side modules, the hoppers 276 are arranged in a complete array, or an array that is circular or hexagonal, including six hoppers 276 and two dispensing filter apparatuses 290. Accordingly, a second of the two modules 272 includes a second bulk material storage apparatus and a second one of each apparatus, component, utility, and interconnections therebetween, already described above with reference to one of the modules 272. The storage modules 272 may be internally modular such that they may be modifiable to include more or fewer instances of the hoppers 276 and/or filter apparatuses 290.

Figure 17A:
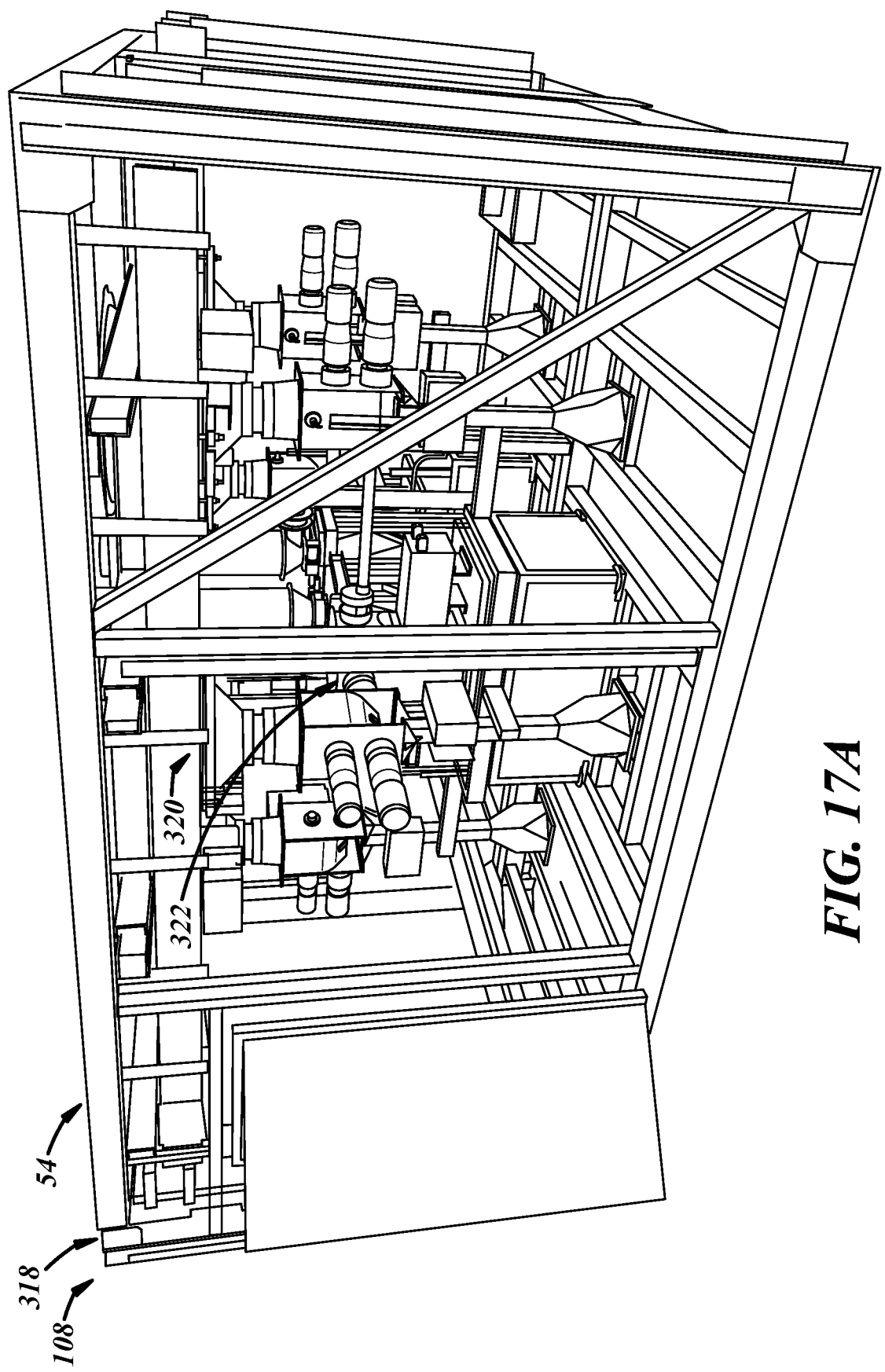
FIG. 17A is an enlarged perspective view of bulk material dispensing modules of the system of FIG. 1A.
Figure 17B:
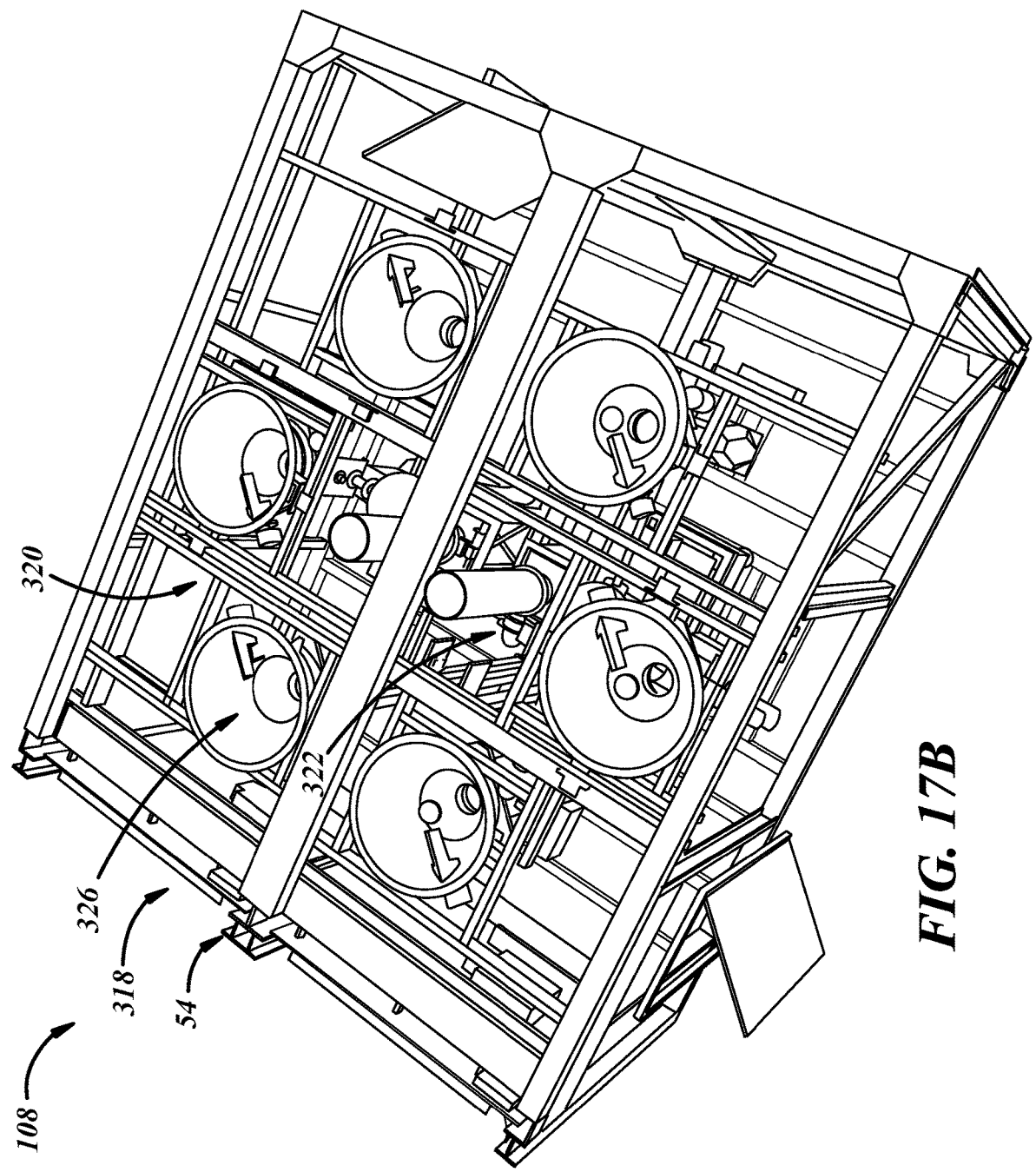
FIG. 17B is another enlarged perspective view of the bulk material dispensing modules of the system of FIG. 1A.

With general reference to FIGS. 17A-B, the minors dispensing equipment 108 includes a bulk material dispensing module 318 includes one of the modular frames 54, and a bulk material dispensing apparatus 320 carried by the frame 54 and including a dosing apparatus 322 that creates doses of desired amounts of bulk material from the storage hoppers, and a docking apparatus 324 to dock the dosing apparatus with a portion of the bulk material transport system 44 as will be discussed in further detail below. The particular dispensing equipment described below is illustrative and those of ordinary skill in the art would recognize that other dispensing equipment could be used, such that the dispensing module may take many different forms in deployment with other aspects of the minors system.

Figure 17C:
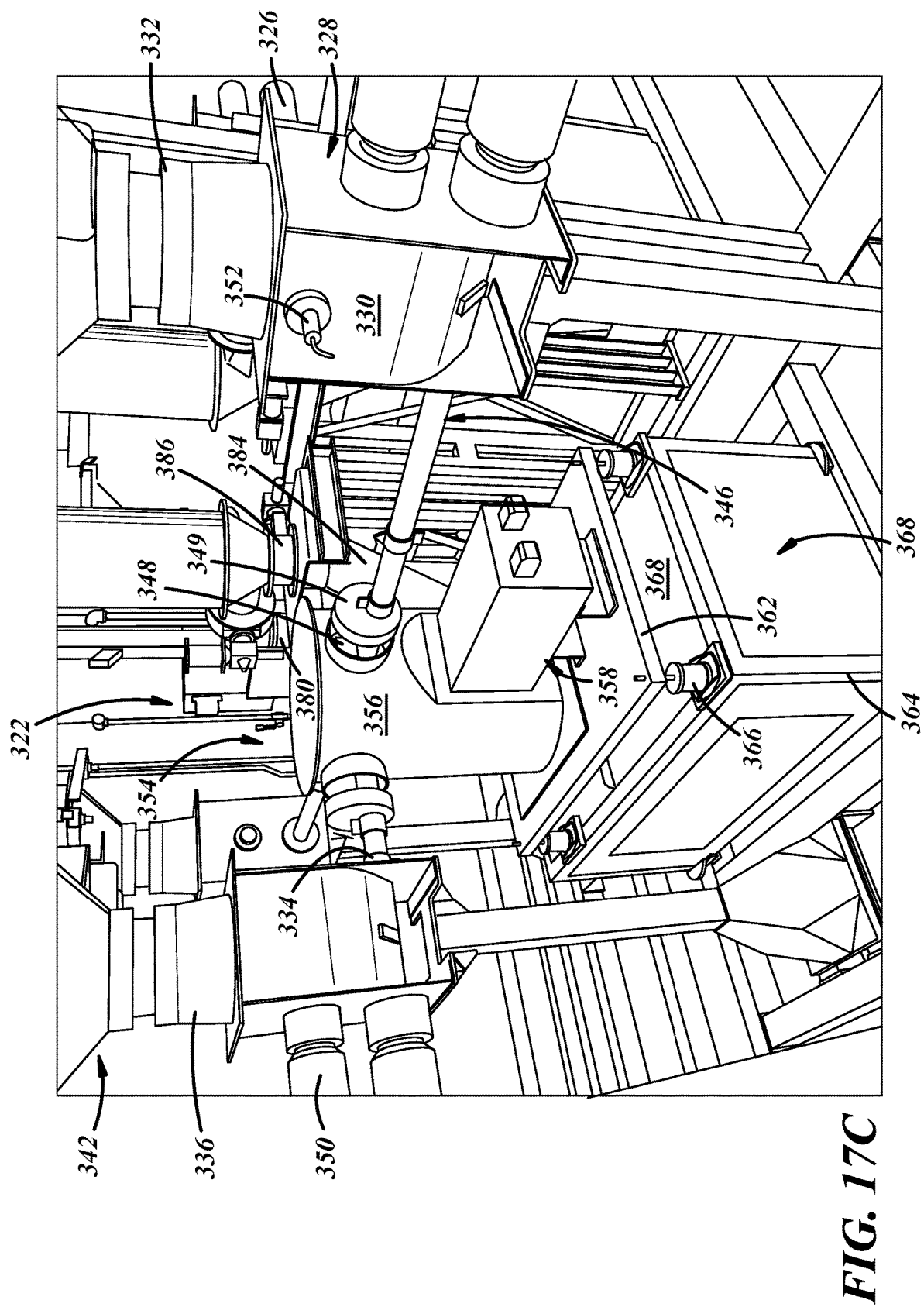
FIG. 17C is a further enlarged, fragmentary, perspective view of a dosing apparatus of the bulk material dispensing modules of FIGS. 17A-B.
Figure 17D:
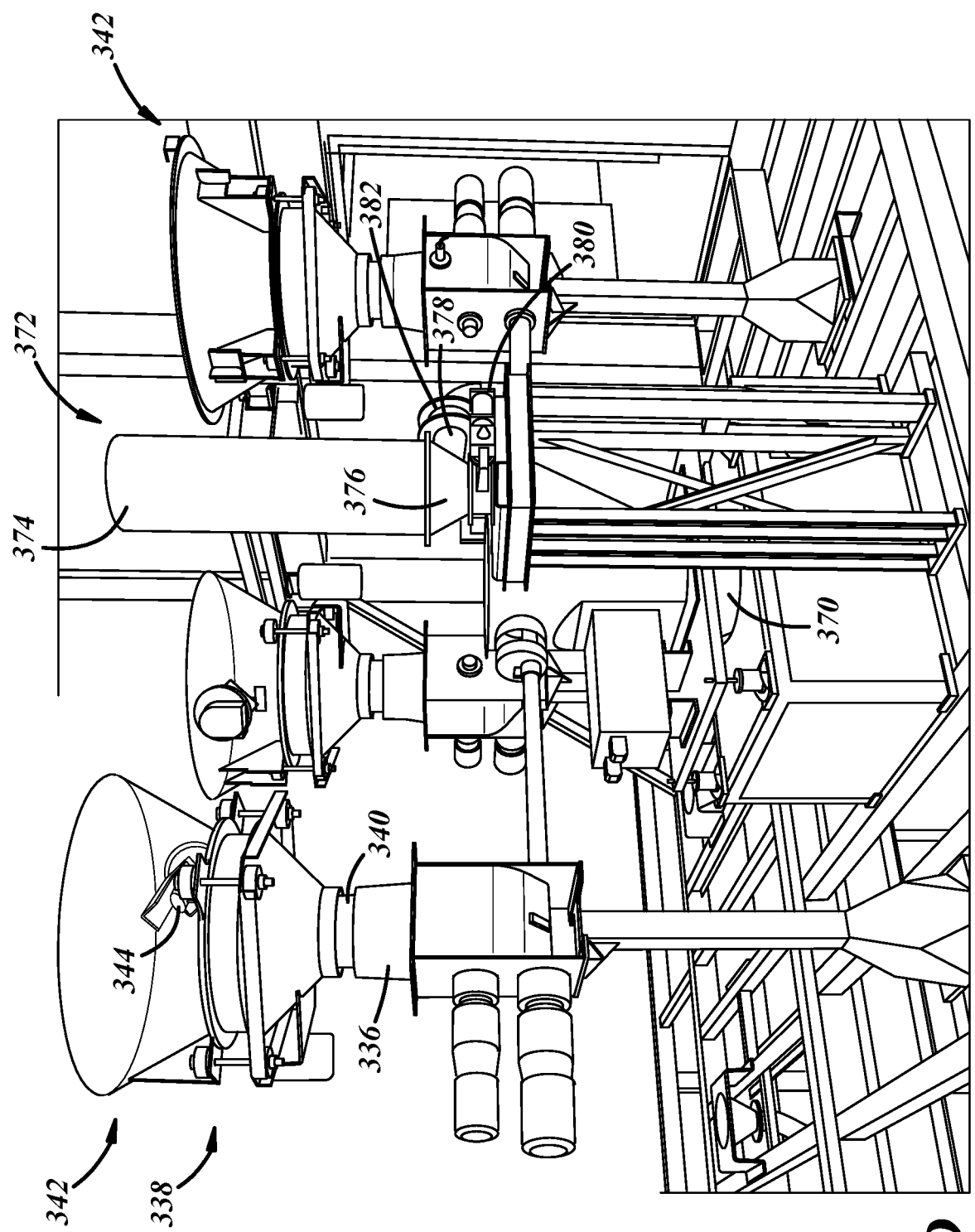
FIG. 17D is an enlarged, fragmentary, upper perspective view of the dosing apparatus of FIG. 17C.
Figure 17E:
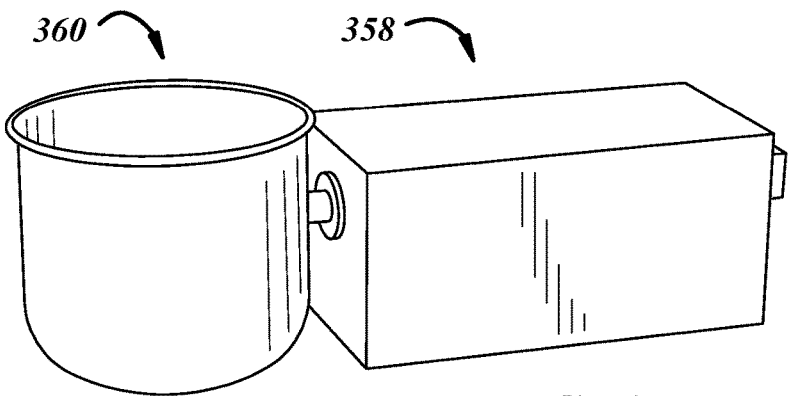
FIG. 17E is an enlarged perspective view of a rotary bucket scale of the dosing apparatus of FIG. 17C.

With reference to FIGS. 17C and 17D, the dosing apparatus 322 includes a doser feeding apparatus 326 including a plurality of feeder bins 328 below and operatively aligned with the plurality of storage hoppers 276 and including bin bodies 330 with bin interiors (not separately shown) and having bin body inlets 332 to receive bulk material from the plurality of storage hoppers 276 and bin body outlets 334. The apparatus 326 also may include inlet conduits 336 coupled to upper ends of the bin bodies 330, mounting adapters 338 having outlet conduits 340 in fluid communication with the inlet conduits 336, and funnel shaped adapters or spouts 342 having lower ends coupled to the mounting adapters 338 and upper flanges that couple to corresponding lower flanges of the storage hoppers 276. The spouts 342 may carry agitators or stirrers 344 to promote movement of bulk material. The doser feeding apparatus 326 also includes a plurality of dosing feeders 346 in communication with the bin interiors of the bin bodies 330 and having feeder outlets 348. The dosing feeders 346 may include motor actuated augers, or any bulk material fine feeding devices suitable for dosing material like glassmaking minors. One or more of the feeder bins 328 may be equipped with agitators or stirrers 350 to promote movement of bulk material and material sensors 352 to sense presence and/or amount of bulk material. Those of ordinary skill in the art would recognize that the dosing apparatus 322 may include one or more controllers (not shown) that may be used to receive input signals from various devices of the dosing apparatus 322 e.g. material sensors 352, process the inputs in any suitable manner, and transmit output signals to various devices of the dosing apparatus e.g. the stirrers 344 and the feeders 346.

With reference to FIG. 17C, the dosing apparatus 322 further includes a bulk material doser 354 common to the pluralities of storage hoppers 276 and feeder bins 328 and including a dosing hopper 356 having a dosing hopper interior (not separately shown), a dosing scale 358 adjacent to the hopper 356, and, with reference also to FIG. 17D, a dosing container 360 that may be cantilevered from the dosing scale 358 and positioned in the dosing hopper interior of the dosing hopper 356. The feeder outlets 348 of the plurality of dosing feeders 346 extend into the dosing hopper 356 interior a distance sufficient to feed bulk material into the dosing container 360. The dosing scale 358 may be a rotary bucket type scale capable of rotating or inverting the dosing container 360 so that the dosing container 360 can dump bulk material into the bottom of the dosing hopper 356. The scale may have up to +/−2 g accuracy and the dosing container 360 may have a volumetric capacity of up to 25 liters. The scale 358 may be enclosed for negative airflow for dust reduction.

Figure 17F:
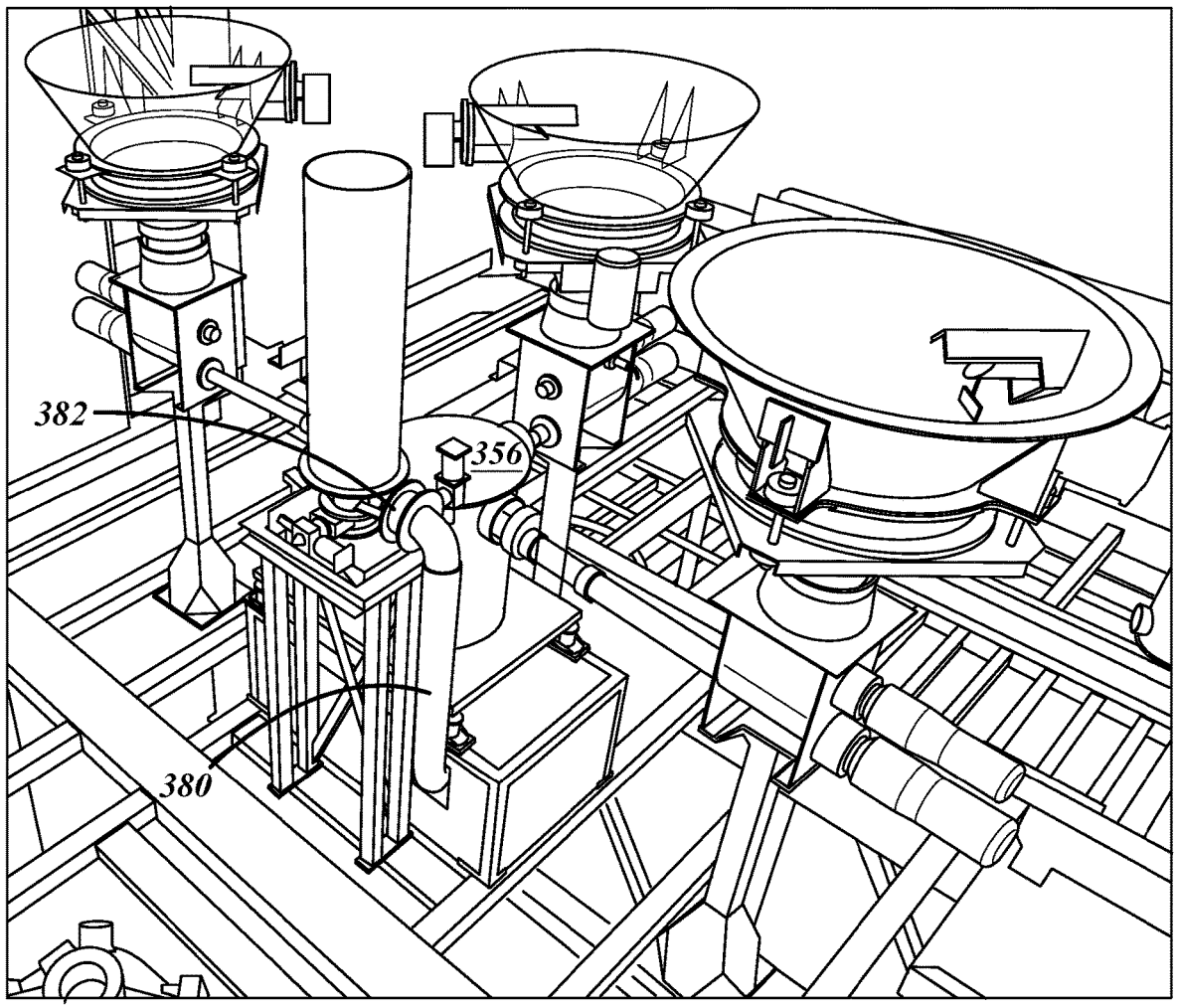
FIG. 17F is an enlarged, fragmentary, perspective view of the dosing apparatus of FIG. 17C.

With continued reference to FIG. 17C, the doser 344 may be carried on a platform 362, which, in turn may be carried on a frame 364, which, in turn, may be carried by any suitable portion(s) of the module frame 54. The platform 362 may be supported on the frame 364 by a plurality of vibration isolating mounts 366, for example, located at corners of the platform 362 and the frame 364. The frame 364 may include side and upper walls 368 to enclose or cover portions of the dispensing apparatus 320 as a dust control measure. As can be seen in FIG. 17F, the dosing hopper 356 also includes a funnel shaped lower end or spout 370 having an inlet in communication with the dosing hopper interior and, with reference to FIG. 18A, having an outlet 371 for dispensing bulk material to the docking apparatus 324 wherein a dispensing valve 388 may be coupled to and between the spout 370 and the docking apparatus 324 and in communication therewith. The dispensing valve 388 may be actuated to open, close, or otherwise regulate flow between the spout 370 and the docking apparatus 324.

With reference again to FIGS. 17D, the dispensing apparatus 320 includes dispensing filtration conduit 372, including a dispensing filtration extension conduit 374 having a downstream end configured for fluid communication with the inlet of the dispensing filter 292 of the storage apparatus 274, and an upstream end. The dispensing filtration conduit 372 also includes a junction 376 that may be conical or funnel-shaped having a downstream end in fluid communication with the upstream end of the extension conduit 374, an upstream end, and a branch conduit 378. The filtration conduit 372 further includes a docking filtration conduit 380 having an upstream end in fluid communication with a corresponding portion of the docking apparatus 324 and a downstream end. The filtration conduit 380 also include a docking filtration valve 382 having an upstream end in fluid communication with the downstream end of the docking filtration conduit 372 and a downstream end in fluid communication with the branch conduit 378 of the junction 376 to regulate flow through the docking filtration conduit 380. The filtration conduit 372 additionally includes a dosing vent conduit 384 (FIG. 17C) having an upstream end in fluid communication with the interior of the dosing hopper 356 and a downstream end, and a dispensing filtration valve 386 (FIG. 17C) in fluid communication between the downstream end of the dosing vent conduit 384 and the upstream end of the junction to regulate flow through the dispensing filtration conduit 372. Accordingly, with reference to FIGS. 16C and 17C, the bulk material dispensing apparatus 320 also includes the dispensing filter apparatus 290 that is common not only to the plurality of storage hoppers 276 of the bulk material storage module 272 and apparatus 274 above the dispensing module 318, but is also common to the plurality of feeder bins 328 as well as to the dosing apparatus 322 and to the docking apparatus 324.

Figure 18B:
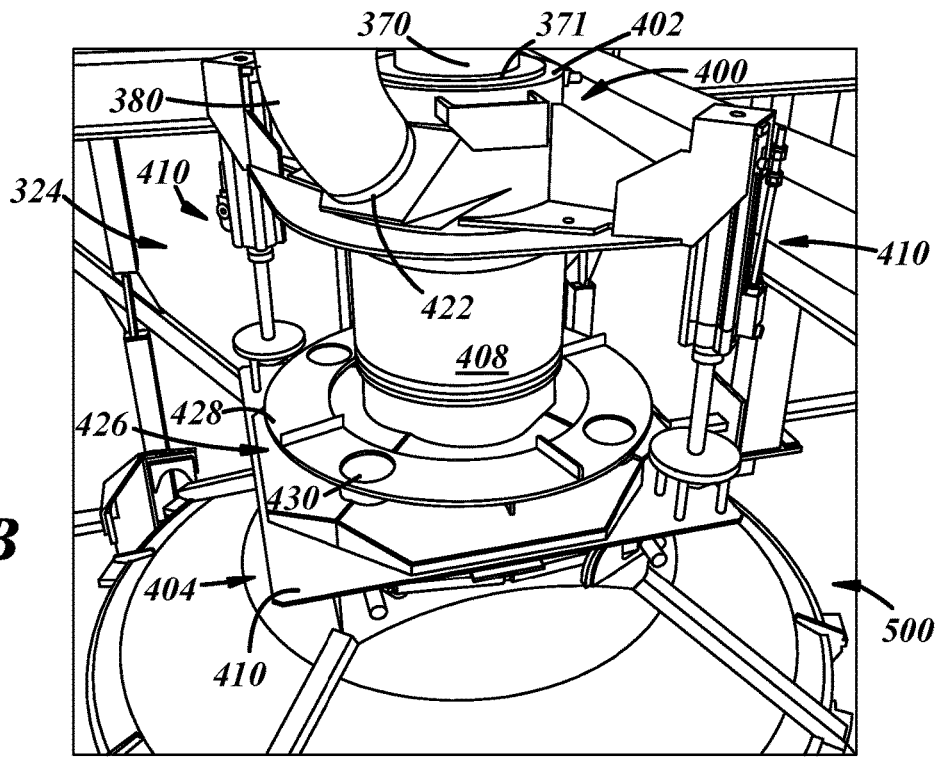
FIG. 18B is a perspective view of the docking apparatus of FIG. 18A coupled with a transporter.

With reference now to FIGS. 18A-B, the docking apparatus 324 is illustrated as being located beneath and coupled to an outlet 371 of the dosing hopper spout 370 to receive bulk material therefrom. The illustrated docking apparatus 324 includes a receiving portion 400 that includes a docking apparatus inlet 402, a docking portion 404 below the receiving portion 400 and that includes a dispenser outlet 406, a collapsible sleeve 408 extending between the receiving portion 400 and docking portion 404 and at least partially establishing an internal volume 409 of the docking apparatus 324 in communication with the inlet 402 and the outlet 404. The docking apparatus 324 also includes one or more actuators 410 that move the docking portion 404 with respect to the receiving portion 400.

Figure 18C:
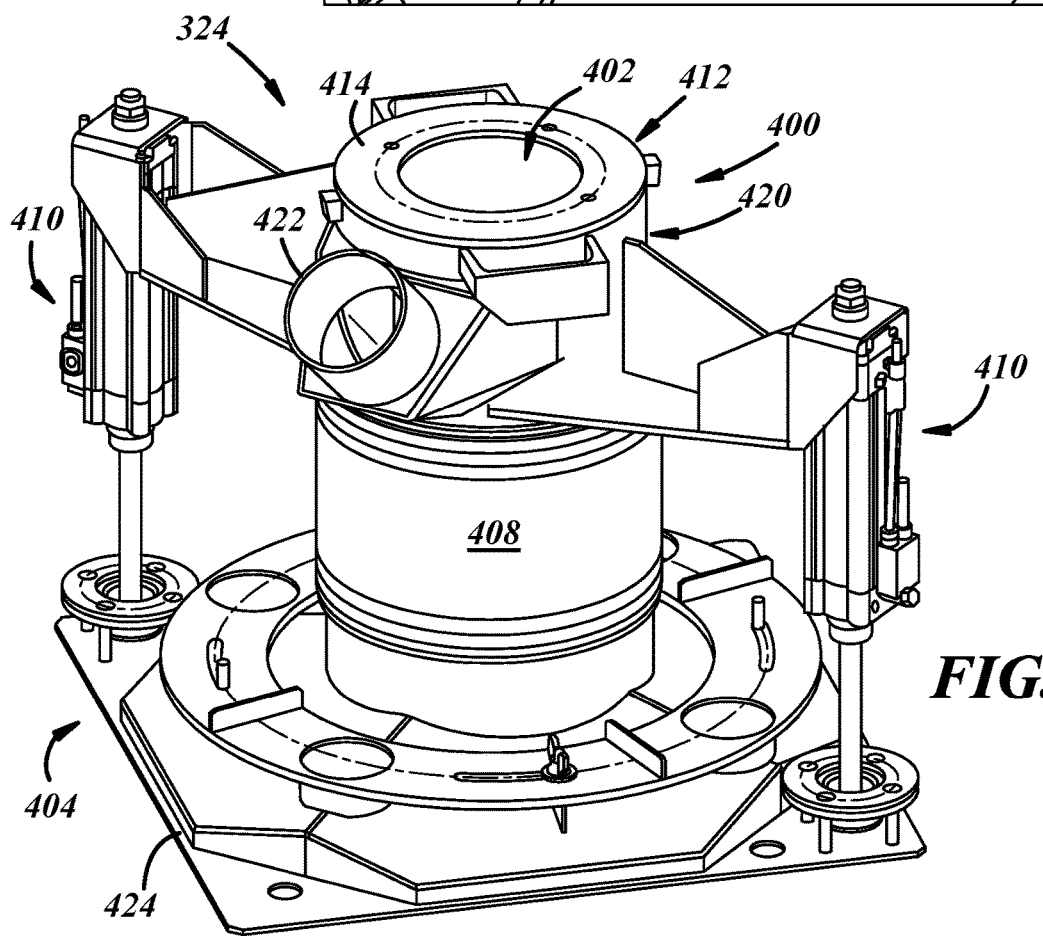
FIG. 18C is an isometric view of the docking apparatus of FIG. 18A.
Figure 18E:
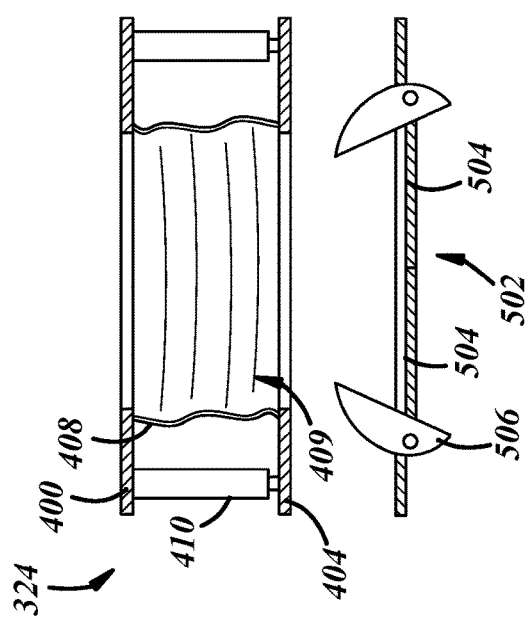
FIG. 18E is a schematic cross-sectional view of a portion of a docking apparatus in a retracted condition over a transport bin.
Figure 18F:
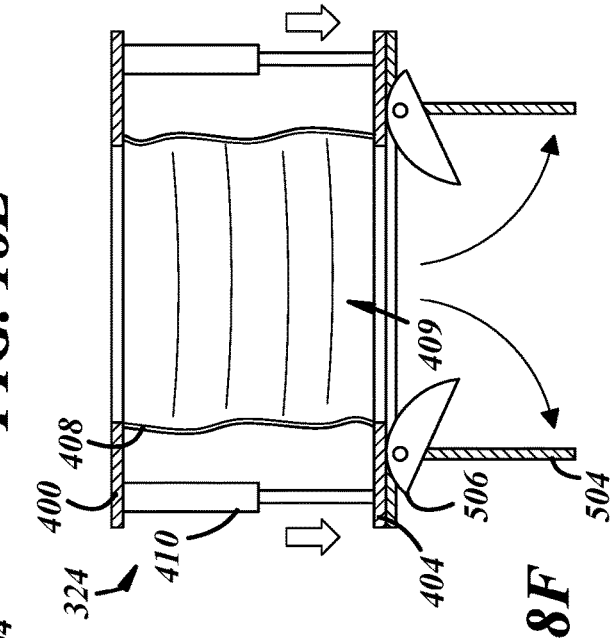
FIG. 18F is a schematic cross-sectional view of a portion of a docking apparatus in an extended condition and coupled with a transport bin.
Figure 18D:
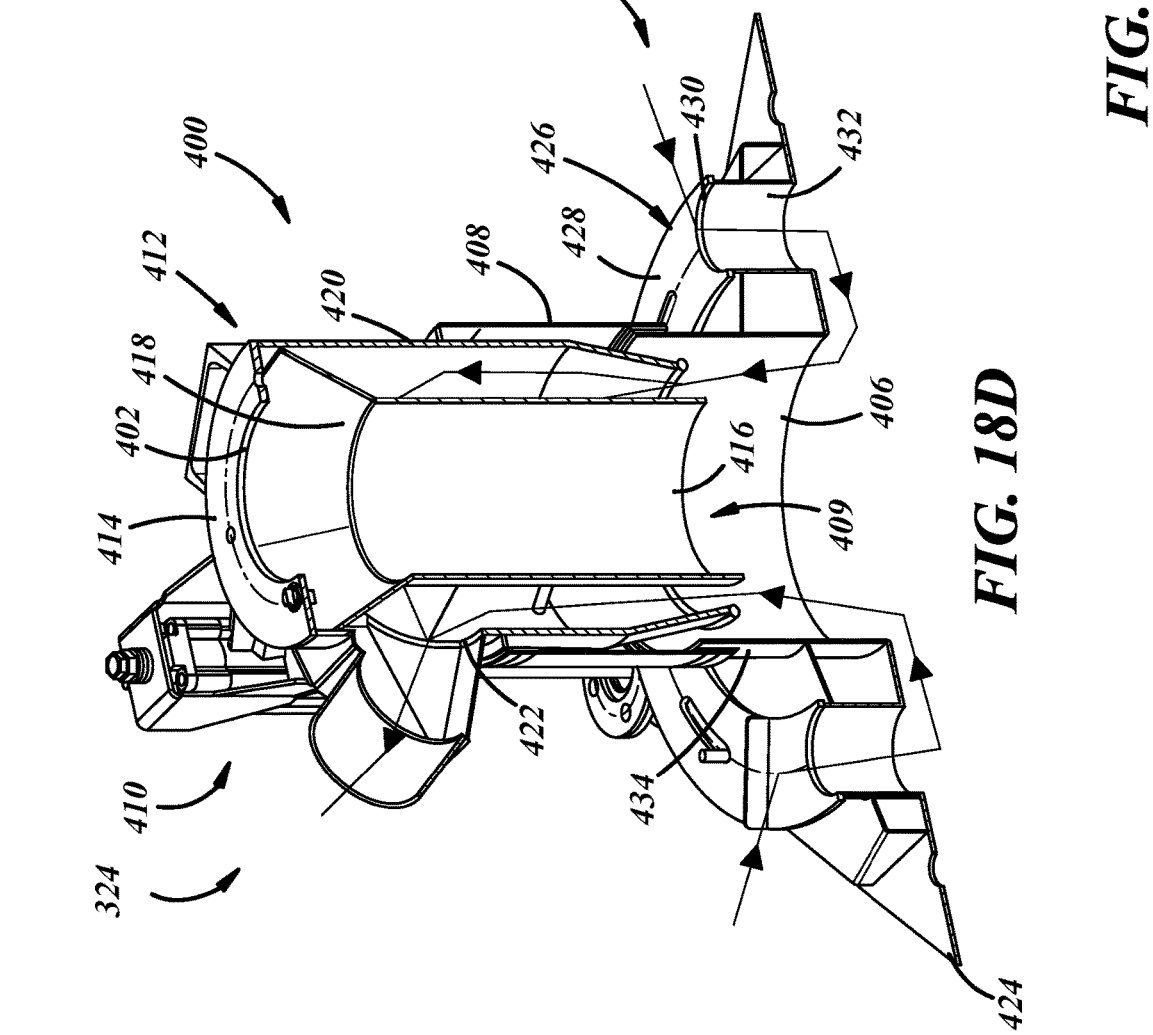
FIG. 18D is an isometric cross-sectional view of the docking apparatus shown in FIG. 18C.

With reference now to FIGS. 18C-D, the receiving portion 400 of the docking apparatus 324 includes a coupling sleeve 412 having a first end 414 configured to be attached to the dosing hopper spout 370 (FIG. 18A) and a second end 416 extending into the internal volume 409 (FIG. 18D) of the docking apparatus 324. The first end 414 of the coupling sleeve 412 provides the docking apparatus inlet 402. The coupling sleeve 412 further includes an inner sleeve 418 (FIG. 18D) and an outer sleeve 420, both of which extend from the first end 414 and downward into the internal volume 409 of the docking apparatus 324. A vacuum port 422 extends through the outer sleeve 420 and fluidly connects the dispensing filter inlet to the internal volume 409 of the docking apparatus 324 via an annular gap between the inner and outer sleeves 418, 420 as best shown in FIG. 18D. The top end of the inner sleeve 418 may be funnel-shaped and receives the bulk material from the dosing hopper 356. The bulk material thus travels through the center of the docking apparatus 324 from the dosing hopper 356 to a transporter 500. The transporter 500 may include a transport bin having an upper inlet to receive bulk material, a lower outlet to release the bulk material, a wall between the inlet and the outlet to retain the bulk material, and any suitable inlet and outlet closures. Any transport bin suitable for use with bulk material handling may be used. The inner sleeve 418 extends downward past the end of the outer sleeve 420 and isolates the discharged bulk material from the outer sleeve 420 so that bulk material from the dosing hopper 356 is not inadvertently drawn into the docking vent conduit 380 (FIG. 18B) and up into the dispensing filter.

With reference to FIG. 18D, the docking portion 404 includes a lower plate 424, which provides the dispenser outlet 406 and mates with the transporter, and an adjustable vent 426 to permit atmospheric air to enter the internal volume 409 of the docking apparatus 324 during operation of the dispensing filter and prevent internal pressure from dropping too low and causing the dispensing filter to be overworked. The illustrated vent 426 includes an annular adjuster 428 with apertures 430 formed therethrough. The adjuster 428 is located atop the lower plate 424, which has corresponding apertures 432 formed therethrough. The adjuster 428 can be rotated about a vertical axis between a fully open position, in which the apertures 430 of the adjuster 428 are aligned with the apertures 432 of the lower plate 424, and a fully closed position, in which all apertures 430, 432 are closed-off. Adjustment of the vent 426 between these two extremes results in adjustment of the pressure differential between the internal volume 409 and the surrounding atmosphere. In particular, a more open vent 426 results in a higher internal pressure (and a lower pressure differential with the atmosphere), while a more closed vent results in a lower internal pressure (and a higher pressure differential with the atmosphere. This adjustment can be fine-tuned by starting with a fully open vent 426 and gradually closing it off until the pressure is sufficiently low in the internal volume 409 to prevent dust and other solids from escaping during dispensing. This low-pressure region 409 within the docking apparatus 324 ensures that little to no dust or other solids in the air displaced from the transporter 500 during bulk material dispensing escapes from the coupled portions of the system.

With continued reference to FIG. 18D, in addition to the lower plate 424 and adjustable vent 426, the docking portion 404 of the docking apparatus 324 also includes an upwardly extending sleeve 434 to which the lower end of the collapsible sleeve 408 is affixed. All of the sleeves 408, 418, 420, 434 are concentric. When the docking portion 404 is retracted toward the receiving portion 400, the inner sleeve 418 and outer sleeve 420 of the coupling sleeve 412 are nested within the sleeve 434 of the docking portion 404 and the collapsible sleeve 408 is collapsed. When the docking portion 404 is extended away from the receiving portion 400, the inner sleeve 418 and outer sleeve 420 of the coupling sleeve 412 are withdrawn from the sleeve 434 of the docking portion 404 and surrounded by the extended collapsible sleeve 408.

With reference to FIG. 18C, the collapsible sleeve 408 can be a telescopic sleeve with nesting segments, a corrugated polymer sleeve, a fabric sleeve, or similar. The internal volume 409 of the docking apparatus 324 thus changes with relative movement of the receiving portion 400 and docking portion 404. The actuators 408 may be lost-motion actuators to limit an amount of force applied to the transporter during docking and dosing. Here, the actuators 408 are pneumatic cylinders, but other actuators and actuator mechanisms are contemplated (e.g., solenoid, servo-powered gear train, etc.).

The above-described dispensing equipment enables bulk material dispensing methods, including methods of docking a transport bin with the dispensing equipment and methods of metering doses of bulk material from the bulk material storage hoppers at least as follows.

With general reference to FIGS. 16A-18D, an illustrative bulk material handling method may include a coupling or docking step, a receiving step, formation of a reduced pressure region, and a dispensing step. In the coupling or docking step, the outlet 406 of the docking apparatus 324 of the dispensing apparatus 320 is coupled with a transporter 500 to form a closure at an inlet of the transporter and place an inside of the transporter 500 in communication with the docking apparatus 324 and the storage hopper 276. The dispenser 124 and transporter 500 are illustrated in the docked or coupled condition in FIG. 18B covering an inlet of the transporter 500. In this example, the coupling includes interfacial contact between the lower plate 424 of the docking apparatus 324 and a lip surrounding the inlet of the transporter 500. Other types of coupling are contemplated, such as positive engagement of protrusions and corresponding recesses, or positive engagement of a latch or other reversible attachment.

The receiving step includes receiving bulk material in the dosing apparatus 322 from the overlying bulk material storage hopper. Receiving of the bulk material in the dosing apparatus 322 occurs via gravity feed whenever a dosing feeder is actively moving bulk material toward the feeder outlet. Formation of the reduced pressure region occurs in the internal volume 408 of the dispenser 324 when the dispensing filter is activated. Dispensing of the bulk material occurs via operation of the doser 354, which drops the bulk material from the dosing container 360 through the dosing hopper outlet 371, through the reduced pressure region of the internal volume 409, and into the transporter 500.

In one illustrative and more detailed example of the method, the transporter 500 is placed beneath the docking apparatus 324 with the docking apparatus 324 in a retracted condition in which the actuators 410 are in a retracted position and the collapsible sleeve 408 is collapsed. With the docking apparatus 324 in this state, the dosing apparatus 322 and its dosing feeders are idle and not moving or actively feeding any bulk material, although the feeders may be entirely full of bulk material from a previous dosing cycle. In addition, the dispensing filter is idle when the docking apparatus 324 is in the retracted condition.

With the inlet of the transporter 500 aligned beneath the docking portion 404 of the docking apparatus 324, the actuators 410 of the docking apparatus 324 are extended and move the docking portion 404 and the dispenser outlet 406 toward the transporter 500 as the collapsible sleeve 408 extends. When the docking portion 404 contacts the transporter 500 and a minimal force is applied, the downward motion of the docking portion 404 is halted by virtue of the lost-motion actuators 410, and the docked or coupled condition of FIG. 18B is achieved.

After the docking apparatus 324 and transporter 500 are coupled together, the dispensing filter is activated. This reduces the pressure within the internal volume 409 of the docking apparatus 324 and, thereby, within the transporter 500. With this internal pressure sufficiently reduced, the dosing feeder 346 of the doser 354 is activated and begins moving the bulk material received from the overlying storage hopper 276 toward the feeder outlet 348, where it is dropped into the dosing container 360. One or more other dosing feeders 346 of the doser 354 may be activated to move bulk material received from one or more other corresponding overlying storage hoppers 276 toward the feeder outlets, where it is dropped into the dosing container 260 along with bulk material received from other feeders 346. Once a desired dose of the bulk materials has been achieved and verified by weighing with the scale 358, the feeder(s) 346 are deactivated, the scale 358 is activated to rotate or invert the dosage container 360 and dump the bulk material dose down through the hopper outlet, and the dispensing valve 388 may be opened to allow the bulk material dose to fall through the concentric sleeves of the docking apparatus 324 and into the transporter 500. Thereafter, the dispensing valve 388 may be closed. The bulk material discharged from the feeders 346 may be continuously replenished via gravity feed from the overlying storage hopper 276.

The dispensing filter 292 may continue to operate for several seconds after dispensing is halted to remove as much solid material from the air inside the transporter 500 as possible. The dispensing filter 292 is then deactivated, and the dispensing filter 292 may be pulsed to dislodge filtrate from the dispensing filter 292 to be dropped back down into and through the storage hopper 272 and into the transporter 500. Next, the actuators of the docking apparatus 324 are retracted, and the docking portion of the docking apparatus 324 is moved back toward the receiving portion to the retracted position. The transporter 500 can then be transported to another part of the majors 38 or minors 40 section of the system 10.

In various embodiments, the dispensing filter 292 may also operate with at least two sequential stages, a later one of the stages being more powerful than an earlier one of the stages. For example, the dispensing filter 292 may operate with at least two rotational speeds, including a high speed and a low speed. When the dispensing filter 292 is initially activated after docking, it may operate at the low speed to achieve just enough of a reduced pressure region within the docking apparatus 324 as is necessary to prevent dust from escaping the coupled system. Then, the dispensing filter 292 may change to the high speed after dosing and dispensing is completed. The high-speed operation draws a much higher volume of atmospheric air through the vent of the docking apparatus 324 and causes turbulent flow within the space over the dispensed material in the transporter 500 to help draw as much of the solids-laden air from the transporter as possible before halting the vacuum filtration and undocking from the transporter 500.

The docking apparatus 324 may also cooperate with the transporter 500 to further reduce the amount of dust and other solids that escape the system during docking and undocking. In one non-limiting example, and with reference to FIG. 18E, the transporter 500 may be equipped with a closure 502 that is changeable between a closed condition and an open condition. In the example of FIG. 18E, the closure 502 includes a pair of doors 504 and levers 506 affixed to hinges of the doors 504 and extend above the inlet of the transporter 500 when the docking apparatus 324 is in the retracted condition. The doors 504 of the closure 502 are biased toward the closed condition so that they are closed when the transporter 500 is undocked. As best shown in the schematic views of FIGS. 18E and 18F, when the docking apparatus 324 is changed from the retracted condition of FIG. 18E to the extended condition of FIG. 18F, the lower plate 424 of the docking apparatus 324 contacts the levers 506, which rotates the doors 504 of the closure 502 to their open condition as the transporter 500 is docked. Likewise, after bulk material dispensing is completed and the docking apparatus 324 is changed back to the retracted condition of FIG. 34, the doors 504 of the closure 502 are moved back to the closed condition by virtue of their bias toward that condition.

In one dispensing module 318, the feeder bins 328 and dosing feeders 346 are arranged in a partial array, or an array that is semicircular or semi-hexagonal, including three feeder bins 328 and three dosing feeders 346 and one doser 354. In two side-by-side modules, the feeder bins 328 and dosing feeders 346 are arranged in a complete array, or an array that is circular or hexagonal, including six feeder bins 328 and six dosing feeders 346 and two dosers 354. Accordingly, a second of the two modules 318 includes a second bulk material dispensing apparatus and a second one of each apparatus, component, utility, and interconnections therebetween, already described above with reference to one of the modules. The dispensing modules 318 may be internally modular such that they may be modifiable to include more or fewer instances of the feeding apparatuses 326 and/or dosers 354.

Figure 19:
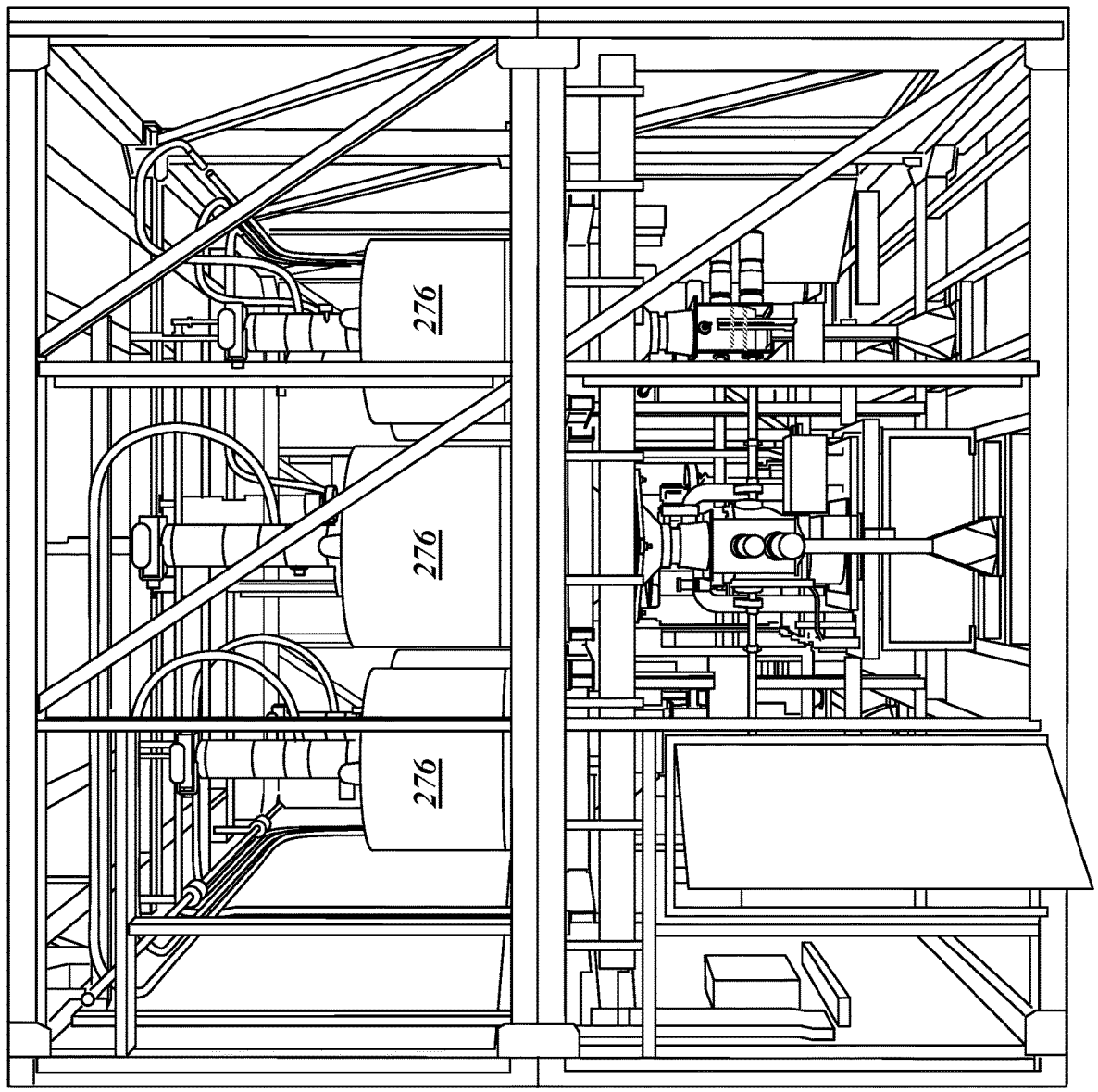
FIG. 19 is an enlarged side view of the storage modules of FIGS. 16A-E carried on the dispensing modules of FIGS. 17A-F.

With reference now to FIG. 19, multiple storage and dispensing modules 272, 318 are coupled together including the storage hoppers 276, and the feeder bins 328 and the dosing feeders 346 being arranged in a complete array, or an array that is circular or hexagonal, including six storage hoppers 276, feeder bins 328, and dosing feeders 346, and two filters 292 and dosers 354.

As used in herein, the terminology "for example," "e.g.," "for instance," "like," "such as," "comprising," "having," "including," and the like, when used with a listing of one or more elements, is to be construed as open-ended, meaning that the listing does not exclude additional elements. Also, as used herein, the term "may" is an expedient merely to indicate optionality, for instance, of a disclosed embodiment, element, feature, or the like, and should not be construed as rendering indefinite any disclosure herein. Moreover, directional words such as front, rear, top, bottom, upper, lower, radial, circumferential, axial, lateral, longitudinal, vertical, horizontal, transverse, and/or the like are employed by way of example and not necessarily limitation.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

The invention claimed is:

1. A bulk material handling system, comprising:
   a bulk material storage module including:
      a modular frame; and
      a bulk material storage apparatus coupled to the modular frame and including
         a plurality of storage hoppers; and
         a dispensing filter common to the plurality of storage hoppers and including a dispensing filter housing, a dispensing filter rotor in fluid communication with the dispensing filter housing, and a dispensing filter motor coupled to the dispensing filter rotor,
      wherein the modular frame is constructed as a rectangular box truss, having a longitudinal axis, a lateral axis, and a vertical axis, and including
         lower beams extending longitudinally, and being laterally opposed from one another,
         upper beams extending longitudinally, and being laterally opposed from one another,
         posts extending vertically between the lower and upper beams,
         upper cross-members extending laterally between the upper beams, and
         lower cross-members extending laterally between the lower beams,
      wherein the plurality of storage hoppers are coupled to at least one of the lower beams or cross-members, and the common dispensing filter is coupled to at least one of the lower beams or cross-members.

2. The system of claim 1, wherein the modular frame also includes
   one or more struts extending obliquely between the lower and upper beams, and
   a platform carried on at least some of the lower cross-members to establish a floor.

3. The system of claim 1, wherein each modular frame has exterior dimensions less than or equal to exterior dimensions of an intermodal freight container.

4. The system of claim 1, further comprising:
   a bulk material dispensing apparatus including
      a dosing apparatus including
         a doser feeding apparatus including
            a plurality of feeder bins below the plurality of storage hoppers and including bin bodies with bin interiors and having bin body inlets to receive bulk material from the plurality of storage hoppers, and
            a plurality of dosing feeders in communication with the bin interiors of the bin bodies of the plurality of feeder bins and having feeder outlets.

5. A bulk material handling system, comprising:
   a bulk material storage apparatus including
      a plurality of storage hoppers, and
      a dispensing filter common to the plurality of storage hoppers and including a dispensing filter housing, a dispensing filter rotor in fluid communication with the dispensing filter housing, and a dispensing filter motor coupled to the dispensing filter rotor; and
   a bulk material dispensing apparatus including
      a dosing apparatus including
         a doser feeding apparatus including
            a plurality of feeder bins below the plurality of storage hoppers and including bin bodies with bin interiors and having bin body inlets to receive bulk material from the plurality of storage hoppers, and
            a plurality of dosing feeders in communication with the bin interiors of the bin bodies of the plurality of feeder bins and having feeder outlets, and
         a bulk material doser common to the plurality of storage hoppers and feeder bins and including
            a dosing hopper having a dosing hopper interior,
            a dosing container positioned in the dosing hopper interior of the dosing hopper, wherein the feeder outlets of the plurality of dosing feeders extend into the dosing hopper interior to feed the bulk material into the dosing container,
            a dosing scale coupled to the dosing container, and
            a spout having an inlet in communication with the dosing hopper interior and having an outlet.

6. The system of claim 5, further comprising:
   a bulk material storage module including:
      a modular frame; and
      wherein the bulk material storage apparatus is coupled to the modular frame.

7. The system of claim 5, wherein the dosing apparatus additionally includes
   a dispensing filtration duct in fluid communication with the dosing hopper interior of the dosing hopper and in fluid communication with the dispensing filter housing of the common dispensing filter.

8. The system of claim 5, wherein the bulk material dispensing apparatus also includes
   a docking apparatus including a collapsible conduit having a conduit interior to receive the bulk material from the dosing container of the bulk material doser, and a docking filtration duct in fluid communication with the conduit interior of the collapsible conduit and in fluid communication with the dispensing filter housing of the dispensing filter of the bulk material storage apparatus.

9. The system of claim 8, further comprising:
a second bulk material storage apparatus including
a second plurality of storage hoppers; and
a second dispensing filter common to the second plurality of storage hoppers and including a second dispensing filter housing, a second dispensing filter rotor in fluid communication with the dispensing filter housing, and a second dispensing filter motor coupled to the dispensing filter rotor.

10. The system of claim 9, further comprising:
a second bulk material dispensing apparatus including
a second dosing apparatus including
a second doser feeding apparatus including
a second plurality of feeder bins below the second plurality of storage hoppers and including second bin bodies with second bin interiors and having second bin body inlets to receive bulk material from the second plurality of storage hoppers, and
a second plurality of dosing feeders in communication with the second bin interiors of the second bin bodies of the second plurality of feeder bins and having second feeder outlets.

11. The system of claim 10, wherein the second dosing apparatus further includes
a second bulk material doser common to the second plurality of storage hoppers and feeder bins and including
a second dosing hopper having a second dosing hopper interior,
a second dosing container positioned in the second dosing hopper interior of the second dosing hopper, wherein the second feeder outlets of the second plurality of dosing feeders extend into the second dosing hopper interior to feed the bulk material into the second dosing container,
a second dosing scale coupled to the second dosing container, and
a second spout having a second inlet in communication with the second dosing hopper interior and having a second outlet.

12. The system of claim 10, wherein the second bulk material dispensing apparatus also includes
a second docking apparatus, including
a second collapsible conduit having a second interior, and
a second docking filtration duct in fluid communication with the second interior of the second collapsible conduit and in fluid communication with the second dosing filter of the second bulk material storage apparatus.

13. The system of claim 12, wherein the plurality of storage hoppers of the bulk material storage apparatus is in a first storage hopper partial array and the second plurality of storage hoppers of the second bulk material storage apparatus is in a second storage hopper partial array, which together with the first storage hopper partial array, establishes a complete storage hopper array, and wherein the plurality of dosing hoppers of the dosing apparatus is in a first dosing hopper partial array and the second plurality of dosing hoppers of the second dosing apparatus is in a second dosing hopper partial array, which together with the first dosing hopper partial container array, establishes a complete dosing hopper array.

14. The system of claim 13, wherein the first and second dosing hopper partial arrays are semi-circular and the complete dosing hopper arrays are circular.

15. The system of claim 14, wherein the bulk material storage apparatus also includes a set of utilities coupled to the storage hoppers and including at least one of a filter, a pressure relief valve, a pneumatic conduit, or a level gauge, and the second bulk material storage apparatus also includes a second set of utilities coupled to the second plurality of storage hoppers and including at least one of a second filter, a second pressure relief valve, a second pneumatic conduit, or a second level gauge.

16. The system of claim 5, further comprising:
a plurality of bulk tote unloaders pneumatically coupled to corresponding storage hoppers of the plurality of storage hoppers; and
a plurality of bulk container unloaders pneumatically coupled to corresponding storage hoppers of the plurality of storage hoppers.

17. A bulk material handling system, comprising:
a dosing apparatus including
a doser feeding apparatus including
a plurality of feeder bins including bin bodies with bin interiors and having inlets and outlets, and
a plurality of dosing feeders in communication with the outlets of the bin bodies of the plurality of feed bins and having feeder outlets; and
a bulk material doser common to the plurality of feeder bins and dosing feeders and including
a dosing hopper having a dosing hopper interior,
a dosing container positioned in the dosing hopper interior of the dosing hopper, wherein the feeder outlets of the plurality of dosing feeders extend into the dosing hopper interior to feed bulk material into the dosing container,
a dosing scale coupled to the dosing container, and
a spout having an inlet in communication with the dosing hopper interior and having an outlet.

18. The system of claim 17, further comprising:
a bulk material dispensing module including:
a modular frame, and
wherein the dosing apparatus is carried by the modular frame.

19. The system of claim 18, wherein the modular frame is constructed as a rectangular box truss, having a longitudinal axis, a lateral axis, and a vertical axis, and including
lower beams extending longitudinally, and being laterally opposed from one another,
upper beams extending longitudinally, and being laterally opposed from one another,
posts extending vertically between the lower and upper beams,
upper cross-members extending laterally between the upper beams, and
lower cross-members extending laterally between the lower beams, and
wherein the plurality of feeder bins are coupled to at least one of the lower beams or cross-members.

20. The system of claim 17, wherein the bulk material doser additionally includes a dispensing filtration duct in fluid communication with the dosing hopper interior of the dosing hopper and in fluid communication with a common dispensing filter.

21. The system of claim 20, wherein the bulk material dispensing module also includes
   a docking apparatus including
      a collapsible conduit having a conduit interior to receive the bulk material from the dosing container of the bulk material doser, and
      a docking filtration duct in fluid communication with the conduit interior of the collapsible conduit and in fluid communication with the common dispensing filter.

22. The system of claim 21, wherein the bulk material dispensing module further includes
   a dispensing filtration valve to regulate flow through the dispensing filtration duct, and
   a docking filtration valve to regulate flow through the docking filtration duct.

23. The system of claim 17, further comprising:
   a second dosing apparatus including
      a second doser feeding apparatus including
         a second plurality of feeder bins including second bin bodies with second bin interiors and having second bin body inlets to receive bulk material, and
         a second plurality of dosing feeders in communication with the second bin interiors of the second bin bodies of the second plurality of feeder bins and having second feeder outlets.

24. The system of claim 23, wherein the second dosing apparatus further includes
   a second bulk material doser common to the second plurality of feeder bins and dosing feeders and including
      a second dosing hopper having a second dosing hopper interior,
      a second dosing container positioned in the second dosing hopper interior of the second dosing hopper, wherein the second feeder outlets of the second plurality of dosing feeders extend into the second dosing hopper interior to feed the bulk material into the second dosing container,
      a second dosing scale coupled to the second dosing container, and
      a second spout having a second inlet in communication with the second dosing hopper interior and having a second outlet.

25. The system of claim 24, wherein the second bulk material dispensing module also includes
   a second docking apparatus, including
      a second collapsible conduit having a second conduit interior, and
      a second docking filtration duct in fluid communication with the second conduit interior of the second collapsible conduit and in fluid communication with a second common dispensing filter.

26. A bulk material handling system, comprising:
   a dosing apparatus including
      a bulk material doser including
         a dosing hopper having a dosing hopper interior,
         a dosing container positioned in the dosing hopper interior of the dosing hopper,
         a dosing scale coupled to the dosing container,
         a spout having an inlet in communication with the dosing hopper interior to receive bulk material from the dosing container, and having an outlet,
         a dispensing filtration duct in fluid communication with the dosing hopper interior of the dosing hopper and in fluid communication with a common dispensing filter; and
   a docking apparatus including
      a collapsible conduit having a conduit interior to receive the bulk material from the outlet of the spout of the bulk material doser of the dosing apparatus, and
      a docking filtration duct in fluid communication with the conduit interior of the collapsible conduit and in fluid communication with the common dispensing filter.

27. The system of claim 26, further comprising:
   a dispensing filtration valve to regulate flow through the dispensing filtration duct, and
   a docking filtration valve to regulate flow through the docking filtration duct.

28. The system of claim 27, further comprising:
   a dispensing filtration duct in communication with the dosing and docking filtration ducts downstream of the dosing and docking filtration valves.

* * * * *